US012175010B2

(12) United States Patent
Lemay et al.

(10) Patent No.: US 12,175,010 B2
(45) Date of Patent: Dec. 24, 2024

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Stephen O. Lemay, Palo Alto, CA (US); Jeffrey M. Faulkner, Sisters, OR (US); Israel Pastrana Vicente, Spring, TX (US); Philipp Rockel, San Francisco, CA (US); Wesley M. Holder, Union City, CA (US); Pol Pla I. Conesa, San Francisco, CA (US); Nicholas W. Henderson, San Carlos, CA (US); Robert T. Tilton, Los Angeles, CA (US); William A. Sorrentino, III, Mill Valley, CA (US); Peter D. Anton, Portola Valley, CA (US); Alan C. Dye, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/030,219

(22) Filed: Sep. 23, 2020

(65) Prior Publication Data

US 2021/0097776 A1    Apr. 1, 2021

Related U.S. Application Data

(60) Provisional application No. 62/907,614, filed on Sep. 28, 2019.

(51) Int. Cl.
*G06F 3/01* (2006.01)
*G06F 3/04845* (2022.01)
(Continued)

(52) U.S. Cl.
CPC .............. *G06F 3/011* (2013.01); *G06F 3/013* (2013.01); *G06F 3/04845* (2013.01);
(Continued)

(58) Field of Classification Search
CPC ................... G06T 19/20; G06T 19/006; G06T 2219/2021; G06T 2219/2012;
(Continued)

(56) References Cited

U.S. PATENT DOCUMENTS 9,949,021 B1    4/2018    Voigt et al.
10,559,121 B1 *  2/2020   Moudgil .................. G06T 15/50
(Continued)

FOREIGN PATENT DOCUMENTS

EP    3 118 722 A1    1/2017
JP    2007-018173 A   1/2007
(Continued)

OTHER PUBLICATIONS

Bimber et al., "Consistent illumination within optical see-through augmented environments", Oct. 2003, pp. 198-207. (Year: 2003).*
(Continued)

*Primary Examiner* — Hwei-Min Lu
(74) *Attorney, Agent, or Firm* — Morgan, Lewis & Bockius LLP

(57) ABSTRACT

While displaying a three-dimensional scene including at least a first virtual object displayed with a first value corresponding to a first portion and a second value corresponding to a second portion of the first virtual object at a first location and a first physical surface at a second location, a computer system generates a first visual effect at the second location of the three-dimensional scene, including modifying a visual appearance of a first portion of the first physical surface in the three-dimensional scene in accordance with the first value for the first display property that
(Continued)

corresponds to the first portion of the first virtual object; and modifying a visual appearance of a second portion of the first physical surface in the three-dimensional scene in accordance with the second value for the first display property that corresponds to the second portion of the first virtual object.

26 Claims, 25 Drawing Sheets

(51) Int. Cl.
    *G06T 19/00*   (2011.01)
    *G06T 19/20*   (2011.01)
    *G06V 10/143*  (2022.01)
    *G06V 20/20*   (2022.01)
    *G06V 40/10*   (2022.01)
    *G06V 40/20*   (2022.01)

(52) U.S. Cl.
    CPC ............ *G06T 19/006* (2013.01); *G06T 19/20* (2013.01); *G06V 10/143* (2022.01); *G06V 20/20* (2022.01); *G06V 40/107* (2022.01); *G06V 40/113* (2022.01); *G06V 40/28* (2022.01); *G06T 2219/2021* (2013.01)

(58) Field of Classification Search
    CPC ...... G06T 15/506; G06V 40/28; G06V 40/20; G06V 40/107; G06V 40/113; G06V 10/143; G06V 20/20; G06F 3/013; G06F 3/011; G06F 3/017; G06F 3/0304; G06F 3/04845; G06F 3/04815; G06F 3/0482; G06F 3/04842; G06F 3/0485; G06F 2203/0381; G06F 2203/04802
    USPC .......................... 715/848; 345/633; 382/154
    See application file for complete search history.

(56) References Cited

U.S. PATENT DOCUMENTS

| | | | | |
|---|---|---|---|---|
| 2002/0022515 | A1* | 2/2002 | Boku | A63F 13/52 463/31 |
| 2007/0236485 | A1* | 10/2007 | Trepte | G06T 15/60 345/207 |
| 2009/0115784 | A1* | 5/2009 | Tomite | G06T 15/06 345/426 |
| 2009/0251460 | A1* | 10/2009 | Dunnigan | G06T 15/50 345/589 |
| 2010/0315413 | A1 | 12/2010 | Izadi et al. | |
| 2013/0246954 | A1 | 9/2013 | Gray et al. | |
| 2014/0043321 | A1* | 2/2014 | Matjasko | G06T 19/006 345/419 |
| 2015/0091903 | A1 | 4/2015 | Costello et al. | |
| 2015/0110263 | A1 | 4/2015 | Johnston et al. | |
| 2015/0116354 | A1* | 4/2015 | Tomlin | G02B 27/017 345/633 |
| 2016/0012642 | A1* | 1/2016 | Lee | G06T 19/006 345/426 |
| 2016/0078057 | A1* | 3/2016 | Perez de la Coba | G06T 7/10 707/772 |
| 2016/0364914 | A1* | 12/2016 | Todeschini | G02B 27/0172 |
| 2017/0026509 | A1 | 1/2017 | Rand | |
| 2018/0107269 | A1* | 4/2018 | Benzies | G06F 3/012 |
| 2018/0330515 | A1* | 11/2018 | Stall | G06T 19/003 |
| 2018/0357780 | A1 | 12/2018 | Young et al. | |
| 2019/0122441 | A1* | 4/2019 | Agrawal | G06T 19/006 |
| 2019/0139307 | A1 | 5/2019 | Min | |
| 2019/0228568 | A1* | 7/2019 | Wu | G06T 15/506 |
| 2019/0235729 | A1* | 8/2019 | Day | G06F 3/04812 |
| 2019/0258320 | A1 | 8/2019 | Yang et al. | |
| 2019/0318534 | A1* | 10/2019 | Mory | G06T 15/08 |
| 2019/0332400 | A1* | 10/2019 | Spoor | G06F 3/013 |
| 2020/0151958 | A1* | 5/2020 | Livneh | G06T 19/006 |
| 2021/0096726 | A1 | 4/2021 | Faulkner et al. | |
| 2021/0097768 | A1 | 4/2021 | Malia et al. | |
| 2021/0319778 | A1 | 10/2021 | Lerner et al. | |
| 2022/0083197 | A1 | 3/2022 | Rockel et al. | |
| 2022/0092862 | A1 | 3/2022 | Faulkner et al. | |
| 2022/0229524 | A1 | 7/2022 | McKenzie et al. | |
| 2023/0114043 | A1 | 4/2023 | Wan et al. | |
| 2024/0094862 | A1 | 3/2024 | Rodriquez et al. | |

FOREIGN PATENT DOCUMENTS

| | | | |
|---|---|---|---|
| KR | 2016-0006087 A | 1/2016 | |
| KR | 10-1919077 B | 11/2018 | |
| WO | WO 2018200337 A1 | 11/2018 | |
| WO | WO-2018227100 A1 * | 12/2018 | ............ G06F 3/013 |
| WO | WO 2019079826 A1 | 4/2019 | |

OTHER PUBLICATIONS

Levin et al., "Passive light and viewpoint sensitive display of 3D content", 2016 IEEE International Conference on Computational Photography (ICCP), published in May 2016, pp. 1-15. (Year: 2016).*
Invitation to Pay Additional Fees, dated Dec. 23, 2021, received in International Patent Application No. PCT/US2020/052709, which corresponds with U.S. Appl. No. 17/030,219, 23 pages.
International Search Report and Written Opinion, dated Feb. 15, 2021, received in International Patent Application No. PCT/US2020/052709, which corresponds with U.S. Appl. No. 17/030,219, 24 pages.
Office Action, dated Jun. 6, 2023, received in European Patent Application No. 20789388.4, which corresponds with U.S. Appl. No. 17/030,219, 16 pages.
Office Action, dated Apr. 25, 2023, received in Japanese Patent Application No. 2022-515137, which corresponds with U.S. Appl. No. 17/030,219, 7 pages.
International Search Report and Written Opinion, dated Jun. 20, 2023, received in International Patent Application No. PCT/US2022/044579, which corresponds with U.S. Appl. No. 17/950,795, 16 pages.
Office Action, dated Apr. 19, 2024, received in U.S. Appl. No. 17/950,795, 28 pages.
Office Action, dated Jan. 19, 2023, received in Australian Patent Application No. 2020356572, 3 pages.
Office Action, dated Oct. 13, 2023, received in Australian Patent Application No. 2020356572, 3 pages.
Final Office Action, dated Jan. 29, 2024, received in Japanese Patent Application No. 2022-515137, which corresponds with U.S. Appl. No. 17/030,219, 6 pages.
Office Action, dated May 31, 2024, received in U.S. Appl. No. 17/950,035, 7 pages.
Certificate of Grant, dated May 9, 2024, received in Australian Patent Application No. 2020356572, 3 pages.
Notice of Allowance, dated Aug. 2, 2024, received in Japanese Patent Application No. 2022-515137, which corresponds with U.S. Appl. No. 17/030,219, 2 pages.
Final Office Action, dated Aug. 29, 2024, received in U.S. Appl. No. 17/950,795, 31 pages.
Invitation to Pay Additional Fees, dated Sep. 12, 2024, received in International Patent Application No. PCT/US2024/025058, which corresponds with U.S. Appl. No. 18/639,759, 11 pages.

* cited by examiner

8000

8002 Display a virtual object with a first spatial location in a three-dimensional environment.

8004 While displaying the virtual object with the first spatial location in the three-dimensional environment, detect a first hand movement performed by a user.

8006 In response to detecting the first hand movement performed by the user:
    in accordance with a determination that the first hand movement meets first gesture criteria, perform a first operation in accordance with the first hand movement, without moving the virtual object away from the first spatial location; and
    in accordance with a determination that the first hand movement meets second gesture criteria, display a first visual indication that the virtual object has transitioned into a reconfiguration mode.

8008 While displaying the virtual object with the first visual indication that the virtual object has transitioned into the reconfiguration mode, detect a second hand movement performed by the user.

8010 In response to detecting the second hand movement performed by the user:
    in accordance with a determination that the second hand movement meets the first gesture criteria, move the virtual object from the first spatial location to a second spatial location in accordance with the second hand movement.

9002 Display, via the display generation component, a three-dimensional scene that includes at least a first virtual object at a first location and a first physical surface at a second location that is separate from the first location, wherein the virtual object is displayed with a first value for a first display property that corresponds to a first portion of the virtual object and a second value for the first display property that corresponds to a second portion of the virtual object, the second value of the first display property being distinct from the first value of the first display property.

9004 While displaying the three-dimensional scene including the first virtual object and the first physical surface, generate, via the display generation component, a first visual effect at the second location of the three-dimensional scene, wherein generating the first visual effect includes:

modifying a visual appearance of a first portion of the first physical surface in the three-dimensional scene in accordance with the first value for the first display property that corresponds to the first portion of the first virtual object; and modifying a visual appearance of a second portion of the first physical surface in the three-dimensional scene in accordance with the second value for the first display property that corresponds to the second portion of the first virtual object, wherein the visual appearance of the first portion of the first physical surface and the visual appearance for the second portion of the first physical surface are modified differently due to differences in the first value and the second value of the first display property in the first and second portions of the first virtual object.

10002 Display, via the display generation component, a three-dimensional scene, the three-dimensional scene includes a first set of physical elements and a first quantity of virtual elements, wherein the first set of physical elements includes at least physical elements corresponding a first class of physical objects and physical elements corresponding to a second class of physical objects.

10004 While displaying the three-dimensional scene with the first quantity of virtual elements via the display generation component, detect a sequence of two or more user inputs.

10006 In response to detecting consecutive user inputs of the sequence of two or more user inputs, successively increase a quantity of virtual elements displayed in the three-dimensional scene in accordance with the consecutive inputs of sequence of two or more user inputs, including:

in response to detecting a first user input of the sequence of two or more user inputs, and in accordance with a determination that the first user input meets first criteria, display the three-dimensional scene with at least a first subset of the first set of one or more physical elements and a second quantity of virtual elements, the second quantity of virtual elements occupying a greater portion of the three-dimensional scene than the first quantity of virtual elements, including a first portion of the three-dimensional scene that was occupied by a first class of physical elements prior to detection of the first user input; and in response to detecting a second user input of the sequence of two or more user inputs, and in accordance with a determination that the second user input follows the first user input and meets the first criteria, displaying the three-dimensional scene with at least a second subset of the first set of one or more physical elements and a third quantity of virtual elements, the third quantity of virtual elements occupying a greater portion of the three-dimensional scene than the second quantity of virtual elements, including the first portion of the three-dimensional scene that was occupied by the first class of physical elements prior to detection of the first user input and a second portion of the three-dimensional scene that was occupied by a second class of physical elements prior to detection of the second user input.

11002 Display, via the display generation component, a three-dimensional scene, the three-dimensional scene includes at least a first physical object or representation thereof, wherein the first physical object has at least a first physical surface and wherein a respective location of the first physical object or representations thereof in the three-dimensional scene corresponds to a respective location of the first physical object in a physical environment surrounding the display generation component.

11004 While displaying the three-dimensional scene, detect that first interaction criteria are met, wherein the first interaction criteria include a first criterion that is met when a first level of user interaction between a user and the first physical object is detected.

11006 In response to detecting that the first interaction criteria are met, display, via the display generation component, a first user interface at a location that corresponds to a location of the first physical surface of the first physical object in the three-dimensional scene.

11008 While displaying the first user interface at the location that corresponds to the location of the first physical surface of the first physical object or representation thereof in the three-dimensional scene, detect that second interaction criteria are met, wherein the second interaction criteria includes a second criterion that is met when a second level of user interaction, greater than the first level of user interaction between the user and the first physical object, is detected.

11010 In response to detecting that the second interaction criteria are met, replace display of the first user interface with display of a second user interface at the location that corresponds to the location of the first physical surface of the first physical object or representation thereof in the three-dimensional scene .

12002 Display, via the display generation component, a three-dimensional scene, the three-dimensional scene includes at least a first physical object having a first physical surface and at least a first virtual object having a first virtual surface.

12004 While displaying the three-dimensional scene including the first physical object and the first virtual object, detect a request to activate a voice-based virtual assistant.

12006 In response to detecting the request to activate the voice-based virtual assistant:
    activate the voice-based virtual assistant configured to receive voice commands;
    display a visual representation of the voice-based virtual assistant in the three-dimensional scene, including displaying the visual representation of the voice-based virtual assistant with a first set of values for a first display property of the visual representation; and
    modify a visual appearance of at least a portion of the first physical surface of the first physical object and at least a portion of the first virtual surface of the first virtual object in accordance with the first set of values for the first display property of the visual representation of the voice-based virtual assistant.

Figure 12

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Patent Application No. 62/907,614, filed Sep. 28, 2019, which is hereby incorporated by reference in its entirety.

TECHNICAL FIELD

This disclosure relates generally to computer systems with a display generation component and one or more input devices that provide computer generated experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface.

There is a need for electronic devices with improved methods and interfaces for generating a computer-generated environment. Such methods and interfaces may complement or replace conventional methods for generating a computer-generated environment. Such methods and interfaces produce a more efficient human-machine interface and allow the user more control of the device, allow the user to use the device with better safety, reduced cognitive burden, and improved user experience.

In accordance with some embodiments, a method is performed at a computer system including a display generation component and one or more input devices, including: displaying a virtual object with a first spatial location in a three-dimensional environment; while displaying the virtual object with the first spatial location in the three-dimensional environment, detecting a first hand movement performed by a user; in response to detecting the first hand movement performed by the user: in accordance with a determination that the first hand movement meets first gesture criteria, performing a first operation in accordance with the first hand movement, without moving the virtual object away from the first spatial location; and in accordance with a determination that the first hand movement meets second gesture criteria, displaying a first visual indication that the virtual object has transitioned into a reconfiguration mode; while displaying the virtual object with the first visual indication that the virtual object has transitioned into the reconfiguration mode, detecting a second hand movement performed by the user; in response to detecting the second hand movement performed by the user: in accordance with a determination that the second hand movement meets the first gesture criteria, moving the virtual object from the first spatial location to a second spatial location in accordance with the second hand movement.

In accordance with some embodiments, a method is performed at a computer system including a display generation component and one or more input devices, including: displaying, via the display generation component, a three-dimensional scene that includes at least a first virtual object at a first location and a first physical surface at a second location that is separate from the first location, wherein the first virtual object is displayed with a first value for a first display property that corresponds to a first portion of the first virtual object and a second value for the first display property that corresponds to a second portion of the first virtual object, the second value of the first display property being distinct from the first value of the first display property; and while displaying the three-dimensional scene including the first virtual object and the first physical surface, generating, via the display generation component, a first visual effect at the second location of the three-dimensional scene, wherein generating the first visual effect includes: modifying a visual appearance of a first portion of the first physical surface in the three-dimensional scene in accordance with the first value for the first display property that corresponds to the first portion of the first virtual object; and modifying a visual appearance of a second portion of the first physical surface in the three-dimensional scene in accordance with the second value for the first display property that corresponds to the second portion of the first virtual object, wherein the visual appearance of the first portion of the first physical surface and the visual appearance for the second portion of the first physical surface are modified differently due to differences in the first value and the second value of the first display property in the first and second portions of the first virtual object.

In accordance with some embodiments, a method is performed at a computer system including a display generation component and one or more input devices, including: displaying, via the display generation component, a three-dimensional scene, the three-dimensional scene includes a first set of physical elements and a first quantity of virtual elements, wherein the first set of physical elements includes at least physical elements corresponding a first class of physical objects and physical elements corresponding to a second class of physical objects; while displaying the three-dimensional scene with the first quantity of virtual elements via the display generation component, detecting a sequence of two or more user inputs; and in response to detecting consecutive user inputs of the sequence of two or more user inputs, successively increasing a quantity of virtual elements displayed in the three-dimensional scene in accordance with the consecutive inputs of sequence of two or more user inputs, including: in response to detecting a first user input of the sequence of two or more user inputs, and in accordance with a determination that the first user input meets first criteria, displaying the three-dimensional scene with at least a first subset of the first set of one or more physical elements and a second quantity of virtual elements, the second quantity of virtual elements occupying a greater portion of the three-dimensional scene than the first quantity of virtual elements, including a first portion of the three-dimensional scene that was occupied by a first class of physical elements prior to detection of the first user input; and in response to detecting a second user input of the sequence of two or more user inputs, and in accordance with a determination that the second user input follows the first user input and meets the first criteria, displaying the three-dimensional scene with at least a second subset of the first set of one or more physical elements and a third quantity of virtual elements, the third quantity of virtual elements occupying a greater portion of the three-dimensional scene than the second quantity of virtual elements, including the first portion of the three-dimensional scene that was occupied by the first class of physical elements prior to detection of the first user input and a second portion of the three-dimensional scene that was occupied by a second class of physical elements prior to detection of the second user input.

In accordance with some embodiments, a method is performed at a computer system including a display generation component and one or more input devices, comprising: displaying, via the display generation component, a three-dimensional scene, the three-dimensional scene includes at least a first physical object or representation thereof, wherein the first physical object has at least a first physical surface and wherein a respective location of the first physical object or representations thereof in the three-dimensional scene corresponds to a respective location of the first physical object in a physical environment surrounding the display generation component; while displaying the three-dimensional scene, detecting that first interaction criteria are met, wherein the first interaction criteria include a first criterion that is met when a first level of user interaction between a user and the first physical object is detected; in response to detecting that the first interaction criteria are met, displaying, via the display generation component, a first user interface at a location that corresponds to a location of the first physical surface of the first physical object in the three-dimensional scene; while displaying the first user interface at the location that corresponds to the location of the first physical surface of the first physical object or representation thereof in the three-dimensional scene, detecting that second interaction criteria are met, wherein the second interaction criteria includes a second criterion that is met when a second level of user interaction, greater than the first level of user interaction between the user and the first physical object, is detected; and in response to detecting that the second interaction criteria are met, replacing display of the first user interface with display of a second user interface at the location that corresponds to the location of the first physical surface of the first physical object or representation thereof in the three-dimensional scene.

In accordance with some embodiments, a method is performed at a computer system including a display generation component and one or more input devices, comprising: displaying, via a display generation component, a three-dimensional scene, the three-dimensional scene includes at least a first physical object having a first physical surface and at least a first virtual object having a first virtual surface; while displaying the three-dimensional scene including the first physical object and the first virtual object, detecting a request to activate a voice-based virtual assistant; in response to detecting the request to activate the voice-based virtual assistant: activating the voice-based virtual assistant configured to receive voice commands; displaying a visual representation of the voice-based virtual assistant in the three-dimensional scene, including displaying the visual representation of the voice-based virtual assistant with a first set of values for a first display property of the visual representation; and modifying a visual appearance of at least a portion of the first physical surface of the first physical object and at least a portion of the first virtual surface of the first virtual object in accordance with the first set of values for the first display property of the visual representation of the voice-based virtual assistant.

In accordance with some embodiments, a computer system includes a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's user of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 8 is a flowchart of a method of interacting with a computer-generated three-dimensional environment (e.g., including reconfiguration and other interactions), in accordance with some embodiments.

FIG. 9 is a flowchart of a method of generating a computer-generated three-dimensional environment (e.g., including simulating visual interplay between physical and virtual objects), in accordance with some embodiments.

FIG. 10 is a flowchart of a method of generating a computer-generated three-dimensional environment and facilitating user interaction with the three-dimensional environment (e.g., including gradually adjusting a level of immersiveness of the computer-generated experience based on user inputs), in accordance with some embodiments.

FIG. 11 is a flowchart of a method of facilitating user interaction with a computer-generated environment (e.g., utilizing interactions with physical surfaces to control devices or interact with the computer-generated environment), in accordance with some embodiments.

FIG. 12 is a flowchart of a method of generating a computer-generated three-dimensional environment (e.g., including simulating visual interplay between a voice-based virtual assistant and physical and virtual objects in the environment), in accordance with some embodiments.

DESCRIPTION OF EMBODIMENTS

Figure 1:
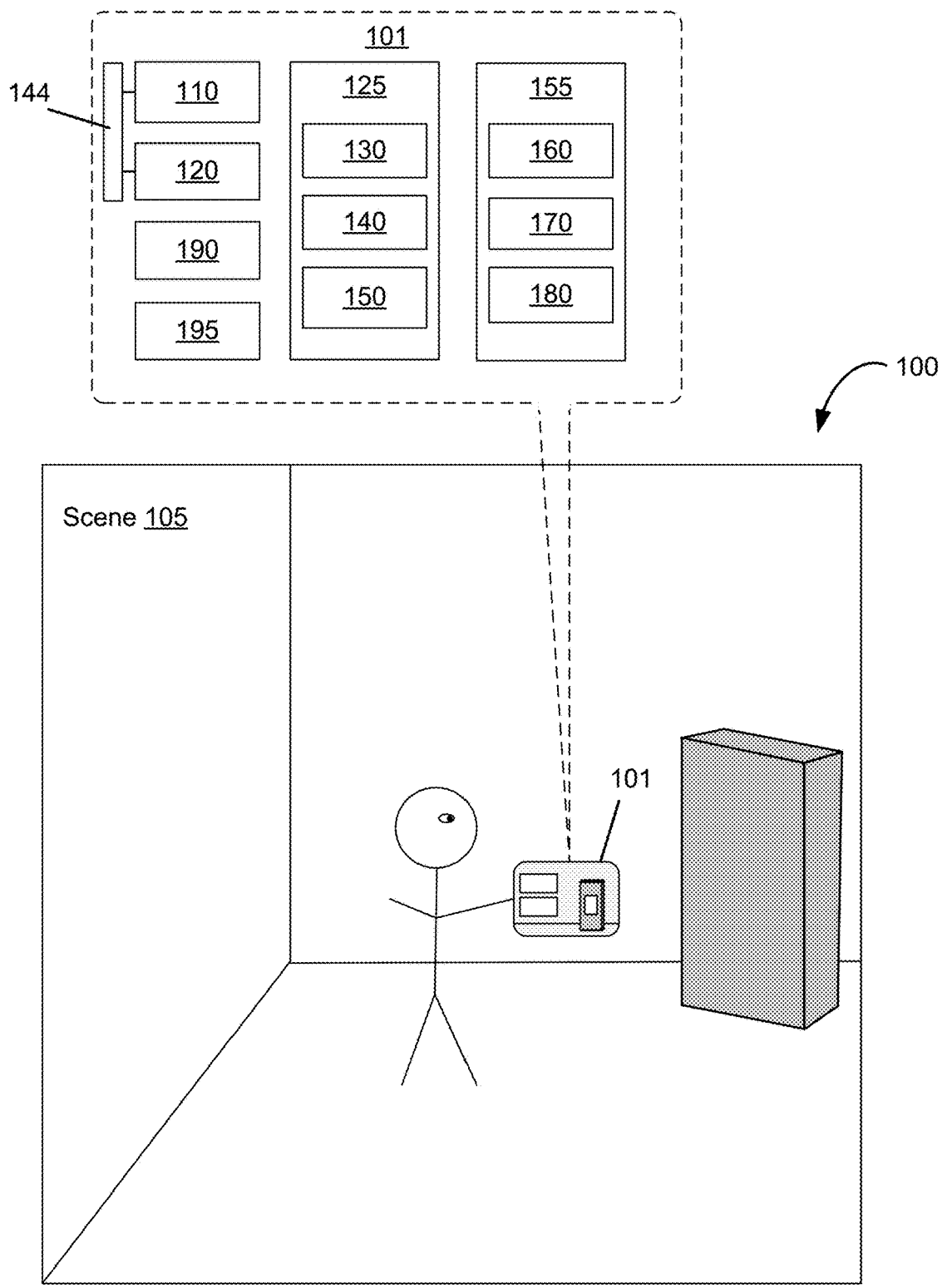
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, a computer system allows a user to interact with a virtual object in a computer-generated three-dimensional environment by using various gesture inputs. A first predefined gesture (e.g., a swipe gesture, a tap gesture, a pinch and drag gesture, etc.) causes the computer-system to perform a first operation corresponding to the virtual object, while the same predefined gesture causes the computer system to move the virtual object within the computer-generated three-dimensional environment from one location to another location when it is combined with (e.g., immediately succeeding, concurrently with, or after the completion of) a special modifier gesture (e.g., a reconfiguration gesture). Specifically, in some embodiments, a predefined reconfiguration gesture causes a virtual object to enter into a reconfiguration mode. While in the reconfiguration mode, the object is moved from one location to another location in the computer-generated environment in response to a first respective gesture that is configured to trigger a first type of interaction with the virtual object (e.g., to activate, navigate within, or rotate the virtual object) when the virtual object is not in the reconfiguration mode. In some embodiments, the reconfiguration gesture is not a portion of the gesture that moves the virtual object; and the virtual object optionally remains in the reconfiguration mode after having entered the reconfiguration mode in response to detection of the reconfiguration gesture earlier. While the virtual object is in the reconfiguration mode, the computer system optionally responds to other gesture inputs directed to the computer-generated environment without causing the virtual object to exit the reconfiguration mode. The computer system moves the virtual object in accordance with the first respective gesture that is also configured to trigger the first type of interaction with the virtual object when the virtual object is not in the reconfiguration mode. Visual indication of the virtual object entering and remaining in the reconfiguration mode is provided to help the user understand the internal status of the computer-generated environment and the virtual object, and provide proper inputs to achieve a desired outcome. Using a special reconfiguration gesture to cause a virtual object to enter a reconfiguration mode, utilizing a gesture that normally triggers another operation to reconfigure the environment and move the virtual object, and providing a visual indication of the virtual object entering and remaining in the reconfiguration mode in response to the special reconfiguration gesture reduce the number, extent, and/or the nature of the inputs from a user and produce a more efficient human-machine interface.

In some embodiments, a computer system generates a three-dimensional environment that includes both physical objects (e.g., appearing in the three-dimensional environment through a transparent or semi-transparent portion of a display generation component, or in a camera view of a physical environment) and virtual objects (e.g., user interface objects, computer-generated virtual objects that simulate physical objects, and/or objects that do not have a physical analog in the real world). The computer system generates simulated visual interplay between the virtual objects and the physical objects in accordance with simulated physical laws for light propagation. Specifically, the light emanating from a virtual object (e.g., including luminance, color, hue, time variations, spatial patterns, etc.) appears to illuminate both the physical objects and virtual objects in its environment. The computer system generates simulated illuminations and shadows in different portions of physical surfaces and different portions of virtual surfaces that are caused by the virtual light emanating from the virtual object. The illuminations and shadows are generated taking into account of physical laws of light propagation, as well as the spatial locations of the virtual object relative to other physical surfaces and virtual surfaces within the environment, the simulated physical characteristics (e.g., surface texture, optical properties, shapes, and dimensions, etc.) of the virtual surfaces, and the actual physical characteristics (e.g., surface texture, optical properties, shapes, and dimensions, etc.) of the physical surfaces. The light emanating from different portions of the virtual object affects different portions of other virtual objects and different portions of other physical objects in the environment differently because of the differences in their locations and physical characteristics. By generating realistic and detailed visual interplay between virtual objects and physical objects and making the virtual objects and physical objects respond similarly to illuminations from a virtual object, the computer system can make the three-dimensional environment more realistic, which helps the user better orient him/herself in the computer-generated three-dimensional environment and reduces user mistakes when the user interacts with the computer-generated three-dimensional environment.

In some embodiments, the user provides a sequence of two or more predefined inputs to cause the computer system to successively increase the level of immersiveness of a computer-generated experience provided by the computer system. When a user places a display generation component of the computer system in a predefined position relative to the user (e.g., putting a display in front of his/her eyes, or putting a head-mounted device on his/her head), the user's view of the real world is blocked by the display generation component, and the content presented by the display generation component dominates the user's view. Sometimes, the user benefits from a more gradual and controlled process for transitioning from the real world into the computer-generated experiences. As such, when displaying content to the user through the display generation component, the computer system displays a pass-through portion that includes a representation of at least a portion of the real world surrounding the user, and gradually increase the quantity of virtual elements that replace the physical elements visible through the display generation component. Specifically, in response to each consecutive input of the sequence of two or more user inputs, a different class of physical elements are removed from view and replaced by newly displayed virtual elements (e.g., expanding of existing virtual elements or newly added virtual elements). The staged transition in and out of the immersive environment as controlled by the user's input is intuitive and natural to the user, and improves the user's experience and comfort when using the computer system for computer-generated immersive experiences. Dividing the physical elements into different classes of physical elements that are replaced as a whole in response to a respective input reduces the total number of user input needed to transition into a more and more immersive computer-generated environment, while allowing user control over the multiple graduated transitions.

In some embodiments, when a computer system displays a three-dimensional environment that includes a physical object (e.g., the physical object is visible through the display generation component (e.g., visible through a transparent pass-through portion of the display generation component, in a camera view of a physical environment shown by the display generation component, or as a virtual representation of the physical object in a simulated reality environment rendered by the display generation component)). The physical object has a physical surface (e.g., a planar surface, or smooth surface). When the level of interaction between the physical object and the user is at a first predefined level, the computer system displays a first user interface at a location that corresponds to the location of the physical object in the three-dimensional environment (e.g., such that the first user interface appears to be overlaid or standing on the physical surface). When the level of interaction between the physical object and the user is at a second level, e.g., higher than the first level of interaction, the computer system displays a second user interface that replaces the first user interface at the location that corresponds to the location of the physical object in the three-dimensional environment (e.g., such that the second user interface appears to be overlaid or standing on the physical surface). The second user interface provides more information and/or functions associated with the physical object than the first user interface. The computer system allows the user to interact with the first and second user interfaces using various means to receive information and control the first physical object. This technique allows the user to interact with a physical object with the aid of more information and control that is provided at a location in the computer-generated environment. The location of interaction in the computer-generated environment corresponds to the physical location of the physical object in the real world. By adjusting the amount of information and level of control (e.g., provided in the different user interfaces) in accordance with the detected level of interaction between the user and the physical object, the computer system does not unnecessarily provide information or clutter the computer-generated three-dimensional environment, and thereby reducing user confusion and user mistakes when the user interacts with the computer-generated environment. This technique also allows the user to utilize a physical surface nearby to control the physical object remotely, in accordance with some embodiments. In some embodiments, the user may control a physical object or gain information about the physical object from afar, making the user's interaction with the physical object and/or the three-dimensional environment more efficient.

In some embodiments, a computer system generates a three-dimensional environment that includes both physical objects (e.g., appearing in the three-dimensional environment through a transparent or semi-transparent portion of a display generation component, or in a camera view of a physical environment) and virtual objects (e.g., user interface objects, computer-generated virtual objects that simulate physical objects, and/or objects that do not have a physical analog in the real world). The computer-system also provides a voice-based virtual assistant. When the voice-based virtual assistant is activated, the computer system displays a visual representation of the activated virtual assistant. The computer system also modifies the appearance of the physical objects and virtual object in the environment, and sometimes the background of the visual field of the user or the peripheral region of the screen, in accordance with the values of the display properties of the visual representation of the virtual assistant. Specifically, the light emanating from the visual representation of the virtual assistant (e.g., including luminance, color, hue, time variations, spatial patterns, etc.) appears to illuminate both the physical objects and virtual objects in its environment, and optionally the background of the visual field of the user or the peripheral region of the screen. The computer system generates simulated illuminations and shadows in different portions of physical surfaces and different portions of virtual surfaces that are caused by the virtual light emanating from the visual representation of the virtual assistant. The illuminations and shadows are generated taking into account of physical laws of light propagation, as well as the spatial locations of the visual representation of the virtual assistant relative to other physical surfaces and virtual surfaces within the computer-generated environment, the simulated physical characteristics (e.g., surface texture, optical properties, shapes, and dimensions, etc.) of the virtual surfaces, and the actual physical characteristics (e.g., surface texture, optical properties, shapes, and dimensions, etc.) of the physical surfaces. The lighting effect associated with the virtual assistant provides continuous and dynamic feedback to the user regarding the state of the voice-based virtual assistant (e.g., active, or dormant, listening, and/or responding). By generating realistic and detailed visual interplay between visual representation of the virtual assistant with other virtual objects and physical objects in the computer-generated environment, the computer system can make the computer-generated three-dimensional environment more realistic and informative, which helps the user better orient him/herself in the computer-generated three-dimensional environment and reduces user mistakes when the user interacts with the computer-generated three-dimensional environment.

FIGS. 1-6 provide a description of example computer systems for providing CGR experiences to users. FIGS. 7A-7B are block diagrams illustrating user interactions with a computer-generated three-dimensional environment (e.g., including reconfiguration and other interactions), in accordance with some embodiments. FIGS. 7C-7F are block diagrams illustrating methods for generating a computer-generated three-dimensional environment (e.g., including simulating visual interplay between physical and virtual objects), in accordance with some embodiments. FIGS. 7G-7L are block diagrams illustrating methods for generating a computer-generated three-dimensional environment and facilitating user interaction with the three-dimensional environment (e.g., including gradually adjusting a level of immersiveness of the computer-generated experience based on user inputs), in accordance with some embodiments. FIGS. 7M-7R are block diagrams illustrating methods for facilitating user interaction with a computer-generated environment (e.g., utilizing interactions with physical surfaces to control devices or interact with the computer-generated environment), in accordance with some embodiments. FIGS. 7S-7X are block diagrams illustrating methods for generating a computer-generated three-dimensional environment (e.g., including simulating visual interplay between a voice-based virtual assistant and physical and virtual objects in the environment), in accordance with some embodiments. FIG. 8 is a flowchart of a method of interacting with a computer-generated three-dimensional environment (e.g., including reconfiguration and other interactions), in accordance with some embodiments. FIG. 9 is a flowchart of a method of generating a computer-generated three-dimensional environment (e.g., including simulating visual interplay between physical and virtual objects), in accordance with some embodiments. FIG. 10 is a flowchart of a method of generating a computer-generated three-dimensional environment and facilitating user interaction with the three-dimensional environment (e.g., including gradually adjusting a level of immersiveness of the computer-generated experience based on user inputs), in accordance with some embodiments. FIG. 11 is a flowchart of a method of facilitating user interaction with a computer-generated environment (e.g., utilizing interactions with physical surfaces to control devices or interact with the computer-generated environment), in accordance with some embodiments. FIG. 12 is a flowchart of a method of generating a computer-generated three-dimensional environment (e.g., including simulating visual interplay between a voice-based virtual assistant and physical and virtual objects in the environment), in accordance with some embodiments. The user interfaces in FIGS. 7A-7X are used to illustrate the processes in FIGS. 8-12, respectively.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof).

For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
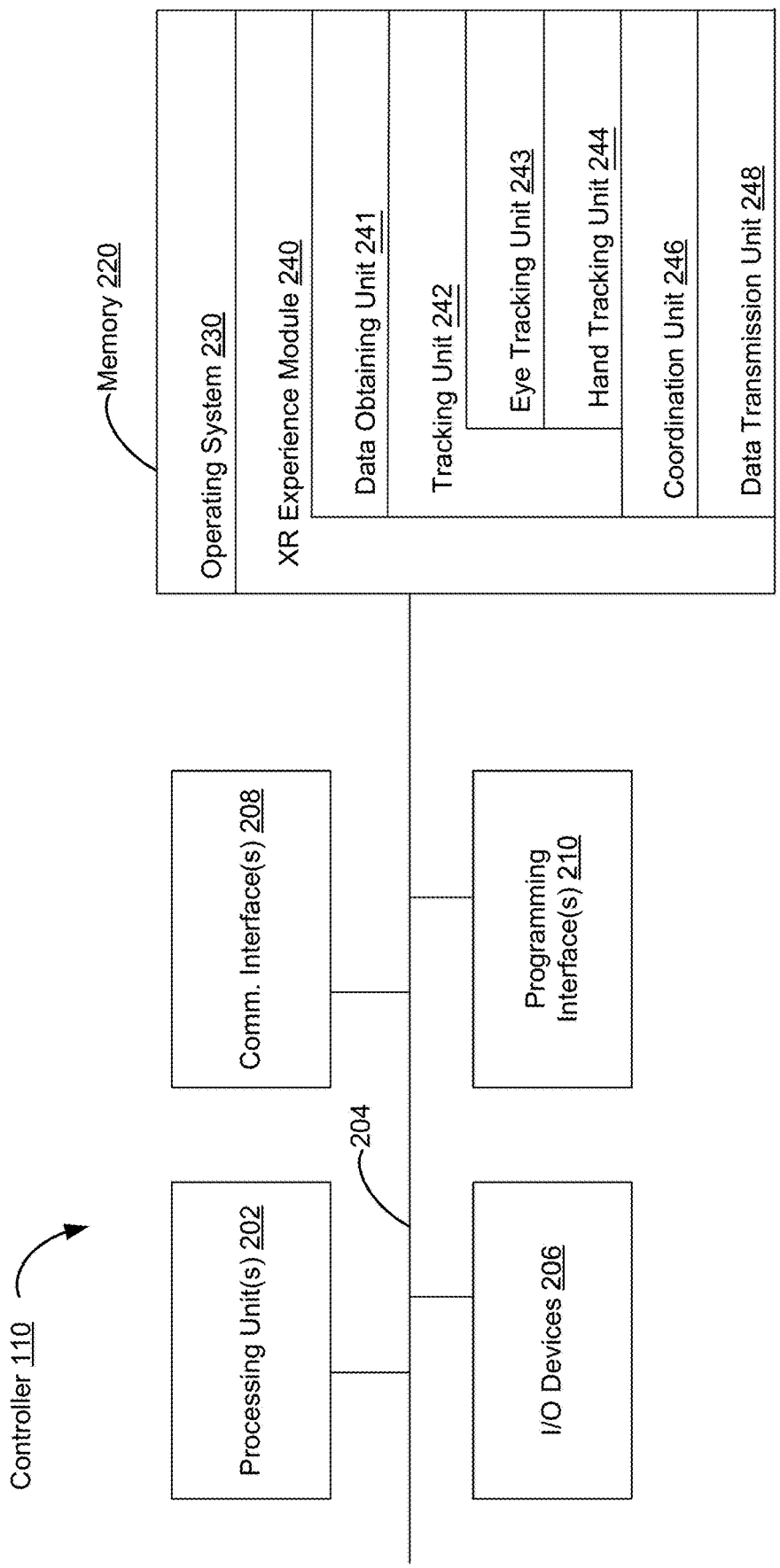
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 243 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 241 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
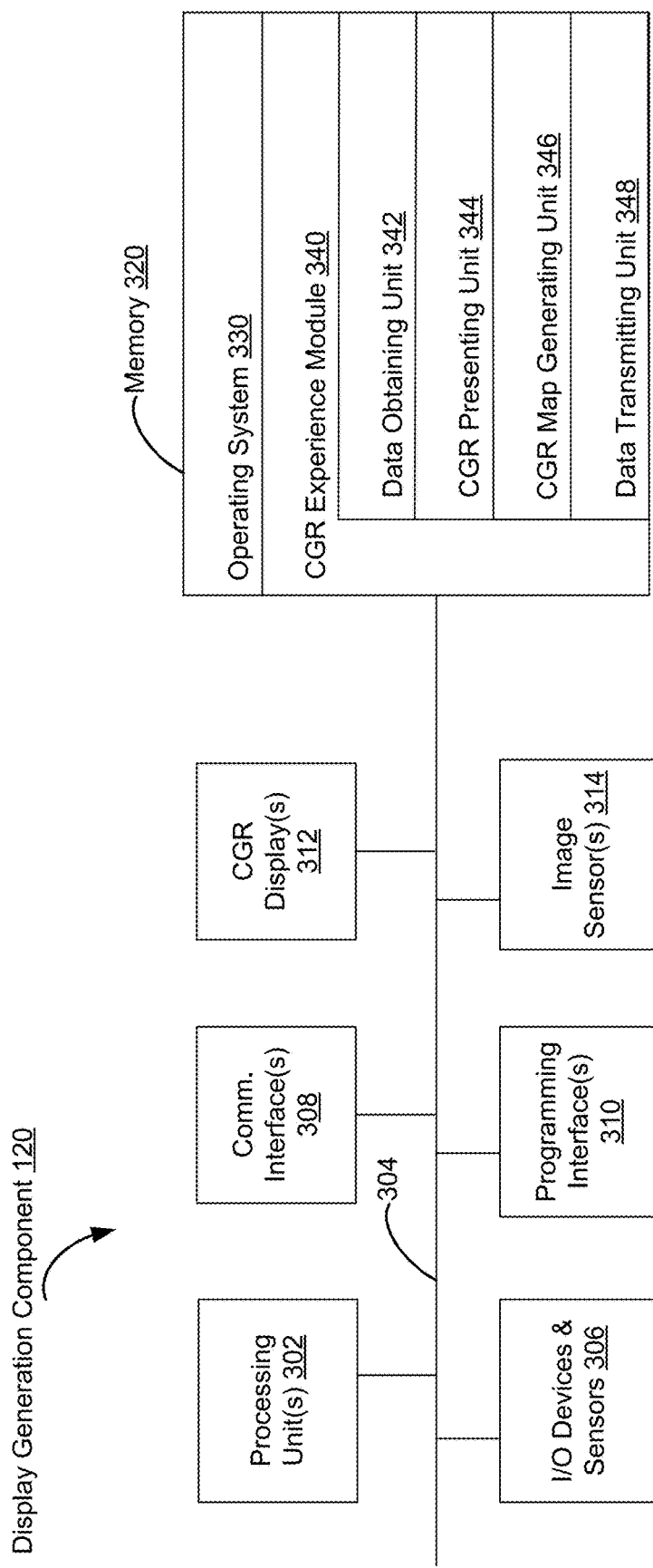
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
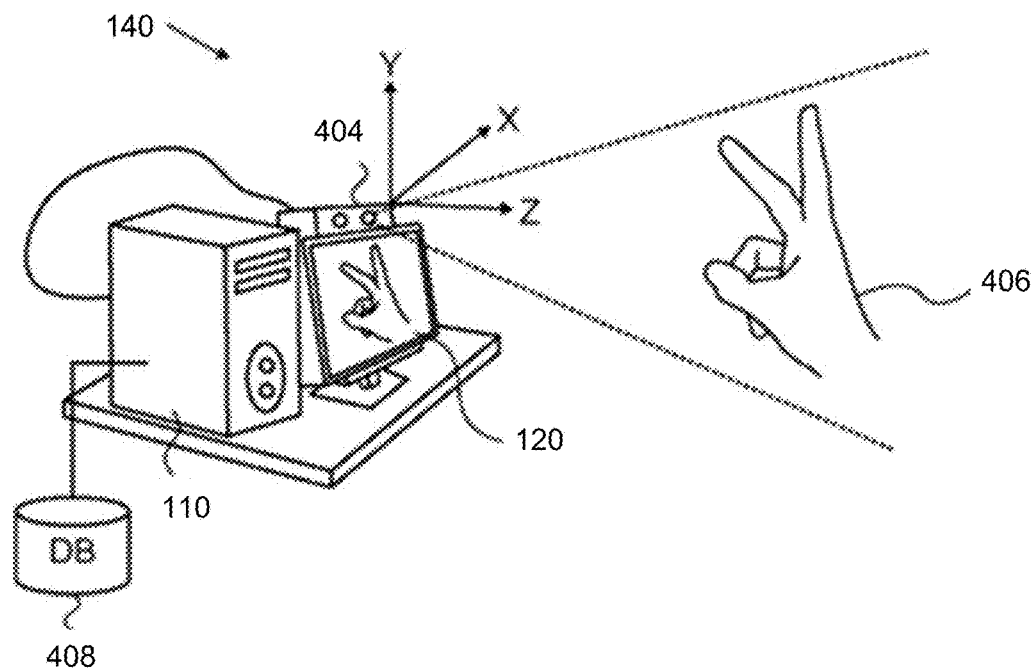
FIG. 4 is a block diagram illustrating a hand tracking unit of a computer system that is configured to capture gesture inputs of the user in accordance with some embodiments.
Figure 4:
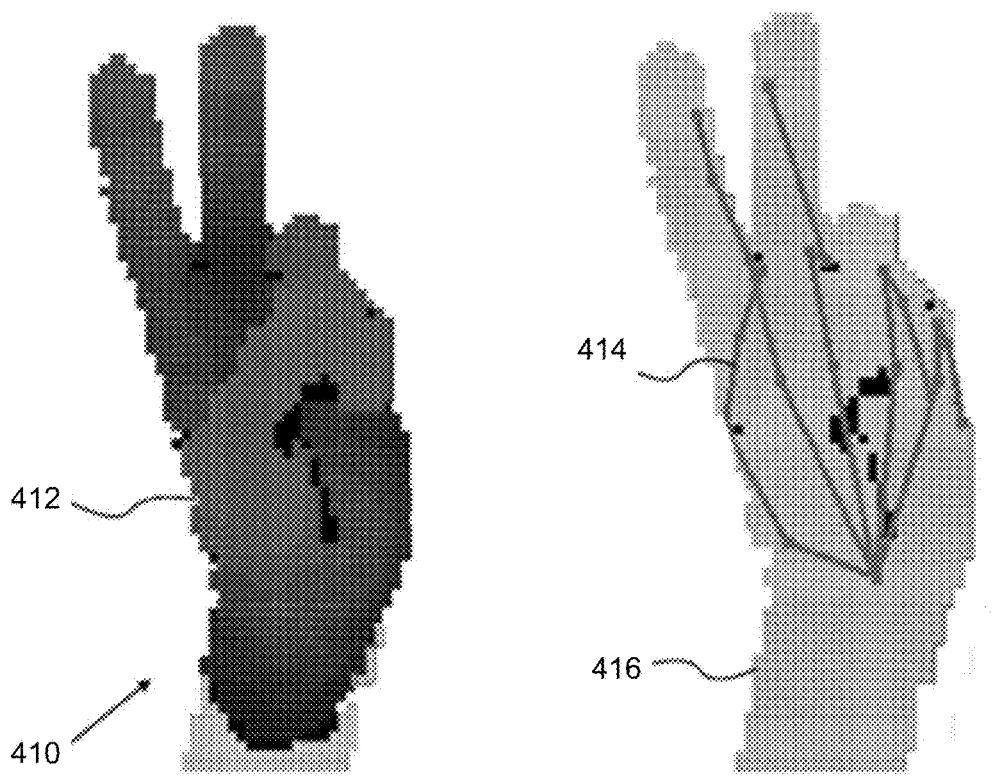

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 140 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the hand tracking device 140 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
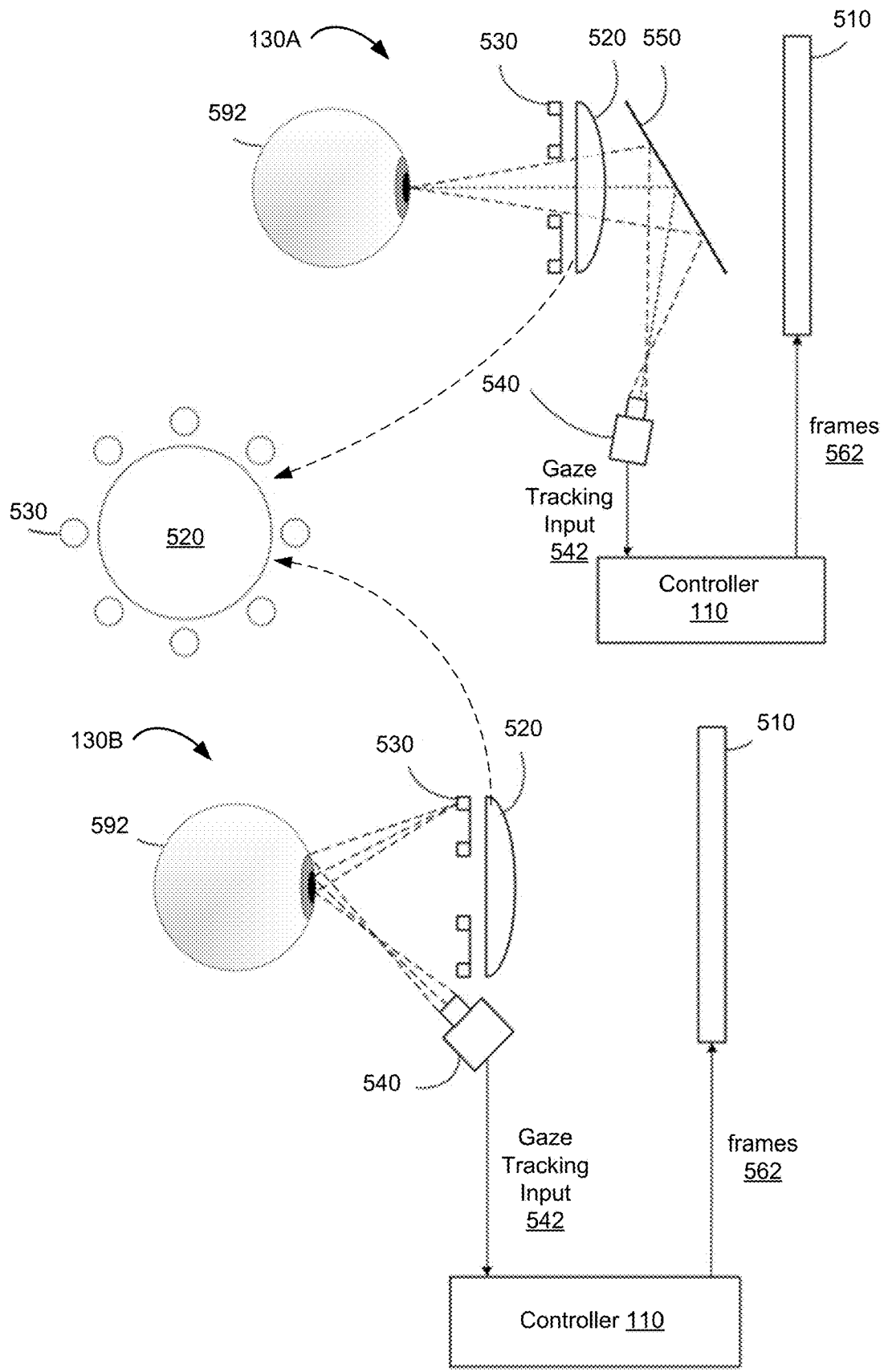
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
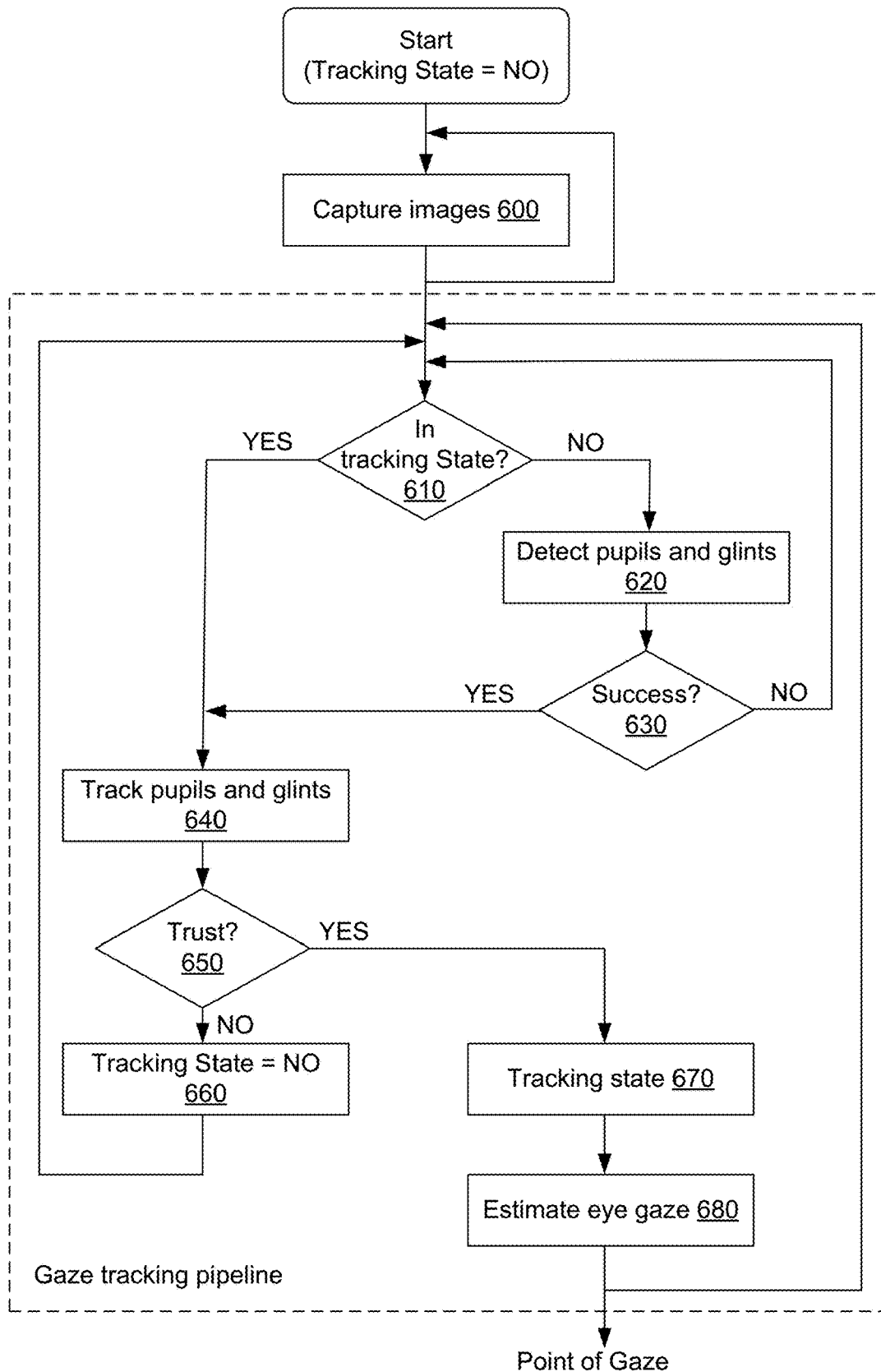
FIG. 6 is a flowchart illustrating a glint-assisted gaze tracking pipeline in accordance with some embodiments.
Figure 7A:
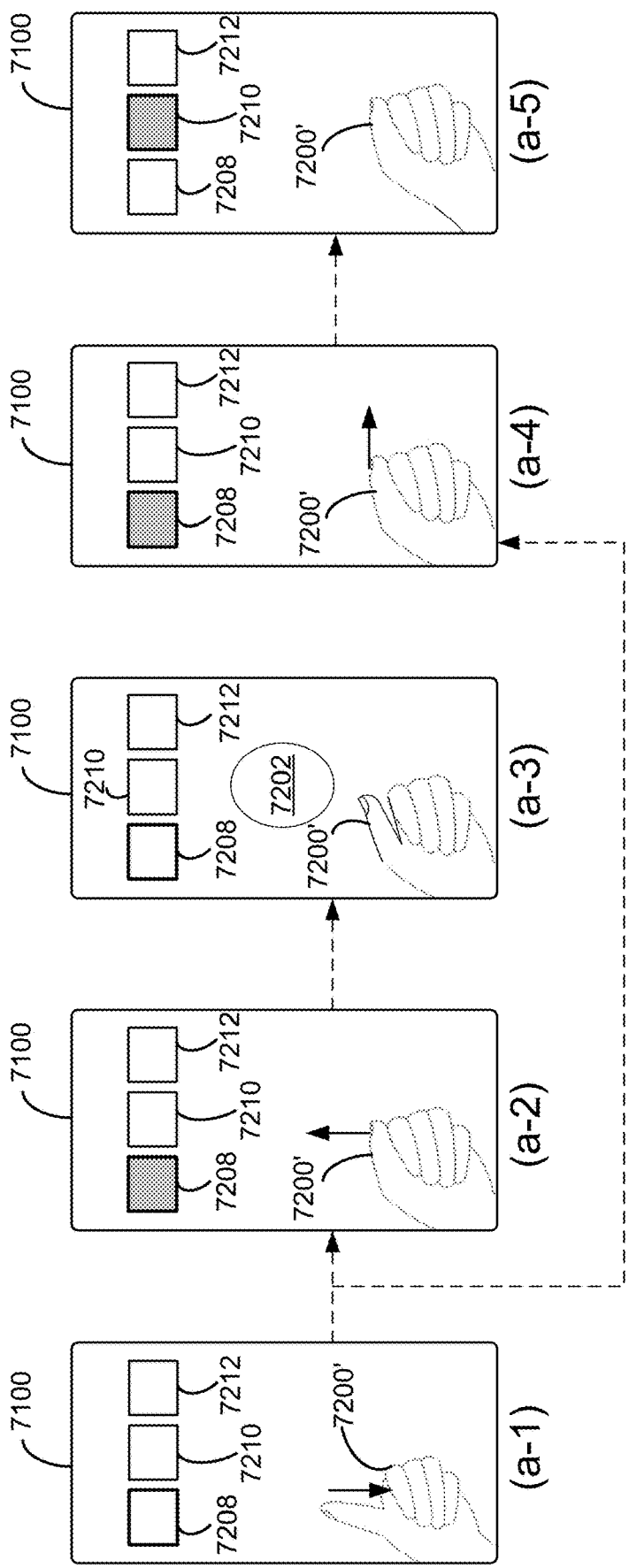
FIGS. 7A-7B are block diagrams illustrating user interactions with a computer-generated three-dimensional environment (e.g., including reconfiguration and other interactions), in accordance with some embodiments.
Figure 7B:
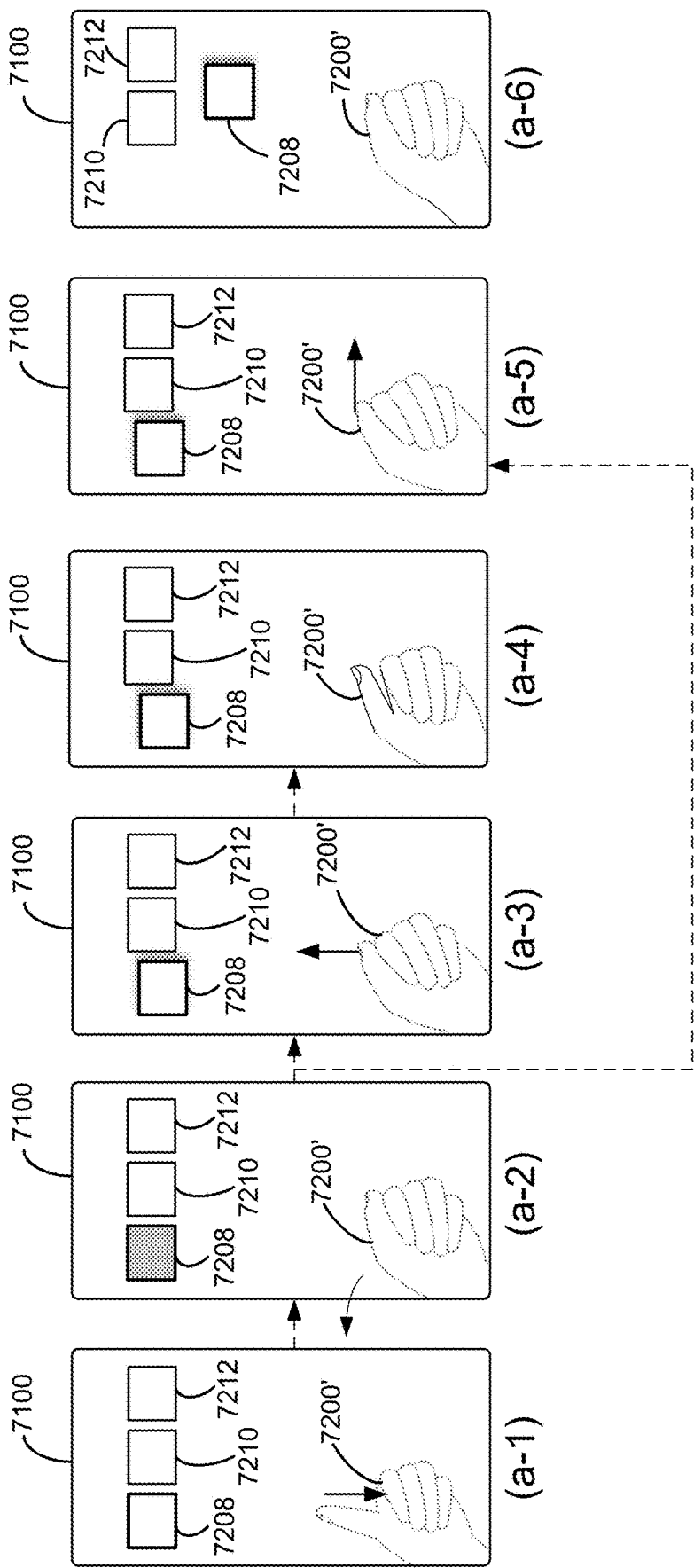

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and, at 660, the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7B are block diagrams illustrating user interactions with a computer-generated three-dimensional environment (e.g., including reconfiguration and other interactions), in accordance with some embodiments. FIGS. 7A-7B are used to illustrate the processes described below, including the processes in FIG. 8.

In some embodiments, the input gestures described with regard to FIGS. 7A-7B are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 as illustrated in FIGS. 7A-7B or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200, as described with regard to FIGS. 7A-7B), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a plurality of user interface objects 7208, 7210, and 7212 (e.g., in a menu or dock, or independent of one another) are displayed in a computer-generated three-dimensional environment (e.g., a virtual environment, or a mixed reality environment). The plurality of user interface objects optionally are displayed floating in space or over a physical object in the three-dimensional environment. Each of the user interface object optionally has one or more corresponding operations that can be performed within the three-dimensional environment or causing an effect in a physical environment that is in communication with the computer system (e.g., controlling another device (e.g., a speaker or smart lamp) that is in communication with device 7100). In some embodiments, user interface objects 7208, 7210, and 7212 are displayed by a display of a computer system (e.g., device 7100 (FIGS. 7A-7B) or an HMD) with (e.g., overlaying or replacing) at least a portion of a view of a physical environment captured by one or more rear-facing cameras of the computer system (e.g., device 7100). In some embodiments, user interface objects 7208, 7210, and 7212 are displayed on a transparent or semi-transparent display of a computer system (e.g., a heads up display, or an HMD) through which the physical environment is visible. In some embodiments, user interface objects 7208, 7210, and 7212 are displayed in a user interface that includes a pass-through portion (e.g., a transparent or semi-transparent portion through which the physical surrounding is visible, or a portion that displays a camera view of the surrounding physical environment) surrounded by virtual content. In some embodiments, user interface objects 7208, 7210, and 7212 are displayed in a virtual reality environment (e.g., hovering in virtual space, or overlaying a virtual surface).

In some embodiments, a representation of hand 7200 is visible in the virtual reality environment (e.g., an image of hand 7200 captured by one or more cameras is rendered in the virtual reality setting). In some embodiments, a representation 7200' of hand 7200 (e.g., a cartoon version of hand 7200) is rendered in the virtual reality setting. In some embodiments, hand 7200 or representation thereof is not visible in (e.g., is omitted from) the virtual reality environment. In some embodiments, device 7100 (FIG. 7C) is not visible in the virtual reality environment (e.g., when the device 7100 is an HMD). In some embodiments, an image of device 7100 or a representation of device 7100 is visible in the virtual reality environment.

In some embodiments, one or more of user interface objects 7208, 7210, and 7212 are application launch icons (e.g., for performing an operation to launch a corresponding application, and an operation to display a quick action menu corresponding to a respective application, etc.). In some embodiments, one or more of user interface objects 7208, 7210, and 7212 are controls for performing respective operations within an application (e.g., increase volume, decrease volume, play, pause, fast-forward, rewind, initiate communication with a remote device, terminate communication with a remote device, transmit communication to a remote device, start game, etc.). In some embodiments, one or more of user interface objects 7208, 7210, and 7212 are respective representations (e.g., avatars) of users of remote devices (e.g., for performing an operation to initiate communication with the respective users of the remote devices). In some embodiments, one or more of user interface objects 7208, 7210, and 7212 are representations (e.g., thumbnails, two-dimensional images, or album covers) of media items (e.g., images, virtual objects, audio files, and/or video files). For example, activating a user interface object that is a representation of an image causes the image to be displayed (e.g., at a location that corresponds to a surface detected by one or more cameras and displayed in a computer-generated reality view (e.g., at a location that corresponds to a surface in a physical environment or at a location that corresponds to a surface displayed in virtual space). Navigating within a user interface object that is an album (e.g., a music album, a picture album, a flip book album, etc.) causes the currently played or displayed item to be switched to another item in the album.

As shown in FIG. 7A, two distinct operations are performed with respect to the user interface objects 7208, 7210, and 7212 in the three-dimensional environment in response to different types of gesture inputs provided by hand 7200, while the reconfiguration mode is not activated for any of the user interface objects.

In FIG. 7A(a-1) to FIG. 7A(a-3), the thumb of hand 7200 performs a tap gesture by moving down along the vertical-axis, touching down on the side of the index finger, and moving upward to lift away from the side of the index finger. The tap gesture is performed while a current selection indicator (e.g., a selector object or a movable visual effect such as highlighting of the object by an outline or change in appearance of the object) is located on user interface object 7208, indicating the currently selected status of user interface object 7208. In some embodiments, in response to detecting the tap input by hand 7200, the computer system (e.g., device 7100) performs a first operation (e.g., activating user interface object 7208) that causes display of a virtual object 7202 (e.g., as part of a user interface of an application represented by user interface object 7208, or as content represented by user interface object 7208, etc.). The visual appearance of user interface object 7208 indicates that the first operation is performed (e.g., it has been activated, but not moved).

In FIG. 7A(a-1) followed by FIG. 7A(a-4) to FIG. 7A(a-5), the hand 7200 performs a drag gesture by moving laterally after the thumb of the hand touches down on the side of the index finger. The drag gesture is performed while a current selection indicator (e.g., a selector object or a movable visual effect such as highlighting of the object by an outline or change in appearance of the object) is located on user interface object 7208, indicating the currently selected status of user interface object 7208. In some embodiments, in response to detecting the drag input by hand 7200, the computer system (e.g., device 7100) performs a second operation (e.g., navigating away from user interface object 7208 to user interface object 7210, or navigating within user interface object 7208, etc.) with respect to the user interface object 7208. The visual appearance of user interface object indicates that the second operation is performed (e.g., navigation within the content of the user interface object or away from the user interface object has occurred, but the object is not moved within the three-dimensional environment).

FIG. 7B illustrates scenarios that are in contrast to those shown in FIG. 7A, in that a reconfiguration gesture is performed (e.g., in combination with other gesture inputs (e.g., those gestures shown in FIG. 7A)), and as a result the three-dimensional environment is reconfigured (e.g., with movement of user interface object 7208 in the three-dimensional environment).

As shown in the sequence of FIGS. 7B(a-1)-7B(a-4), a wrist flick gesture is provided by hand 7200, while user interface object 7208 is in the currently selected state. In this example, the wrist flick gesture is the predefined reconfiguration gesture that causes the currently selected user interface object to enter a reconfiguration mode. In some embodiments, detecting the wrist flick gesture includes detecting touchdown of the thumb on the side of the index finger, followed by an upward rotation of the hand around the wrist. Optionally, at the end of the wrist flick gesture, the thumb is lifted away from the side of the index finger. In response to detecting the wrist flick gesture while user interface object 7208 is selected (e.g., by prior input, or by a gaze input focused on user interface object 7208), the computer system (e.g., device 7100) activates a reconfiguration mode of user interface object 7208. The computer system also displays visual indication that informs the user that user interface object 7208 is now in the reconfiguration mode. In some embodiments, as shown in FIG. 7B(b-3), user interface object is dislodged from its original location, and is optionally displayed with an altered appearance (e.g., becoming translucent, enlarged, and/or hovering, etc.) to indicate that the user interface object 7208 is in the reconfiguration mode. In some embodiments, after the termination of the reconfiguration gesture, user interface object 7208 remains in the reconfiguration mode and the visual indication remains displayed in the three-dimensional environment. In some embodiments, the computer system optionally responds to other user inputs and provides interaction with the three-dimensional environment in accordance with the other user inputs, while user interface object 7208 remains in the reconfiguration mode (e.g., hovering over its original location with altered appearance). In some embodiments, the computer system optionally allows the user to use a second wrist flick gesture to cause another currently selected user interface object (e.g., the user optionally selects another object with gaze or tap input) to enter the reconfiguration mode, while user interface object 7208 remains in the reconfiguration mode. In some embodiments, the computer system allows the user to look away and/or navigate to other portions of the three-dimensional environment, while one or more user interface objects (e.g., user interface object 7208) remain in the reconfiguration mode, without moving or interacting with the user interface objects in the reconfiguration mode. In some embodiments, in contrast to that shown in FIGS. 7A(a-4)-7A(a-5), a subsequent drag gesture (e.g., performed by hand 7200 moving laterally after the thumb of the hand touches down on the side of the index finger) causes user interface object 7208 in the reconfiguration mode to be moved from its current location to another location in the three-dimensional environment in accordance with the movement of the hand (e.g., as shown in FIGS. 7B(a-5)-7B(a-6)). In some embodiments, moving the user interface object 7208 in accordance with the drag gesture does not cause the user interface object to exit the reconfiguration mode. One or more additional drag gestures are optionally used to reposition the user interface object 7208 in the three-dimensional environment, while user interface object 7208 remains in the reconfiguration mode. In some embodiments, a predefined termination gesture (e.g., a downward wrist flick gesture (e.g., a downward wrist flick gesture performed at the end of a drag gesture, or a stand-alone downward wrist flick gesture that is not a portion of another gesture)) causes the user interface object 7208 to exit the reconfiguration mode. In some embodiments, once the user interface object 7208 exits the reconfiguration mode, its appearance is restored to its original state, and it settles into a destination location specified by the drag input(s) directed to the user interface object during the reconfiguration mode.

As shown in the sequence of FIGS. 7B(a-5)-7B(a-6) following FIGS. 7B(a-1)-7B(a-2), a wrist flick gesture provided by hand 7200 is a beginning part of a combined gesture that ends with a drag gesture provided by hand 7200. The wrist flick gesture is detected while user interface object 7208 is in the currently selected state. In this example, the wrist flick gesture causes the currently selected user interface object to enter a reconfiguration mode and be moved to a different location in accordance with the movement of the drag gesture. In some embodiments, after the user interface object (e.g., user interface object 7208) enters the reconfiguration mode, the user interface object optionally remains in the reconfiguration mode after the movement from one location to another location in the environment by the drag input.

In some embodiments, other types of gestures are optionally used as the reconfiguration gesture for activating the reconfiguration mode of the currently selected user interface object. In some embodiments, a predefined gesture is optionally configured to activate the reconfiguration mode for a respective class of user interface objects in the three-dimensional environment (e.g., allowing multiple user interface objects of the same class (e.g., a class of application icons, a class of content items, a class of objects representing physical objects, etc.) to enter reconfiguration mode together), allowing the user interface objects of the respective class to be individually or synchronously moved in the three-dimensional environment in accordance with subsequent movement inputs (e.g., drag inputs). In some embodiments, the computer system activates the reconfiguration mode for a user interface object in response to detecting a tap input (e.g., on a finger or a controller) while the user interface object is selected (e.g., by prior input or by a gaze input). In some embodiments, the computer system activates the reconfiguration mode for a user interface object in response to detecting a swipe input (e.g., on a finger or a controller) while the user interface object is selected (e.g., by prior input or by a gaze input).

In some embodiments, while a user interface object is in the reconfiguration mode, the computer system displays a visual indicator (e.g., a shadow image or translucent image of the user interface object) that follows movement of the user's gaze or finger to specify a destination location for the user interface object in the three-dimensional environment. In response to detecting a subsequent commitment input (e.g., a downward wrist flick gesture, or a tap input on a finger or controller), the computer system places the user interface object at the current location of the visual indicator.

In some embodiments, the drag input shown in FIGS. 7A and 7B is replaced by a swipe input on a finger or controller to cause corresponding functions to be performed.

In some embodiments, the movement of the user interface objects in the three-dimensional environment mimics that of physical objects in the real world and are constrained by virtual and physical surfaces in the three-dimensional environment. For example, when a virtual object is moved in response to a drag input while the virtual object is in the reconfiguration mode, the virtual object slides across physical planes represented in the three-dimensional environment, and optionally slides across virtual surfaces in the three-dimensional environment as well. In some embodiments, the user interface object flies up when switching between physical planes represented in the three-dimensional environment.

In some embodiments, the computer system optionally generates an audio output (e.g., continuous or one or more discrete audio output) while the user interface object is in the reconfiguration mode.

FIGS. 7C-7F are block diagrams illustrating methods for generating a computer-generated three-dimensional environment (e.g., including simulating visual interplay between physical and virtual objects), in accordance with some embodiments. FIGS. 7C-7F are used to illustrate the processes described below, including the processes in FIG. 9.

Figure 7D:
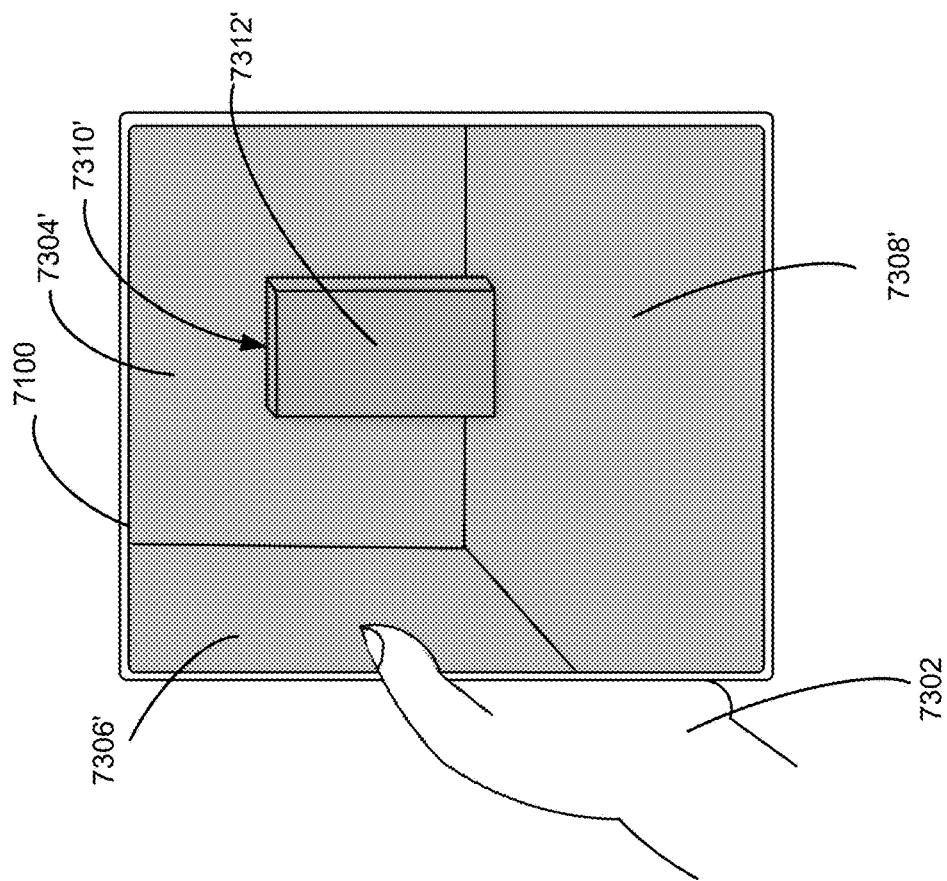
FIGS. 7C-7F are block diagrams illustrating methods for generating a computer-generated three-dimensional environment (e.g., including simulating visual interplay between physical and virtual objects), in accordance with some embodiments.
Figure 7C:
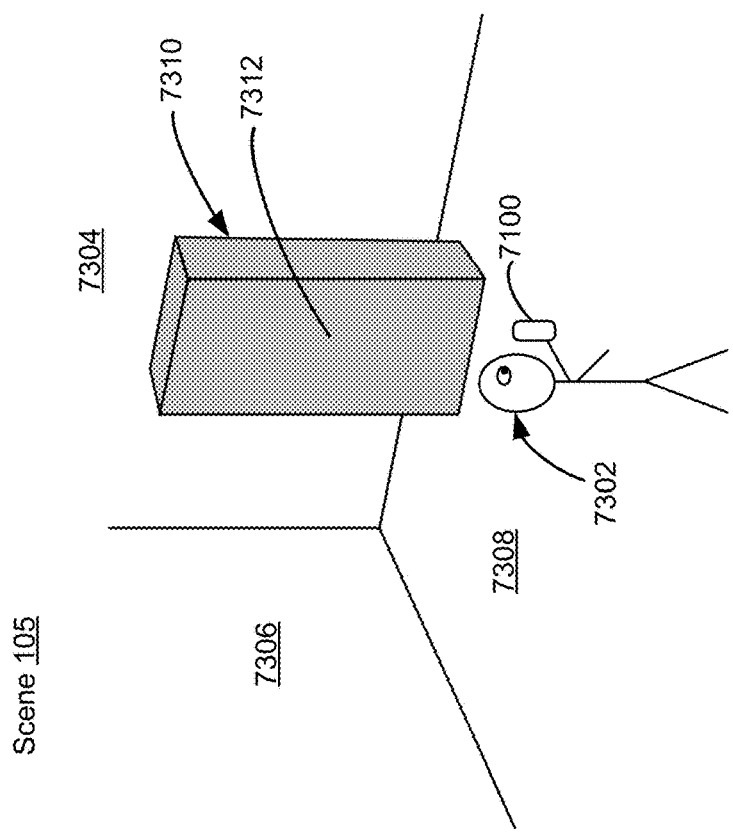
Figure 7E:
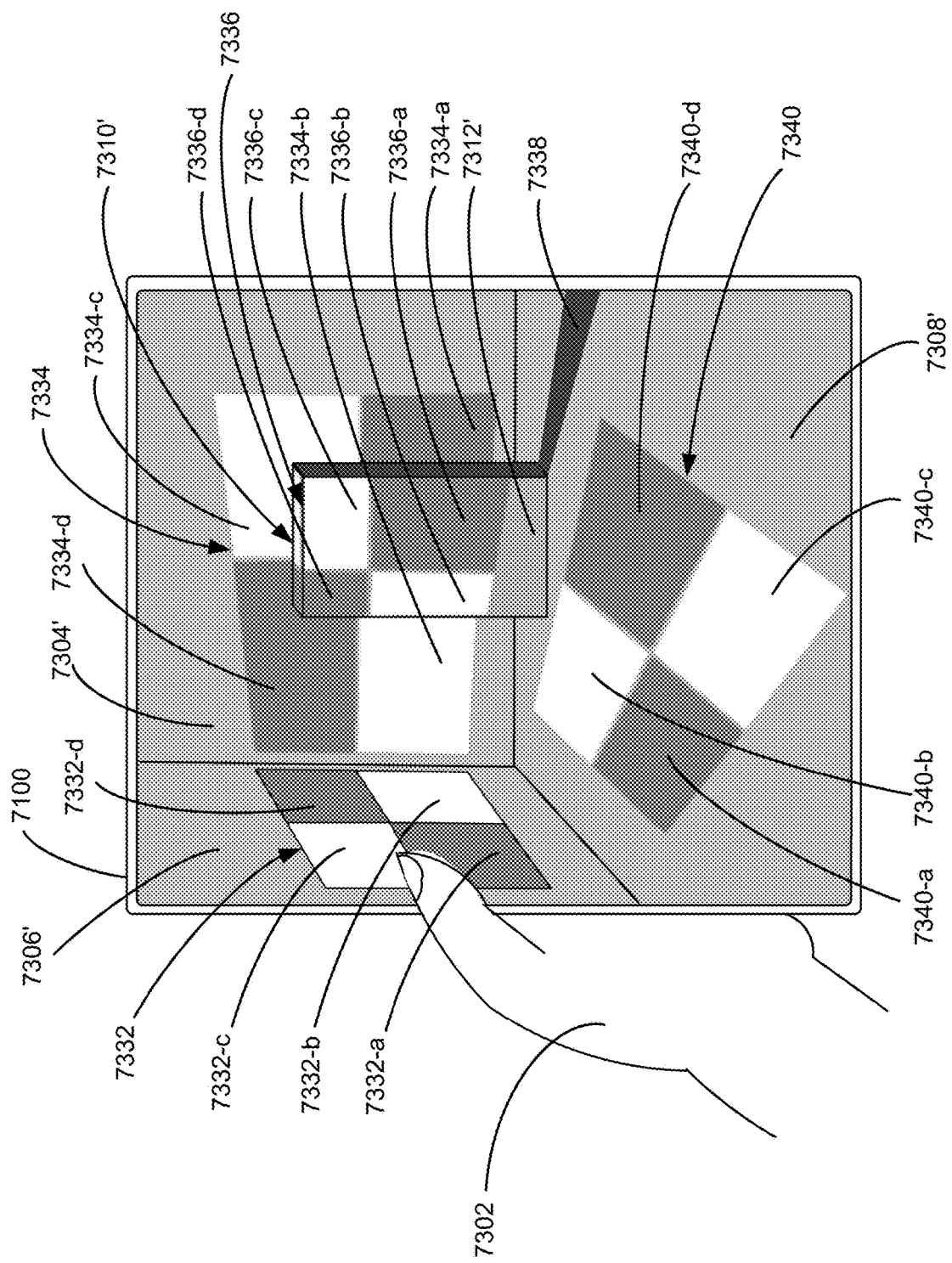
Figure 7F:
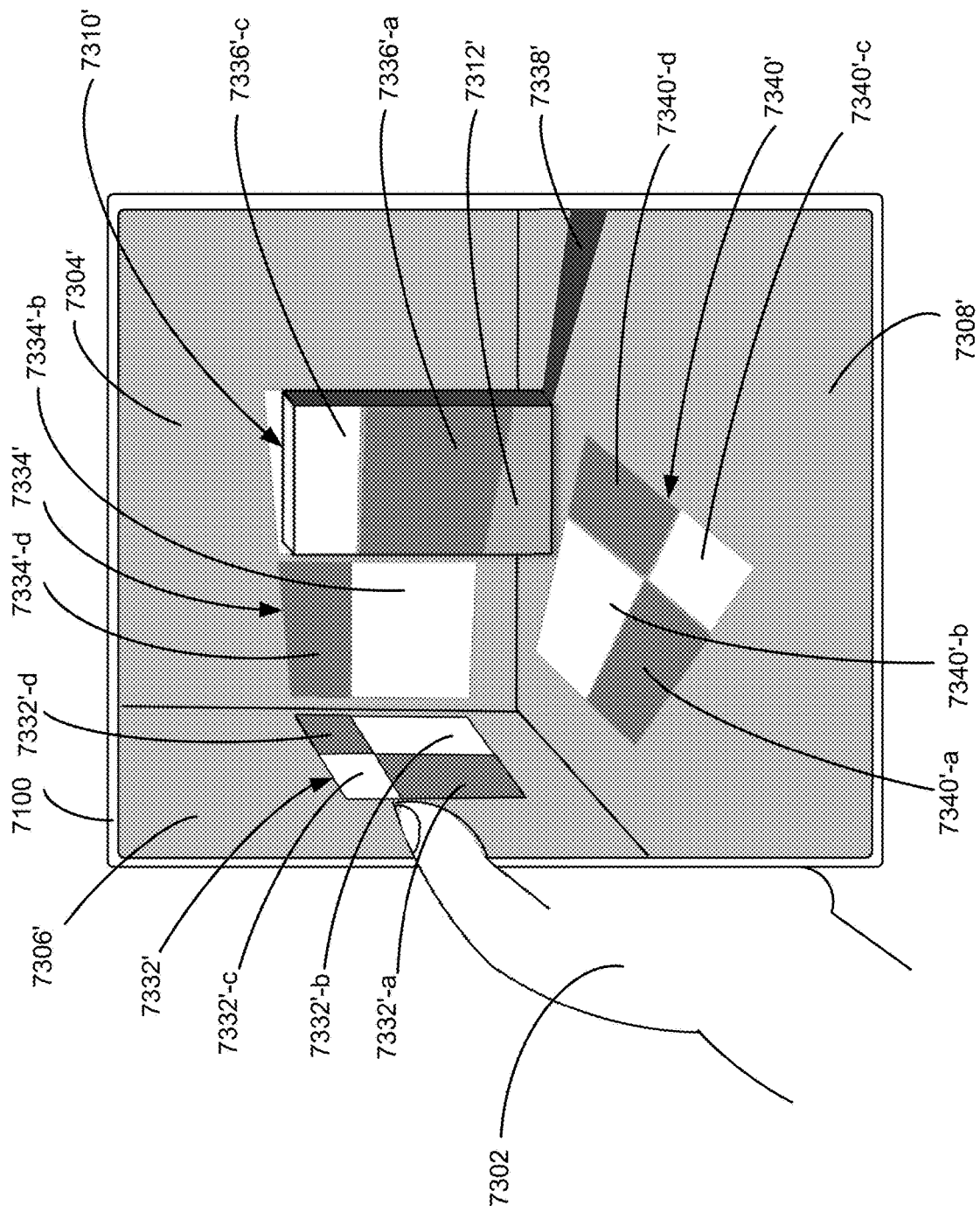
Figure 7H:
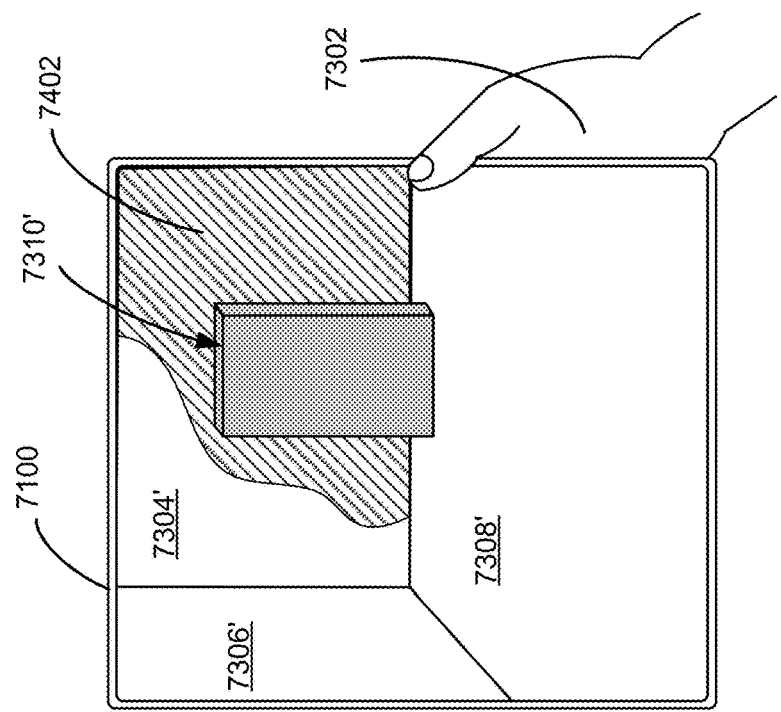
FIGS. 7G-7L are block diagrams illustrating methods for generating a computer-generated three-dimensional environment and facilitating user interaction with the three-dimensional environment (e.g., including gradually adjusting a level of immersiveness of the computer-generated experience based on user inputs), in accordance with some embodiments.

FIGS. 7D-7F illustrate an example computer-generated environment corresponding to a physical environment shown in FIG. 7C. As described herein with reference to FIGS. 7D-7F, the computer-generated environment is optionally an augmented reality environment that includes a camera view of a physical environment or a computer-generated environment that is displayed on a display such that the computer-generated environment is superimposed over a view of the physical environment that is visible through a transparent portion of the display, in accordance with some embodiments. As shown in FIG. 7C, a user 7302 is standing in a physical environment (e.g., scene 105) operating a computer system (e.g., computer system 101) (e.g., holding device 7100 or wearing an HMD). In some embodiments, as in the example shown in FIGS. 7C-7F, the device 7100 is a handheld device (e.g., a cell phone, tablet, or other mobile electronic device) that includes a display, a touch-sensitive display, or the like. In some embodiments, the device 7100 represents and is optionally replaced with a wearable headset that includes a heads-up display, a head-mounted display, or the like. In some embodiments, the physical environment includes one or more physical surfaces and physical objects (e.g., walls of a room (e.g., front wall 7304, and side wall 7306), floor 7308, furniture 7310) surrounding the user 7302. In some embodiments, one or more physical surfaces of the physical objects (e.g., front surface 7312 of furniture 7310) in the environment are visible through the display generation component of the computer system (e.g., on the display of device 7100 or via the HMD).

In the example shown in FIGS. 7D-7F, the computer-generated three-dimensional environment that corresponds to the physical environment (e.g., the portion of physical environment that is within the field of view of one or more cameras of device 7100, or visible through a transparent portion of the display of device 7100), is displayed on device 7100. The physical environment includes physical objects that have corresponding representations in the computer-generated three-dimensional environment shown by the display generation component of the computer system. For example, front wall 7304 is represented by front wall representation 7304', side wall 7306 is represented by side wall representation 7306', floor 7308 is represented by floor representation 7308', furniture 7310 is represented by furniture representation 7310', and front surface 7312 of furniture 7310 is represented by front surface representation 7312' in the computer-generated environment shown on the display (e.g., the computer-generated environment is an augmented reality environment that includes representations 7304', 7306', 7308', 7310' and 7312' of physical objects as part of a live view of one or more cameras of device 7100, or physical objects that are visible through a transparent portion of the display of device 7100). In some embodiments, the computer-generated environment shown on the display also includes virtual objects. In some embodiments, as the viewing perspective of device 7100 relative to the physical environment changes (e.g., as the viewing angle of device 7100 or one or more cameras of device 7100 relative to the physical environment changes in response to movement and/or rotation of the device 7100 in the physical environment), the viewing perspective of the computer-generated environment as displayed on device 7100 is changed accordingly (e.g., including changing the viewing perspective of the physical surfaces and objects (e.g., wall, floor, furniture, etc.), in accordance with some embodiments.

As shown in FIG. 7E, a first virtual object (e.g., virtual window 7332) is displayed at a first location (e.g., a location in the three-dimensional environment that corresponds to a location on side wall 7306 in the physical environment), e.g., in response to a user input that adds virtual content in the three-dimensional environment. The first virtual object (e.g., virtual window 7332) has respective spatial relationships relative to the representations of physical objects (e.g., the front wall representation 7304', the furniture representation 7310', physical surface representation 7312', and the floor representation 7308') in the three-dimensional environment that are determined by the respective spatial relationships between the side wall 7306 relative to other physical objects (e.g., the front wall 7304, furniture 7310, physical surface 7312, and floor 7308). As shown in FIG. 7E, the first virtual object (e.g., virtual window 7332) is displayed with a first appearance (e.g., with a first luminance value and/or color value for first portions 7332-*b* and 7332-*c* and a second luminance value and/or color value for second portions 7332-*a* and 7332-*d* of the first virtual object). In some embodiments, these internal variations of display properties within different portions of the first virtual object are reflective of the content shown in the first virtual object that may change with external factors, preset conditions, or time.

As shown in FIG. 7E, the computer system generates simulated illumination patterns on the representations of the physical objects in the three-dimensional environment based on the virtual light emanating from different portions of virtual object 7332. The simulated illumination patterns are generated in accordance with the relative spatial locations of the virtual object and the representations of the physical objects in the three-dimensional environment, as well as the physical characteristics (e.g., surface shape, texture, and optical properties, etc.) of the virtual and physical objects, in accordance with some embodiments. As shown in FIG. 7E, the illumination patterns generated on the representations of the physical objects observe simulated physical laws of light propagation. For example, the shape, luminance, color, hue, etc. of the illumination patterns (e.g., illumination patterns 7334, 7336, and 7340) on the representations of the physical objects (e.g., representations 7304', 7310', 7312', and 7308') mimic the illumination patterns on the physical objects (e.g., physical objects/surfaces 7304, 7310, 7312, and 7308) that would have been made by a real window of similar characteristics as virtual window 7332 on the side wall 7306.

As shown in FIG. 7E, in some embodiments, the computer system generates the simulated illumination patterns 7334 for front wall 7304 by modifying a visual appearance (e.g., luminance and color values) of first portions 7334-b and 7334-c of front wall representation 7304' in the three-dimensional scene in accordance with luminance and color values of first portions 7332-b and 7332-c of the first virtual object 7332. Similarly, the computer system generates the simulated illumination patterns 7336 for physical surface 7312 by modifying a visual appearance (e.g., luminance and color values) of first portions 7336-b and 7336-c of physical surface representation 7312' in the three-dimensional scene in accordance with luminance and color values of first portions 7332-b and 7332-c of the first virtual object 7332, and by modifying a visual appearance (e.g., luminance and color values) of second portions 7336-a and 7336-d of physical surface representation 7312' in the three-dimensional scene in accordance with luminance and color values of second portions 7332-a and 7332-d of the first virtual object 7332. Similarly, the computer system generates the simulated illumination patterns 7340 for floor 7308 by modifying a visual appearance (e.g., luminance and color values) of first portions 7340-b and 7340-c of floor representation 7308' in the three-dimensional scene in accordance with luminance and color values of first portions 7332-b and 7332-c of the first virtual object 7332, and by modifying a visual appearance (e.g., luminance and color values) of second portions 7340-a and 7340-d of floor representation 7308' in the three-dimensional scene in accordance with luminance and color values of second portions 7332-a and 7332-d of the first virtual object 7332.

As shown in FIG. 7E, the visual appearance of the first portions of the physical surfaces and the visual appearance for the second portions of the physical surfaces are modified differently, e.g., according to the simulated spatial relationships between the first virtual object and the different physical surfaces, the real and simulated physical properties of the virtual object and the different physical surfaces, and the differences in the luminance and color values in the different portions of the first virtual object.

As shown in FIG. 7E, in addition to adding simulated illumination patterns 7334, 7336, and 7340 at locations in the three-dimensional environment that correspond to locations of physical surfaces (e.g., front wall 7304, physical surface 7312 of furniture 7310, and floor 7308) in the physical environment, the computer system also generates a simulated shadow 7338 at a location in the three-dimensional environment (e.g., on floor representation [7338'] 7308') that corresponds to a location of a real shadow (e.g., on floor 7308) that would have been cast by furniture 7310 if illuminated by a real light source with the same location and characteristics of the virtual object 7332 (e.g., a real window on side wall 7306).

FIG. 7F, when compared with FIG. 7E, illustrates that dynamic changes in different portions of the virtual object affect representations of different portions of the physical environment differently. For example, the size and internal content of the first virtual object has changed in FIG. 7E as compared to those shown in FIG. 7F. The first virtual object is now represented as virtual object 7332'. The first portions of the first virtual object 7332-b and 7332-c in FIG. 7E have become first portions 7332-b' and 7332-c' in FIG. 7F, respectively. The second portions 7332-a and 7332-d in FIG. 7E have become second portions 7332-a' and 7332-d' in FIG. 7F, respectively. The center positions of the first portions 7332-b' and 7332-c', and the second portions 7332-a' and 7332-d' in FIG. 7F have also shifted relative to those shown in FIG. 7E, respectively. As a result, for many positions on the side wall representation 7306', the luminance and color values of the corresponding positions on the first virtual object 7332 have changed (e.g., from those values shown in FIG. 7E to those shown in FIG. 7F). Similarly, for many positions on the illumination patterns 7334, 7336, and 7340 cast on the representations 7304', 7312', and 7308', the luminance and color values of the illumination patterns have also changed (e.g., from those values shown in FIG. 7E to those shown in FIG. 7F). For example, for a first position on the side wall representation 7306', the luminance and color values of the corresponding position on the first virtual object (e.g., a virtual window, or a virtual movie screen) may have switched from 1 to 0.5 and from yellow to blue, respectively; for a second position on the side wall representation 7306', the luminance and color values of the corresponding position on the first virtual object may have switched from 0.5 to 1 and from blue to yellow, respectively. In some embodiments, due to the size change of the first virtual object or movement of the first virtual object, for some positions on the side wall representation 7306', the luminance and colors corresponding to those positions will be change because the first virtual object have now expanded or moved to that position; while for some other positions on the side wall representation 7306', the luminance and colors corresponding to those positions will also change because the first virtual object have now moved or shrunken away from those positions. In addition, in some embodiments, the direction of the light coming from different portions of the first virtual object optionally changes as well (e.g., the light directions change according the time of day, or according to the scenery shown in the virtual window). As a result, luminance and color changes in different positions on the first virtual object cause different changes in the illumination on different positions on the representations of the nearby physical surfaces; and different relationships are used to modify the appearance of the representations of the nearby physical surfaces based on the appearance of the first virtual object.

As shown in FIG. 7F, first portion 7332-b' causes illumination 7334-b' on front wall representation 7304', but no longer cause any illumination on front surface representation 7312', and illumination 7336-a' caused by second portion 7332-a' now covers areas previously covered by illumination 7334-b caused by first portion 7332-b (FIG. 7E). Similarly, second portion 7332-d' causes illumination 7334-d' on front wall representation 7304', but no longer cause any illumination on front surface representation 7312', and illumination 7336-c' caused by first portion 7332-c' now covers areas previously covered by illumination 7334-d caused by second portion 7332-d (FIG. 7E). Similarly, on front wall representation 7304', some portions previously covered by illumination 7334-c caused by first portion 7332-c and by illumination 7334-a caused by second portion 7332-a are no longer covered by any illumination. Similarly, on floor representation 7308', portions 7340'-a, 7340'-b, 7340'-c and 7340'-d of illumination pattern 7340' have shrunken and shifted because the first virtual object 7332 have shrunken. Some positions on floor representation 7308' that were previously covered by higher illumination are now covered by lower illumination, while other positions on floor representation 7308' that were previously covered by lower illumination are now covered by higher illumination. In FIG. 7F, the shadow 7338' cast on floor representation 7308' also appears less dark as compared to shadow 7338 in FIG. 7E due to the reduced amount of illumination from the reduced size of the first virtual object 7332.

In some embodiments, the first virtual object is a virtual window showing virtual scenery. The light emanating from the virtual window are based on the virtual scenery shown in the virtual window. In some embodiments, the virtual window casts illumination patterns on the representations of nearby physical surfaces in the three-dimensional environment in a manner that simulates how the light from a real window illuminates the nearby physical surfaces (e.g., based on the spatial relationship between the window and the physical surfaces, the physical properties of the physical surfaces, and the physical laws of light propagation). In some embodiments, the virtual scenery displayed in the virtual window changes based on parameters such as the time of day, the location of the scenery, and the size of the virtual window, etc.

In some embodiments, the first virtual object is a virtual screen or hologram showing a movie. As the movie playback progresses, the virtual light emanating from the virtual screen or hologram changes as the scene changes in the movie. In some embodiments, the virtual screen or hologram casts illumination patterns on the representations of nearby physical surfaces in the three-dimensional environment in a manner that simulates how the light from a real movie screen or hologram illuminates the nearby physical surfaces (e.g., based on the spatial relationship between the screen or hologram and the physical surfaces, the physical properties of the physical surfaces, and the physical laws of light propagation).

In some embodiments, the first virtual object is a virtual assistant, and the light emanating from the virtual assistant changes during different interaction modes between a user and the virtual assistant. For example, the visual representation of the virtual assistant glows with a first color and intensity when first activated by the user, changes to a different color when asking a question or responding to a question, and changes to a different color when performing a task or waiting for completion of a task or an answer from the user. In some embodiments, the virtual assistant casts illumination patterns on the representations of nearby physical surfaces in the three-dimensional environment in a manner that simulates how the light from a real light source illuminates the nearby physical surfaces (e.g., based on the spatial relationship between the light source and the physical surfaces, the physical properties of the physical surfaces, and the physical laws of light propagation). Additional aspects of how the visual representation of a virtual assistant affects the appearance of the physical and virtual objects nearby in the three-dimensional environment are described with respect to FIGS. 7S-7X and FIG. 12.

In some embodiments, the computer system also generates virtual reflections and virtual shadows on the representations of physical surfaces based on light emanating from virtual objects near the physical surfaces.

FIGS. 7G-7L are block diagrams illustrating methods for generating a computer-generated three-dimensional environment and facilitating user interaction with the three-dimensional environment (e.g., including gradually adjusting a level of immersiveness of the computer-generated experience based on user inputs), in accordance with some embodiments. FIGS. 7G-7L are used to illustrate the processes described below, including the processes in FIG. 10.

Figure 7G:
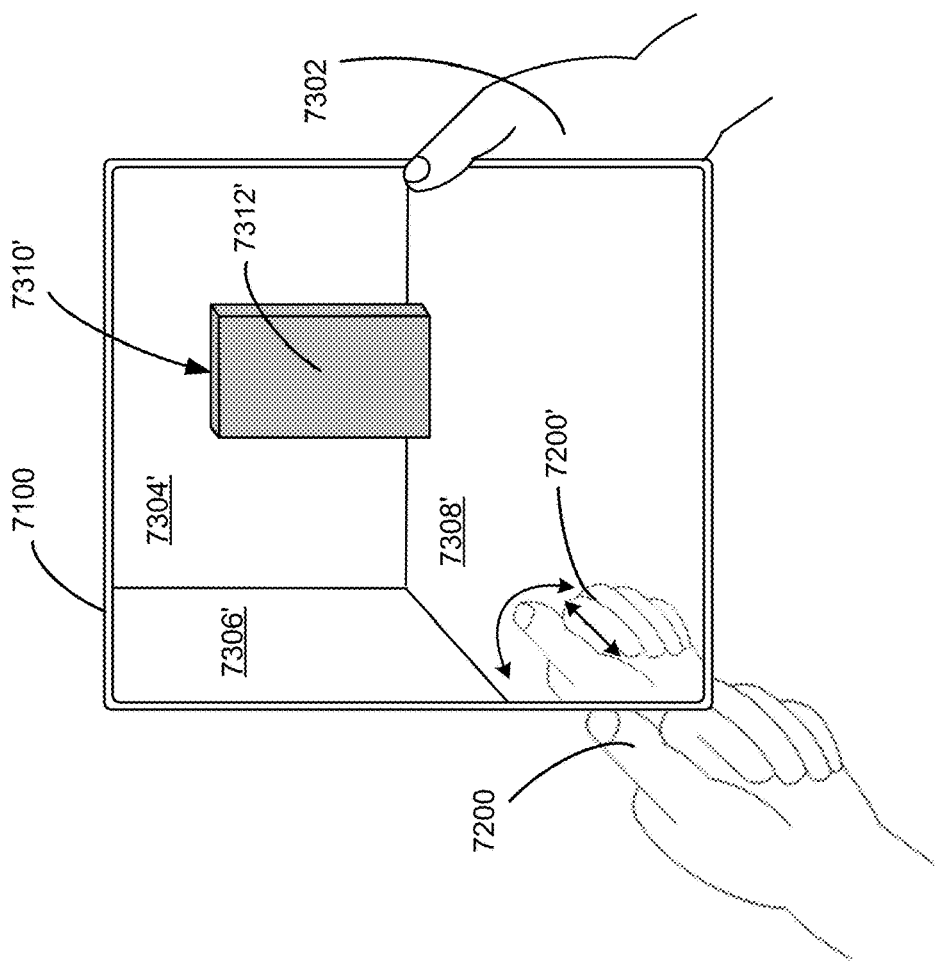

FIG. 7G illustrates an example computer-generated environment corresponding to a physical environment. As described herein with reference to FIG. 7G, the computer-generated environment may be an augmented reality environment or a computer-generated environment that is displayed on a display such that the computer-generated environment is superimposed over a view of the physical environment that is visible through a transparent portion of the display. As shown in FIG. 7G, a user 7302 is present in a physical environment (e.g., scene 105) operating a computer system (e.g., computer system 101) (e.g., holding device 7100 or wearing an HMD). In some embodiments, as in the example shown in FIG. 7G, the device 7100 is a handheld device (e.g., a cell phone, tablet, or other mobile electronic device) that includes a display, a touch-sensitive display, or the like. In some embodiments, the device 7100 represents and is optionally replaced with a wearable headset that includes a heads-up display, a head-mounted display, or the like. In some embodiments, the physical environment includes one or more physical surfaces and physical objects (e.g., walls of a room (e.g., represented by front wall representation 7304', side wall representation 7306'), floor (e.g., represented by floor representation 7308'), furniture (e.g., represented by furniture representation 7310), and physical surface 7312 of the furniture (e.g., represented by physical surface representation 7312')) surrounding the user.

In the example shown in FIGS. 7G-7L, the computer-generated three-dimensional environment that corresponds to the physical environment (e.g., the portion of physical environment that is within the field of view of one or more cameras of device 7100, or visible through a transparent portion of the display of device 7100) is displayed on device 7100. The computer-generated environment shown on device 7100 is a three-dimensional environment: as the viewing perspective of device 7100 relative to the physical environment changes (e.g., as the viewing angle of device 7100 or one or more cameras of device 7100 relative to the physical environment changes in response to movement and/or rotation of the device 7100 in the physical environment), the viewing perspective of the computer-generated environment as displayed on device 7100 is changed accordingly (e.g., including changing the viewing perspective of the physical surfaces and objects (e.g., walls, floor, furniture, etc.), in accordance with some embodiments.

As shown in FIG. 7G, initially, the three-dimensional environment is shown with a first set of physical elements, including representations of a front wall 7304, a side wall 7306, a floor 7308, and furniture 7310. Optionally, the three-dimensional environment may include a first quantity of virtual elements. For example, when the three-dimensional environment is initially displayed, or when the display generation component of the computer system is first turned on or put on the user's head or in front of the user's eyes, no virtual elements or a minimal amount of virtual elements are displayed in the three-dimensional environment. This allows the user to start from a view of the three-dimensional environment that is very similar to the direct view of the real world without the display generation component blocking the user's eyes.

As shown in FIG. 7G and FIG. 7H, the computer system detects a first predefined gesture input for increasing the immersiveness of the three-dimensional environment (e.g., a thumb flick gesture or swipe gesture performed by hand 7200 represented by representation 7200' on the display generation component, an upward wave gesture in the air, a swipe gesture on a controller, etc.). In response to detecting the first predefined gesture, the computer system displays virtual element 7402 (e.g., virtual scenery, or a virtual window) that blocks the view of the front wall 7304 in the three-dimensional environment (e.g., virtual element 7402 replaces display of representation 7304' of the front wall 7304 on the display, or virtual element 7402 is displayed at a location that blocks the view of front wall 7304 through a previously transparent portion of the display (e.g., the portion now displaying the virtual element 7402)). In some embodiments, as shown in FIG. 7H, even though the view of the front wall 7304 is blocked by display of virtual element 7402, the view of furniture 7310 standing in front of front wall 7304 is not affected. In other words, the first predefined gesture only causes a first class of physical objects or surfaces (e.g., front wall) to be replaced or blocked by the newly displayed virtual element or newly displayed portion of an existing virtual element. In some embodiments, an animated transition is displayed to show the virtual element 7402 gradually expanding (e.g., shown in FIG. 7H) or becoming more opaque and saturated to cover or block the view of the front wall 7304 (e.g., replacing representation 7304' in the three-dimensional environment).

In some embodiments, in response to the first predefined gesture, the computer system also optionally adds another virtual element (e.g., virtual object 7404) to the three-dimensional environment, without replacing any whole class of physical elements. The virtual object 7404 is optionally a user interface object, such as a menu (e.g., menu of application, documents, etc.), a control (e.g., display brightness control, display focus control, etc.), or other objects (e.g., a virtual assistant, a document, media item, etc.) that can be manipulated by user inputs or provides information or feedback in the three-dimensional environment. In some embodiments, as shown in FIG. 7I, the virtual object 7404 is added to the three-dimensional environment (e.g., blocking a portion of the floor 7308 or replacing a portion of the floor representation 7308') without having gained input focus and/or being specifically inserted into the three-dimensional environment (e.g., dragged from a menu, or drawn by a drawing tool, etc.). In some embodiments, the computer system allows the user to introduce respective virtual elements into the three-dimensional environment individually using the user interfaces currently provided in the three-dimensional environment (e.g., adding new pieces of furniture, throwing virtual confetti into the room, etc.), but this type of inputs does not change the level of immersion of the three-dimensional environment, and does not replace view of a whole class of physical elements in a single action.

FIG. 7I follows FIG. 7H, showing the view of the front wall 7304 having been completely blocked or replaced with virtual element 7402. The view of furniture 7310 standing in front of front wall 7304 is still shown in the three-dimensional environment. Virtual element 7404 blocks a portion of floor representation 7308'. Representation 7306' of side wall 7306 and representation 7308' of floor 7308 are visible in the three-dimensional environment after the virtual elements 7402 and 7404 are added to the three-dimensional environment in response to the first predefined gesture input.

Figure 7J:
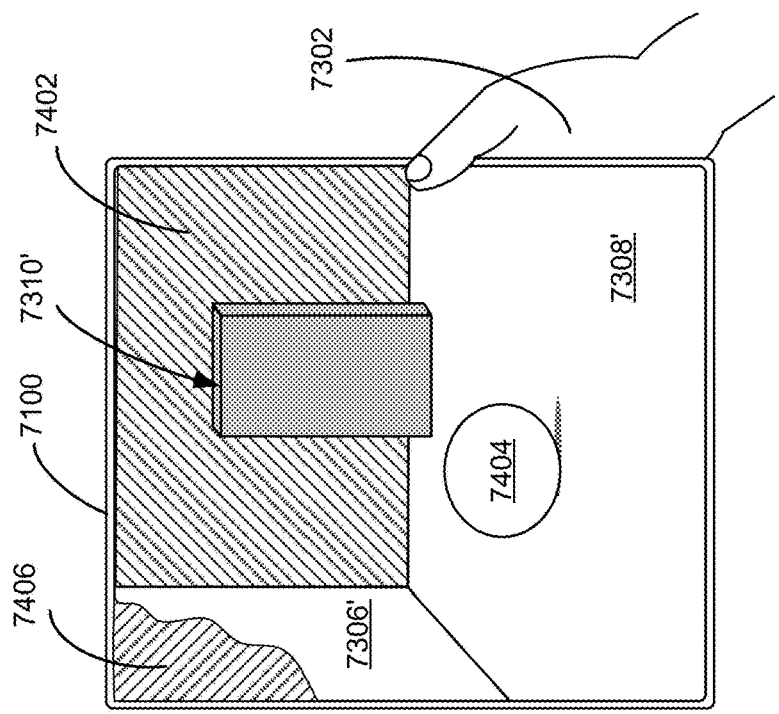
Figure 7I:
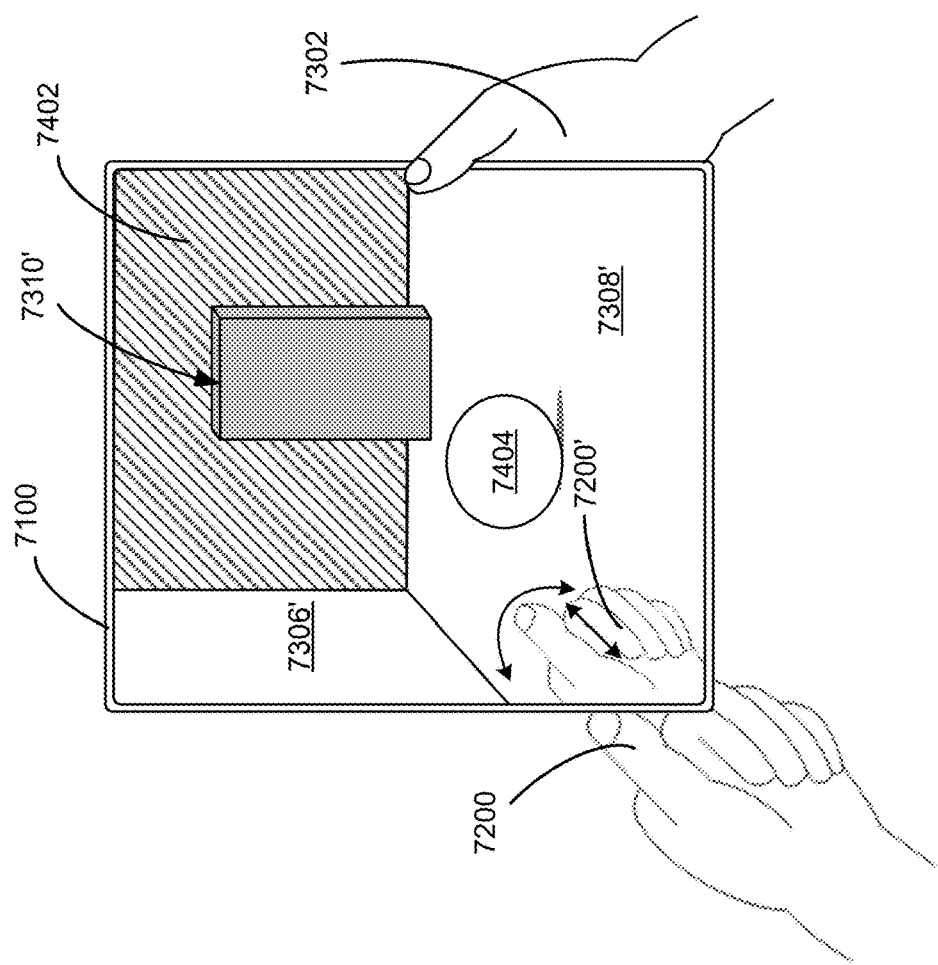
Figure 7L:
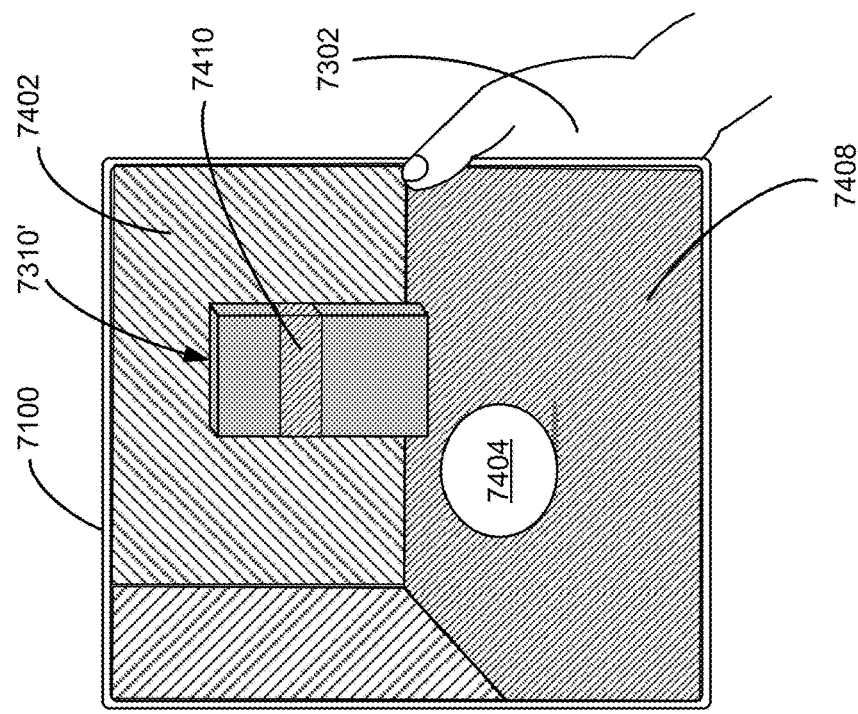

As shown in FIG. 7I and FIG. 7J, the computer system detects a second predefined gesture input for increasing the immersiveness of the three-dimensional environment (e.g., a thumb flick gesture or swipe gesture performed by hand 7200 represented by representation 7200' on the display generation component, an upward wave gesture in the air, a swipe gesture on a controller, etc.) after detecting the first predefined gesture input (e.g., shown in FIG. 7G). In response to detecting the second predefined gesture, the computer system maintains display of virtual element 7402 (e.g., virtual scenery, or a virtual window) that blocks the view of the front wall 7304 in the three-dimensional environment, and displays virtual element 7406. Virtual element 7406 blocks the view of side wall 7306 in the three-dimensional environment (e.g., virtual element 7406 replaces display of representation 7306' of the side wall 7306 on the display, or virtual element 7406 is displayed at a location that blocks the view of side wall 7306 through a previously transparent portion of the display (e.g., the portion now displaying the virtual element 7406)). In FIGS. 7I-7J, the second predefined gesture causes an additional class of physical objects or surfaces (e.g., side walls) to be replaced or blocked by the newly displayed virtual element or newly displayed portion of an existing virtual element. In some embodiments, an animated transition is displayed to show the virtual element 7406 gradually expanding or becoming more opaque and saturated to cover or block the view of the side wall 7306 (e.g., replacing representation 7306' in the three-dimensional environment).

Figure 7K:
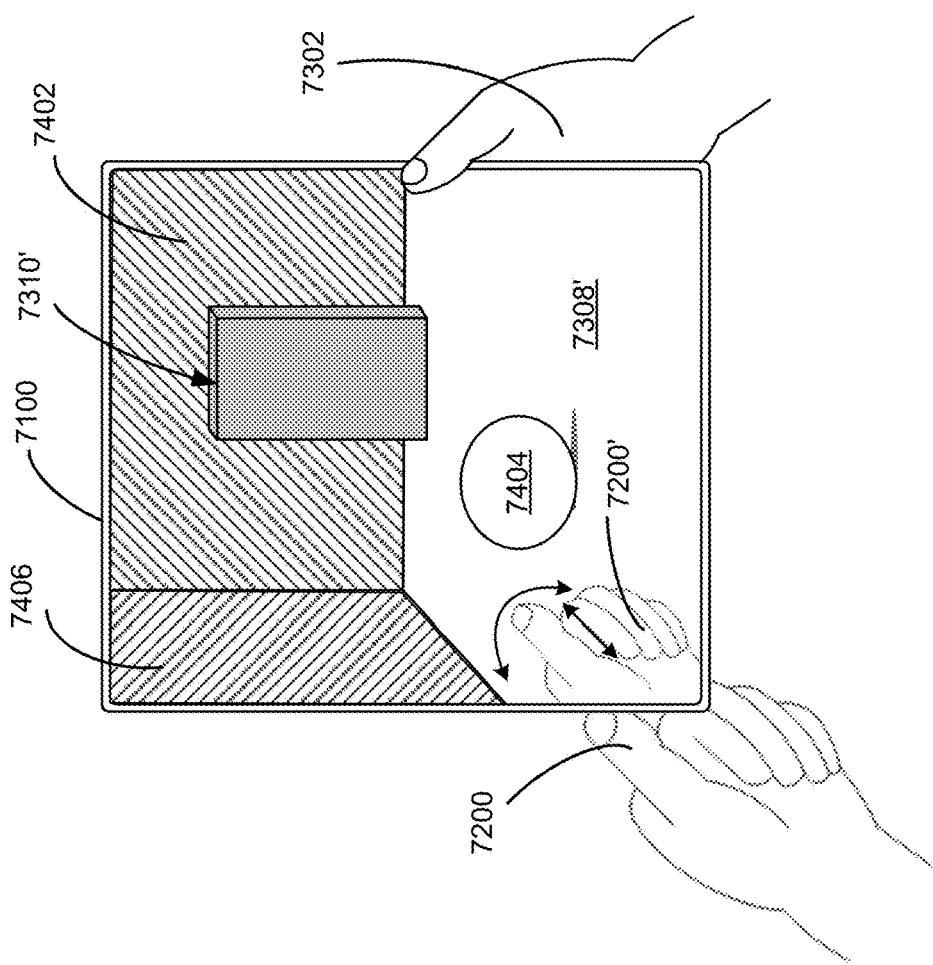

FIG. 7K follows FIG. 7J, showing the view of the front wall 7304 and the side wall 7306 having been completely blocked or replaced with virtual elements 7402 and 7406. The view of furniture 7310 standing in front of front wall 7304 is still shown in the three-dimensional environment. Virtual element 7404 blocks a portion of floor representation 7308'. Representation 7308' of floor 7308 is still visible in the three-dimensional environment after the virtual elements 7402, 7404, and 7406 are added to the three-dimensional environment in response to the first and second predefined gesture inputs.

As shown in FIG. 7K and FIG. 7L, the computer system detects a third predefined gesture input for increasing the immersiveness of the three-dimensional environment (e.g., a thumb flick gesture or swipe gesture performed by hand 7200 represented by representation 7200' on the display generation component, an upward wave gesture in the air, a swipe gesture on a controller, etc.) after detecting the first and second predefined gesture inputs (e.g., shown in FIG. 7G and FIG. 7I). In response to detecting the third predefined gesture input, the computer system maintains display of virtual elements 7402 and 7406 (e.g., virtual scenery, or a virtual window) that block the view of the front wall 7304 and the side wall 7306 in the three-dimensional environment, and displays virtual elements 7408 and 7410. Virtual element 7408 blocks the view of floor 7308 in the three-dimensional environment (e.g., virtual element 7408 replaces display of representation 7308' of the floor 7308 on the display, or virtual element 7408 is displayed at a location that blocks the view of floor 7308 through a previously transparent portion of the display (e.g., the portion now displaying the virtual element 7408)). In FIGS. 7K-7L, the third predefined gesture causes an additional class of physical objects or surfaces (e.g., floor) to be replaced or blocked by the newly displayed virtual element or newly displayed portion of an existing virtual element. In some embodiments, an animated transition is displayed to show the virtual element 7408 gradually expanding or becoming more opaque and saturated to cover or block the view of the floor 7308 (e.g., replacing representation 7308' in the three-dimensional environment).

In some embodiments, in response to the third predefined gesture, the computer system also optionally adds another virtual element (e.g., virtual element 7410) to the three-dimensional environment, without replacing any whole class of physical elements. The virtual element 7410 is optionally a user interface object, such as a menu (e.g., menu of application, documents, etc.), a control (e.g., display brightness control, display focus control, etc.), or other objects (e.g., a virtual assistant, a document, media item, etc.) that can be manipulated by user inputs or provides information or feedback in the three-dimensional environment, or a texture (e.g., decorative features, photos, etc.) that changes the appearance of the physical objects. In some embodiments, as shown in FIG. 7L, the virtual object 7410 is added to the three-dimensional environment (e.g., overlaying a portion of the front surface 7312 of furniture 7310 or replacing a portion of the physical surface representation 7312').

In some embodiments, after successive input gestures of the predefined gesture type for increasing the immersiveness of the three-dimensional environment, additional quantities of virtual elements are optionally introduced into the three-dimensional environment, replacing or blocking the view of additional classes of physical elements previously visible in the three-dimensional environment. In some embodiments, the entirety of the three-dimensional environment is replaced with virtual elements, and the view into the physical world is entirely replaced by a view of virtual elements in the three-dimensional environment.

In some embodiments, the virtual elements 7402 and 7406 are virtual windows that are displayed in place of respective portions of the front and side wall representations 7304' and 7306'. In some embodiments, the light emanating from the virtual windows cast simulated illumination patterns onto other physical surfaces that are still visible or represented in the three-dimensional environment (e.g., floor or furniture). Additional details of the effect of the light from the virtual elements on the surrounding physical surfaces are described with respect to FIGS. 7C-7F and FIG. 9, in accordance with some embodiments.

In some embodiments, the content or appearance of the virtual elements 7402 and 7406 (e.g., virtual windows or virtual screens) change in response to additional gesture inputs (e.g., horizontal swipe of the hand in the air, or swipe in a predefined direction around a finger). In some embodiments, the size of the virtual elements, the location of virtual scenery displayed inside the virtual elements, the media item displayed inside of the virtual element, etc., change in response to additional gesture inputs.

In some embodiments, the gesture inputs for increasing or decreasing the level of immersiveness of the three-dimensional environment are vertical swipe gestures that are of opposite directions (e.g., upward for increasing immersiveness/quantity of virtual elements, and downward for decreasing immersiveness/quantity of virtual elements). In some embodiments, the gesture for changing the content of the virtual elements is a horizontal swipe gesture (e.g., horizontal swipe gestures switching backward and/or forward through a plurality of locations or time of day for the content to be shown in the virtual elements.

In some embodiments, the sequence of the first predefined gesture input, the second predefined gesture input, and the third predefined gesture input for increasing the immersiveness of the three-dimensional environment are optionally replaced by one continuous input to change through multiple levels of immersion. Each consecutive portion of the continuous input corresponds to a respective one of the first, second, and third predefined gesture input described in FIGS. 7G-7L, in accordance with some embodiments.

In some embodiments, floor 7308 or floor representation 7308' always remains visible in the three-dimensional environment, even when other physical surfaces such as walls have been replaced or overlaid by virtual elements. This helps to ensure that the user feels secure and sure-footed when navigating within the three-dimensional environment by walking around in the physical world.

In some embodiments, some furniture or portions of furniture surface always remain visible even when other physical surfaces such as walls and floors have been replaced or overlaid by virtual elements. This helps to ensure that the user maintains a familiar connection with its environment when immersed in the three-dimensional environment.

In this example, in FIGS. 7G, 7I, and 7K, a representation 7200' of hand 7200 is displayed in the computer-generated environment. The computer-generated environment does not include a representation of user's right hand (e.g., because the right hand is not within the field of view of the one or more cameras of device 7100). In addition, in some embodiments, e.g., in the example shown in FIG. 7I, where device 7100 is a handheld device, the user is able to see portions of the surrounding physical environment separately from any representations of the physical environment displayed on device 7100. For example, portions of the user's hands are visible to the user outside of the display of device 7100. In some embodiments, device 7100 in these examples represents and can be replaced by a headset having a display (e.g., a head-mounted display) that entirely blocks the user's view of the surrounding physical environment. In some such embodiments, no portions of the physical environment are directly visible to the user; instead, the physical environment is visible to the user through representations of portions of the physical environment that are displayed by the device. In some embodiments, the user's hand(s) are not visible to the user, either directly or via the display of the device 7100, while the current state of the user's hand(s) is continuously or periodically monitored by the device to determine if the user's hand(s) have entered a ready state for providing gesture inputs. In some embodiments, the device displays an indicator of whether the user's hand is in the ready state for providing input gestures, to provide feedback to the user and alert the user to adjust his/her hand positions if he/she wishes to provide an input gesture.

FIGS. 7M-7R are block diagrams illustrating methods for facilitating user interaction with a computer-generated environment (e.g., utilizing interactions with physical surfaces to control devices or interact with the computer-generated environment), in accordance with some embodiments. FIGS. 7M-7R are used to illustrate the processes described below, including the processes in FIG. 11.

Figure 7N:
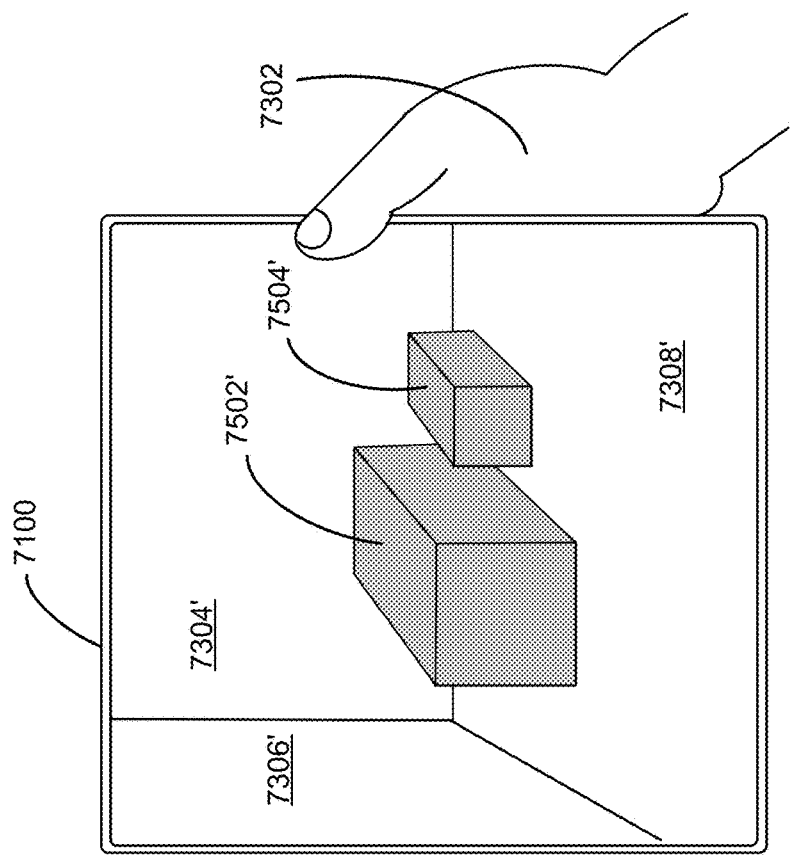
FIGS. 7M-7R are block diagrams illustrating methods for facilitating user interaction with a computer-generated environment (e.g., utilizing interactions with physical surfaces to control devices or interact with the computer-generated environment), in accordance with some embodiments.
Figure 7M:
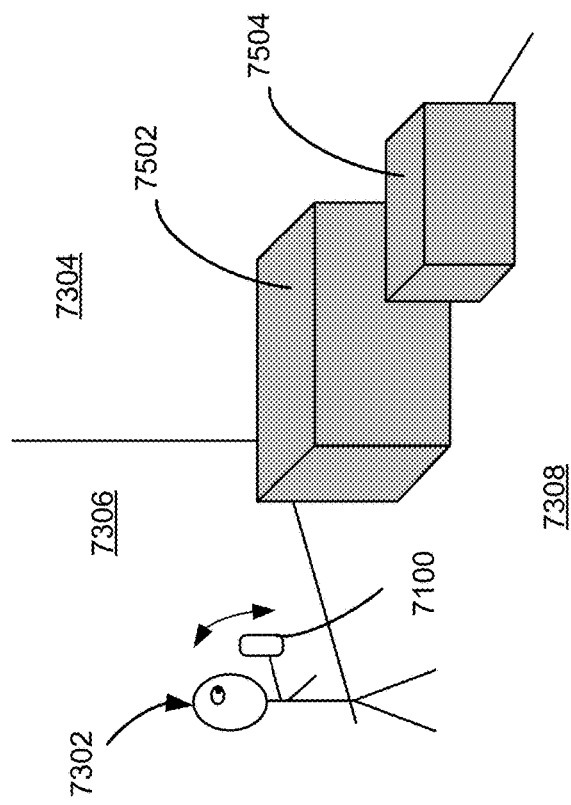

FIG. 7N illustrates an example computer-generated environment corresponding to a physical environment shown in FIG. 7M. As described herein with reference to FIGS. 7M-7R, the computer-generated environment is optionally an augmented reality environment that includes a camera view of a physical environment or a computer-generated environment that is displayed on a display such that the computer-generated environment is superimposed over a view of the physical environment that is visible through a transparent portion of the display, in accordance with some embodiments. As shown in FIG. 7M, a user 7302 is standing in a physical environment (e.g., scene 105) operating a computer system (e.g., computer system 101) (e.g., holding device 7100 or wearing an HMD). In some embodiments, as in the example shown in FIGS. 7M-7R, the device 7100 is a handheld device (e.g., a cell phone, tablet, or other mobile electronic device) that includes a display, a touch-sensitive display, or the like. In some embodiments, the device 7100 represents and is optionally replaced with a wearable headset that includes a heads-up display, a head-mounted display, or the like. In some embodiments, the physical environment includes one or more physical surfaces and physical objects (e.g., walls of a room (e.g., front wall 7304, side wall 7306), floor 7308, and boxes 7502 and 7504 (e.g., tables, speakers, lamps, appliances, etc.)) surrounding the user 7302. In some embodiments, one or more physical surfaces of the physical objects in the environment are visible through the display generation component of the computer system (e.g., on the display of device 7100 or via the HMD).

In the example shown in FIGS. 7M-7R, the computer-generated three-dimensional environment that corresponds to the physical environment (e.g., the portion of physical environment that is within the field of view of one or more cameras of device 7100, or visible through a transparent portion of the display of device 7100), is displayed on device 7100. The physical environment includes physical objects that have corresponding representations in the computer-generated three-dimensional environment shown by the display generation component of the computer system. For example, front wall 7304 is represented by front wall representation 7304', side wall 7306 is represented by side wall representation 7306', floor 7308 is represented by floor representation 7308', boxes 7502 and 7504 are represented by box representations 7502' and 7504' in the computer-generated environment shown on the display (e.g., the computer-generated environment is an augmented reality environment that includes representations 7304', 7306', 7308', 7502' and 7504' of physical objects as part of a live view of one or more cameras of device 7100, or physical objects that are visible through a transparent portion of the display of device 7100). In some embodiments, the computer-generated environment shown on the display also includes virtual objects. In some embodiments, as the viewing perspective of device 7100 relative to the physical environment changes (e.g., as the viewing angle of device 7100 or one or more cameras of device 7100 relative to the physical environment changes in response to movement and/or rotation of the device 7100 in the physical environment), the viewing perspective of the computer-generated environment as displayed on device 7100 is changed accordingly (e.g., including changing the viewing perspective of the physical surfaces and objects (e.g., wall, floor, furniture, etc.), in accordance with some embodiments.

In some embodiments, when a level of interaction between the user 7302 and the three-dimensional environment is below a first predefined level (e.g., the user is merely looking at the three-dimensional environment without focusing on a particular location in the three-dimensional environment), the computer system displays an initial state of the three-dimensional environment in which representations 7502' and 7504' of boxes 7502 and 7504 are not displayed with any corresponding user interface or virtual objects, as shown in FIG. 7N.

Figure 7P:
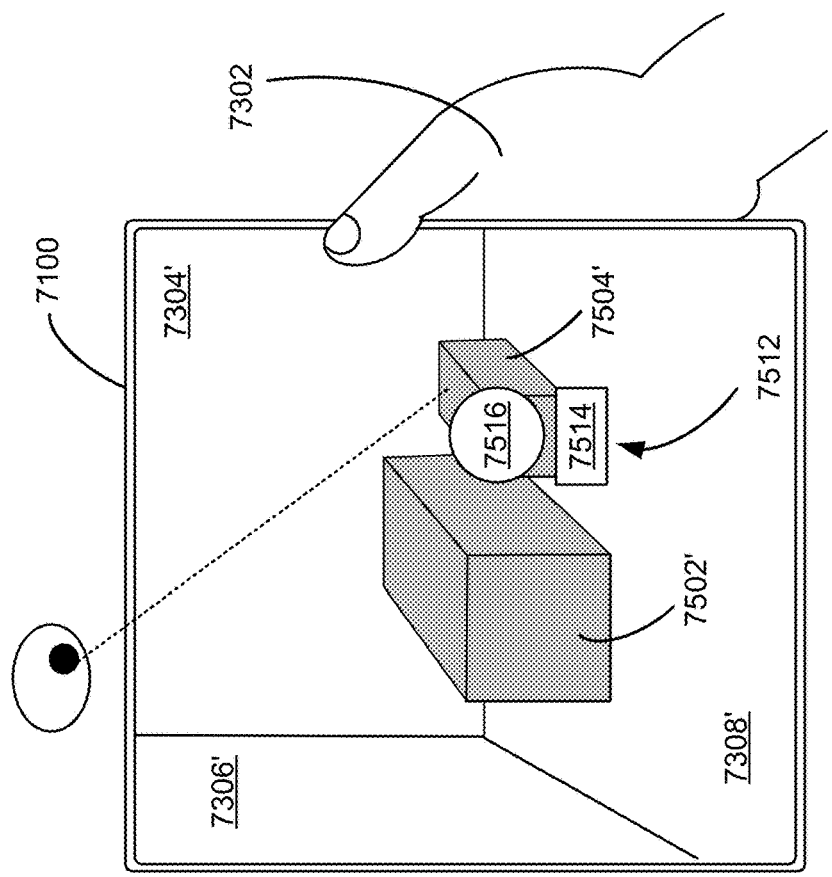
Figure 7O:
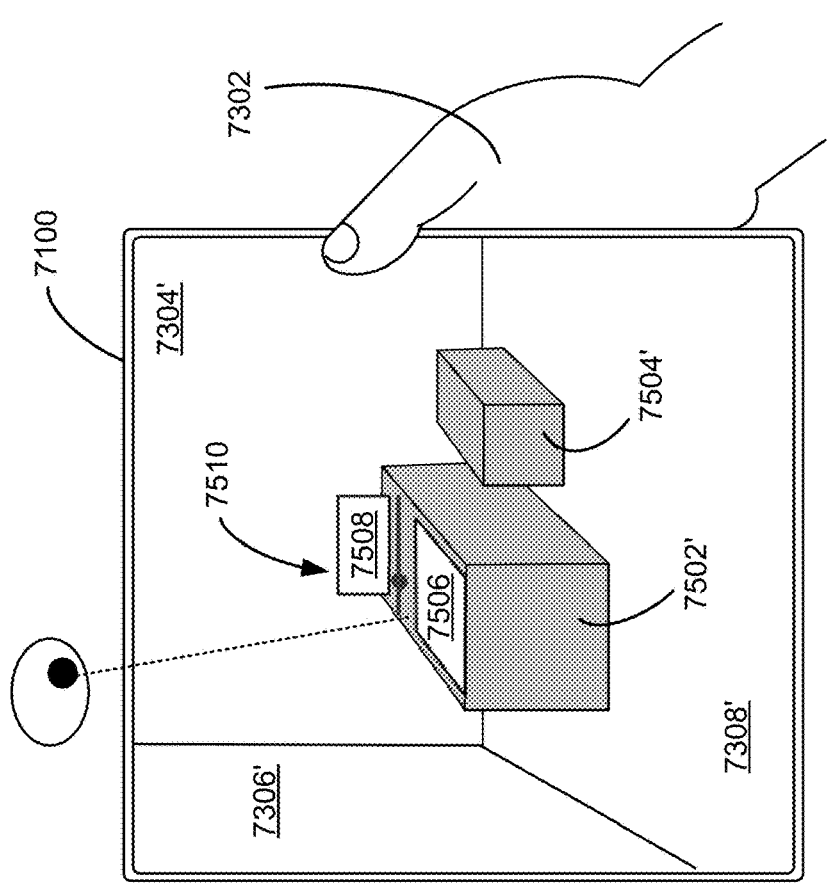

In FIGS. 7O and 7P, the computer system detects that the level of interaction between the user and the three-dimensional environment has increased above the first predefined level. In particular, in FIG. 7O, a gaze input is detected on representation 7502' of box 7502 (e.g., a speaker, or table top), without any concurrent gesture input or indication that a gesture input is about to be provided (e.g., the user's hand is not in a ready state for providing a gesture input). In response to detecting a gaze input on representation 7502' of box 7502 in the three-dimensional environment, the computer system determines that the level of interaction between the user and box 7502 or representation 7502' has reached the first predefined level (but has not reached a second predefined level above the first predefined level). In response to determining that the level of interaction with respect to box 7502 or representation 7502' has reached the first predefined level, the computer system displays a first user interface 7510 corresponding to box 7502 at a location in the three-dimensional environment that corresponds to the location of box 7502 in the physical environment. For example, as shown in FIG. 7O, a plurality of user interface objects (e.g., user interface objects 7506 and 7508) are displayed in such as manner as to appear overlaying the top surface of box 7502 or replacing a portion of representation 7502'. In some embodiments, the box 7502 is a table, and the user interface objects 7506 and 7508 include one or more of a virtual newspaper, a virtual screen, a notification from an application or communication channel, a keyboard and a display, and a sketch pad, etc. In some embodiments, the box 7502 is a speaker, and the user interface objects 7506 and 7508 include a volume indicator, a play/pause control, a name of currently played song/album, today's weather forecast, etc. In some embodiments, the box 7502 is a smart lamp or appliance, and the user interface objects 7506 and 7508 include one or more of a brightness or temperature control, a start/stop or ON/OFF button, and a timer, etc.

In FIG. 7P, the gaze input has shifted from representation 7502' of box 7502 (e.g., a table top, a speaker, a smart lamp or appliance) to representation 7504' of box 7504 (e.g., a smart medicine cabinet), without any concurrent gesture input or indication that a gesture input is about to be provided (e.g., the user's hand is not in a ready state for providing a gesture input). In response to detecting the gaze input shifting from representation 7502' of box 7502 to representation 7504' of box 7504 in the three-dimensional environment, the computer system determines that the level of interaction between the user and box 7504 or representation 7504' has reached the first predefined level (but has not reached a second predefined level above the first predefined level), and determines that the level of interaction between the user and box 7502 or representation 7502' has dropped below the first predefined level. In accordance with the determination that that the level of interaction between the user and box 7502 or representation 7502' has dropped below the first predefined level, the computer system ceases to display the first user interface 7510 corresponding to box 7502. In response to determining that the level of interaction with respect to box 7504 or representation 7504' has reached the first predefined level, the computer system displays a first user interface 7512 corresponding to box 7504 at a location in the three-dimensional environment that corresponds to the location of box 7504 in the physical environment. For example, as shown in FIG. 7P, a plurality of user interface objects (e.g., user interface objects 7514 and 7516) are displayed in a manner so as to appear overlaying the front surface of box 7504 or replacing a portion of representation 7504'. In some embodiments, the box 7504 is smart medicine cabinet, and the plurality of user interface objects (e.g., user interface objects 7514 and 7516) include one or more of the status of the medicine cabinet (e.g., indicators that certain medicine or supply running low and needing to be refilled, or a reminder of whether the medication for the current day has been taken or not).

Figure 7R:
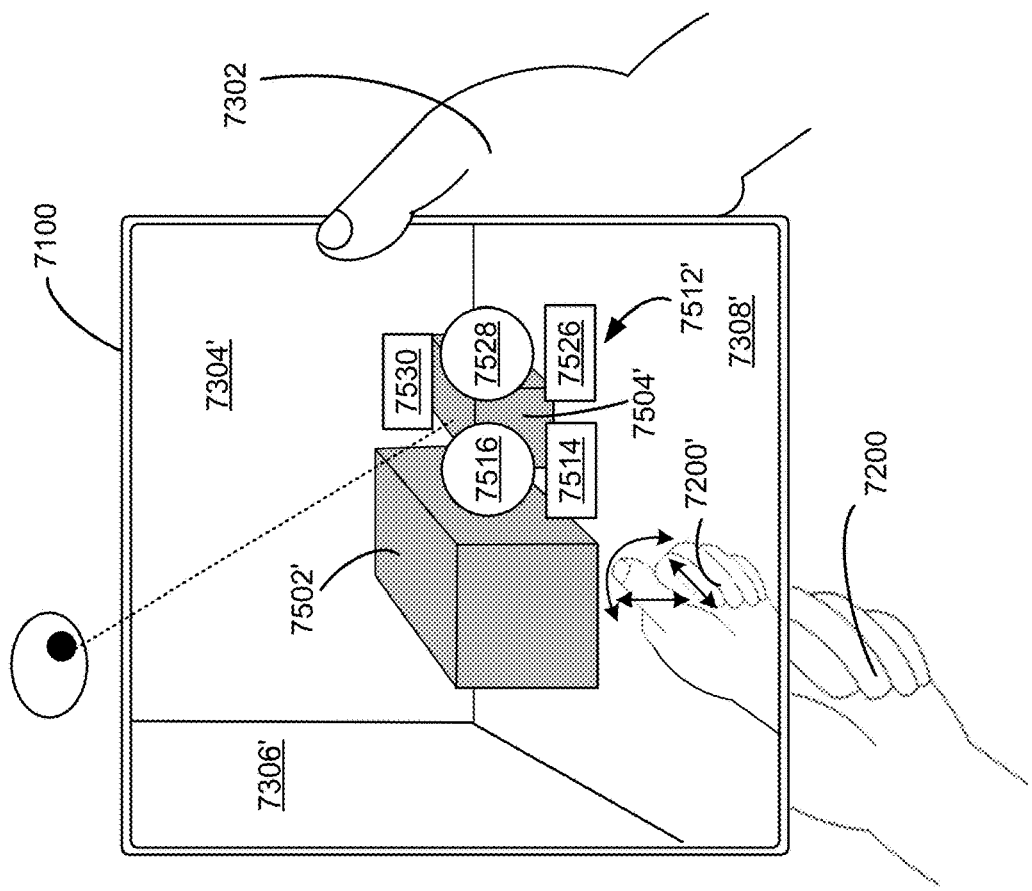
Figure 7Q:
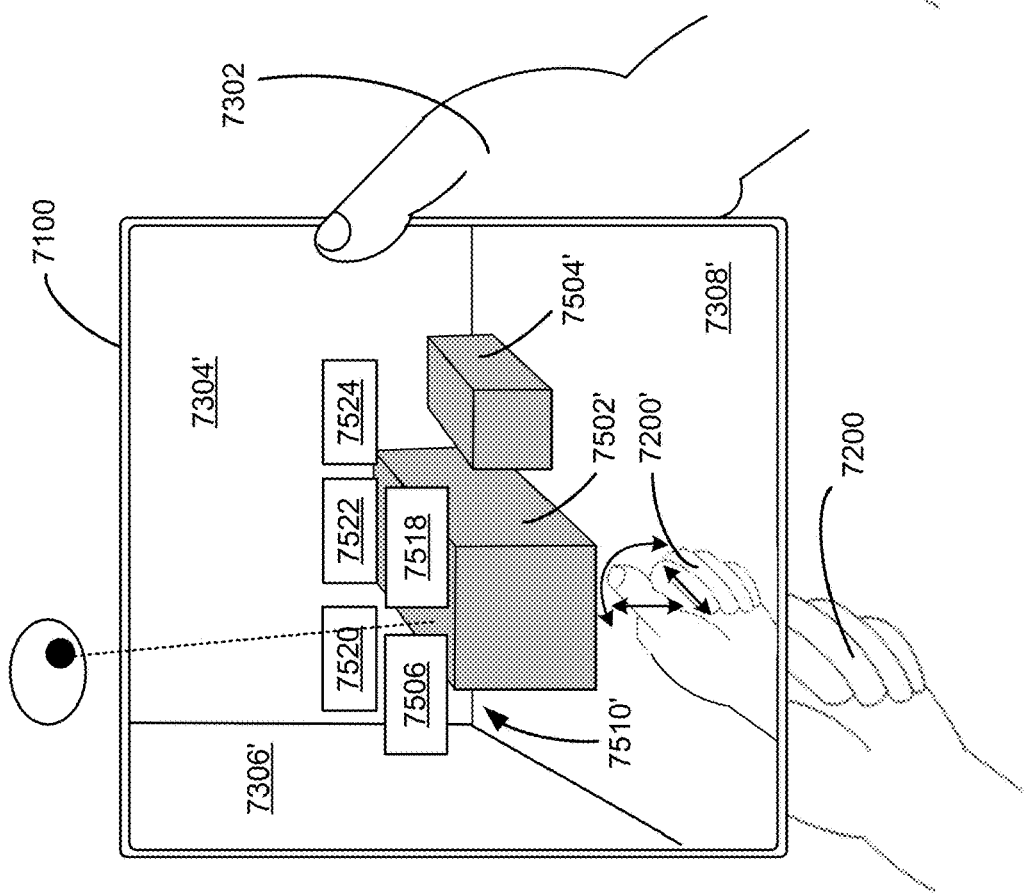

In FIGS. 7Q and 7R, the computer system detects that the level of interaction between the user and the three-dimensional environment has increased beyond the second predefined level that is above the first predefined level. In particular, in FIG. 7Q, in addition to detecting a gaze input on representation 7502' of box 7502 (e.g., a speaker, or table top), the computer system also detects an indication that a gesture input is about to be provided (e.g., the user's hand is found in a ready state for providing a gesture input). In response to the level of interaction between the user and box 7502 or representation 7502' has reached the second predefined level, the computer system displays a second user interface 7510' which is optionally an enhanced version of the first user interface 7510 corresponding to box 7502. The second user interface 7510' corresponding to box 7502 is displayed at a location in the three-dimensional environment that corresponds to the location of box 7502 in the physical environment. For example, as shown in FIG. 7Q, a plurality of user interface objects (e.g., user interface objects 7506, 7518, 7520, 7522, and 7524) are displayed in a manner that they appear to overlay the top surface of box 7502 or replacing a portion of representation 7502'. In some embodiments, the box 7502 is a table, and the user interface objects 7506, 7518, 7520, 7522, and 7524 include one or more of the user interface objects shown in the first user interface 7510, and one or more of other user interface objects not included in the first user interface 7510 (e.g., an expanded display, a full keyboard with additional keys that were not available in the first user interface 7510, a virtual desktop with application icons and document listings, etc.). In some embodiments, the box 7502 is a speaker, and the user interface objects 7506, 7518, 7520, 7522, and 7524 include one or more of the user interface objects shown in the first user interface 7510, and one or more of other user interface objects not included in the first user interface 7510 (e.g., a output routing control, browsable media database, a search input field with corresponding virtual keyboard, etc.). In some embodiments, the box 7502 is a smart lamp or appliance, and the user interface objects 7506, 7518, 7520, 7522, and 7524 include one or more of the user interface objects shown in the first user interface 7510, and one or more of other user interface objects not included in the first user interface 7510 (e.g., various settings for the smart lamp or appliance, color control, scheduling control, etc.).

In some embodiments, FIG. 7Q follows FIG. 7O, and the second user interface 7510' is displayed in response to the user putting his/her hand into the ready state, while the user's gaze is focused on box 7502. In some embodiments, FIG. 7Q follows FIG. 7P, and the user interface is displayed in response to the user putting his/her hand into the ready state and shifting his/her gaze from box 7504 to box 7502 (e.g., the first user interface 7512 ceases to be displayed after the gaze input moves away from box 7504).

In FIG. 7R, the gaze input has shifted from representation 7502' of box 7502 (e.g., a table top, a speaker, a smart lamp or appliance) to representation 7504' of box 7504 (e.g., a smart medicine cabinet), while the user's hand is in the ready state for providing a gesture input. In response to detecting the gaze input shifting from representation 7502' of box 7502 to representation 7504' of box 7504 in the three-dimensional environment, the computer system determines that the level of interaction between the user and box 7504 or representation 7504' has reached the second predefined level, and determines that the level of interaction between the user and box 7502 or representation 7502' has dropped below the second and the first predefined level. In accordance with the determination that that the level of interaction between the user and box 7502 or representation 7502' has dropped below the first predefined level, the computer system ceases to display the second user interface 7510' corresponding to box 7502. In response to determining that the level of interaction with respect to box 7504 or representation 7504' has reached the second predefined level, the computer system displays a second user interface 7512' corresponding to box 7504 at a location in the three-dimensional environment that corresponds to the location of box 7504 in the physical environment. For example, as shown in FIG. 7R, a plurality of user interface objects (e.g., user interface objects 7514, 7516, 7526, 7528, and 7530) are displayed in a manner that it appears to overlay the front surface of box 7504 or replacing a portion of representation 7504'). In some embodiments, the box 7504 is smart medicine cabinet, and the plurality of user interface objects (e.g., user interface objects 7514 and 7516) include one or more of the user interface objects shown in the first user interface 7510, and one or more of other user interface objects not included in the first user interface 7510, such as a listing of medicine or supply in the medicine cabinet, scheduling settings for the medication for the current day, temperature and authentication settings for the medicine cabinet, etc.

In some embodiments, FIG. 7R follows FIG. 7Q, and the user interface 7512 is displayed in response to the user maintaining his/her hand in the ready state and shifting his/her gaze from box 7502 to box 7504 (e.g., the second user interface 7512' ceases to be displayed after the gaze input moves away from box 7502). In some embodiments, FIG. 7R follows FIG. 7P, and the second user interface 7512' is displayed in response to the user putting his/her hand into the ready state, while the user's gaze is focused on box 7504. In some embodiments, FIG. 7R follows FIG. 7O, and the user interface 7512' is displayed in response to the user putting his/her hand into the ready state and shifting his/her gaze from box 7502 to box 7504 (e.g., the first user interface 7510 ceases to be displayed after the gaze input moves away from box 7502).

In some embodiments, when the computer system detects that the user's hand is hovering over (e.g., distance between the user's fingers and the physical object is within a threshold distance) a physical object (e.g., box 7502 or 7504), the computer system determines that a third level of interaction is reached, and displays a third user interface corresponding to the physical objet (e.g., box 7502 or 7504) even more information and/or user interface objects than the second user interface corresponding to the physical object. In some embodiments, the third user interface shrinks and is restored to the second user interface corresponding to the physical object in response to the user's hand moving away from the physical object (e.g., the distance between the user's finger and the physical object increases above the threshold distance).

In some embodiments, the computer system performs operations in response to touch inputs provided on a physical surface that is on the physical object (e.g., box 7502 or 7504). For example, the touch input is optionally detected by sensors, such as one or more cameras of the computer system, as opposed to touch sensors on the physical surface on the physical object. In some embodiments, the location of the input on the physical surface is mapped to locations of user interface objects in the first/second/third user interfaces corresponding to the physical object, such that the computer system can determine which operation to perform in accordance with the location of the touch-input on the physical surface.

In some embodiments, the user selects the user interface objects in the first/second/third user interfaces corresponding to the physical object (e.g., box 7502 or 7504) with his/her gaze within the first/second/third user interfaces. The computer performs an operation corresponding to a currently selected user interface object in response to a gesture input for activating the user interface object detected while the gaze input is on the currently selected user interface object.

In some embodiments, the user optionally utilizes a physical surface that is nearby to control a physical object that is farther away from the user. For example, the user may swipe on a physical surface nearby (e.g., the back or palm of the user's hand, a table top, the arm of an arm chair, a controller, etc.), and the user's gesture input is detected by one or more sensors (e.g., one or more cameras of the computer system), and used to interact with the currently displayed first/second/third user interfaces.

In this example, in FIGS. 7Q and 7R, a representation 7200' of hand 7200 is displayed in the computer-generated environment. The computer-generated environment does not include a representation of user's right hand (e.g., because the right hand is not within the field of view of the one or more cameras of device 7100). In addition, in some embodiments, e.g., in the example shown in FIGS. 7Q and 7R, where device 7100 is a handheld device, the user is able to see portions of the surrounding physical environment separately from any representations of the physical environment displayed on device 7100. For example, portions of the user's hands are visible to the user outside of the display of device 7100. In some embodiments, device 7100 in these examples represents and can be replaced by a headset having a display (e.g., a head-mounted display) that entirely blocks the user's view of the surrounding physical environment. In some such embodiments, no portions of the physical environment are directly visible to the user; instead, the physical environment is visible to the user through representations of portions of the physical environment that are displayed by the device. In some embodiments, the user's hand(s) are not visible to the user, either directly or via the display of the device 7100, while the current state of the user's hand(s) is continuously or periodically monitored by the device to determine if the user's hand(s) have entered a ready state for providing gesture inputs. In some embodiments, the device displays an indicator of whether the user's hand is in the ready state for providing input gestures, to provide feedback to the user and alert the user to adjust his/her hand positions if he/she wishes to provide an input gesture.

FIGS. 7S-7X are block diagrams illustrating methods for generating a computer-generated three-dimensional environment (e.g., including simulating visual interplay between a voice-based virtual assistant and physical and virtual objects in the environment), in accordance with some embodiments. FIGS. 7S-7X are used to illustrate the processes described below, including the processes in FIG. 12.

Figures 7S, 7T:
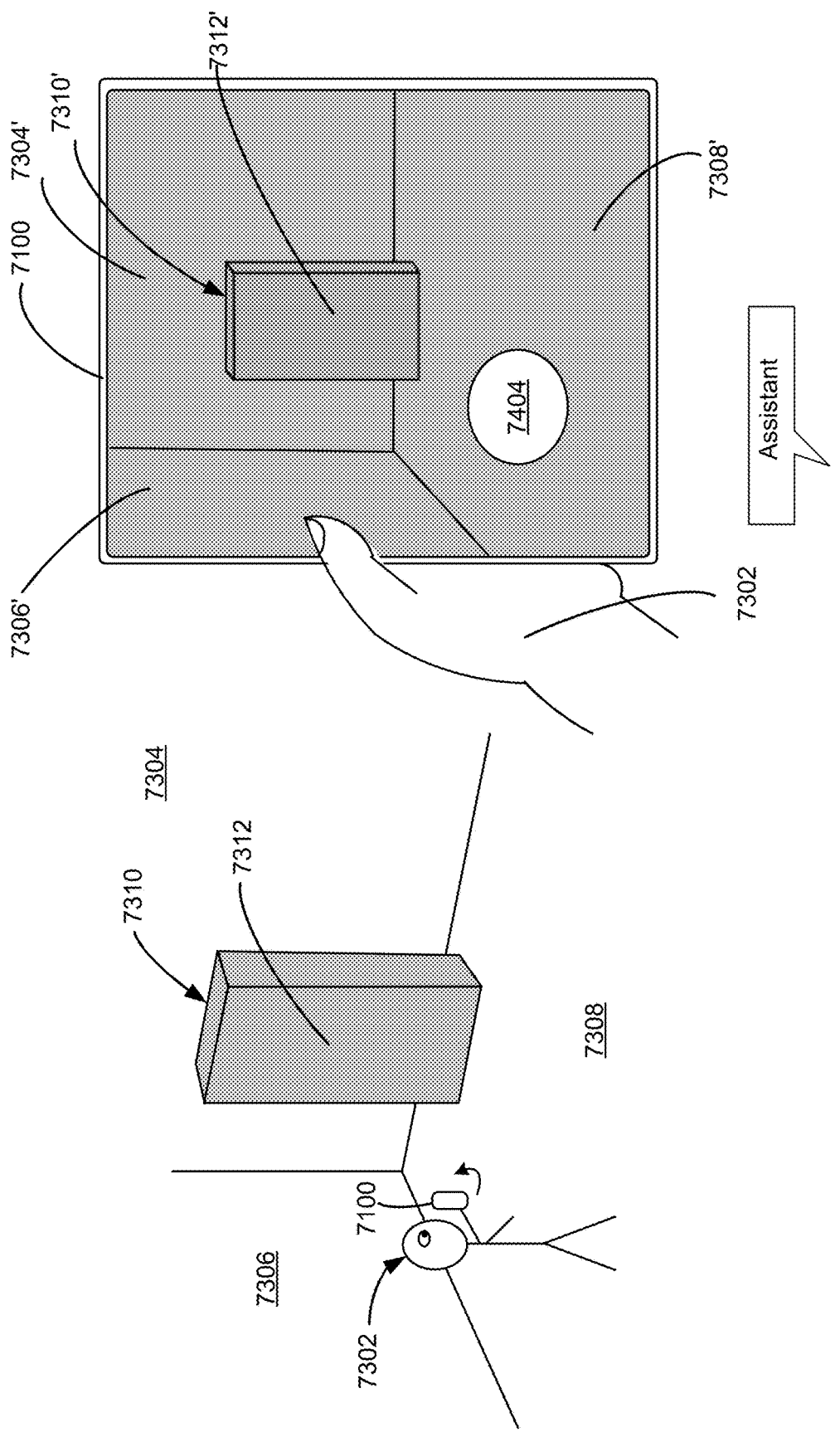
FIGS. 7S-7X are block diagrams illustrating methods for generating a computer-generated three-dimensional environment (e.g., including simulating visual interplay between a voice-based virtual assistant and physical and virtual objects in the environment), in accordance with some embodiments.
Figure 7V:
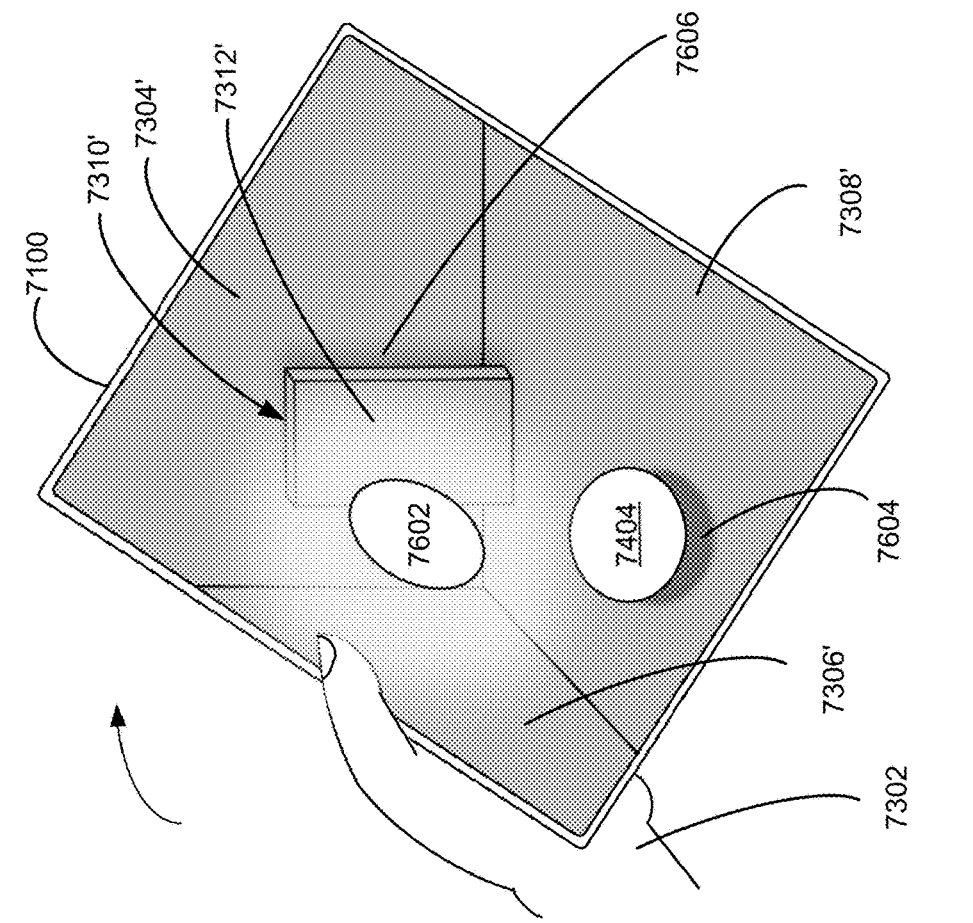
Figure 7U:
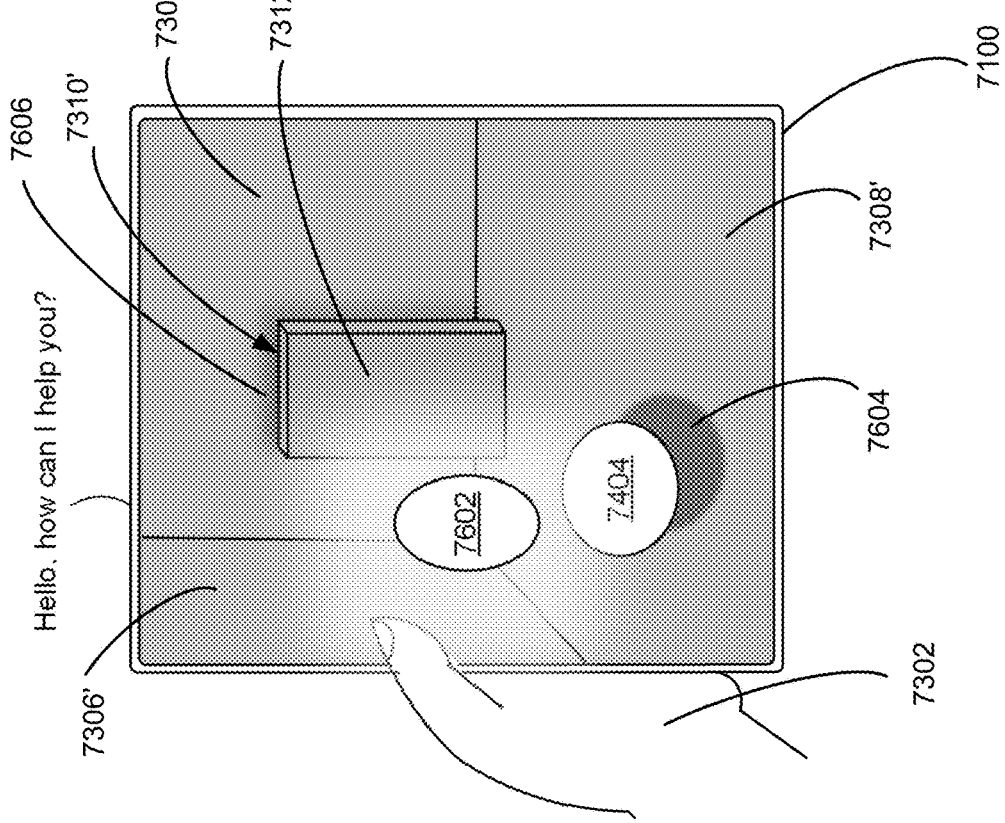
Figure 7X:
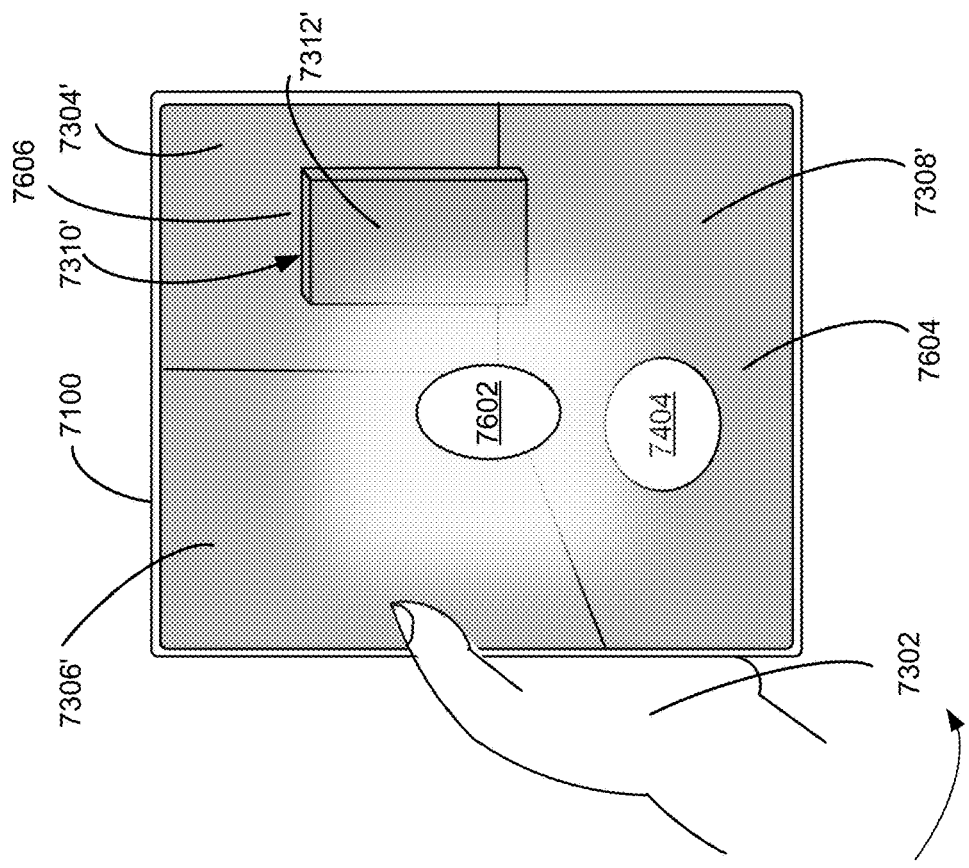

FIGS. 7T-7X illustrate an example computer-generated environment corresponding to a physical environment shown in FIG. 7S. As described herein with reference to FIGS. 7T-7X, the computer-generated environment is optionally an augmented reality environment that includes a camera view of a physical environment or a computer-generated environment that is displayed on a display such that the computer-generated environment is superimposed over a view of the physical environment that is visible through a transparent portion of the display, in accordance with some embodiments. As shown in FIG. 7T, a user 7302 is standing in a physical environment (e.g., scene 105) operating a computer system (e.g., computer system 101) (e.g., holding device 7100 or wearing an HMD). In some embodiments, as in the example shown in FIGS. 7T-7X, the device 7100 is a handheld device (e.g., a cell phone, tablet, or other mobile electronic device) that includes a display, a touch-sensitive display, or the like. In some embodiments, the device 7100 represents and is optionally replaced with a wearable headset that includes a heads-up display, a head-mounted display, or the like. In some embodiments, the physical environment includes one or more physical surfaces and physical objects (e.g., walls of a room (e.g., front wall 7304, side wall 7306), floor 7308, and furniture 7310) surrounding the user 7302. In some embodiments, one or more physical surfaces of the physical objects in the environment are visible through the display generation component of the computer system (e.g., on the display of device 7100 or via the HMD).

In the example shown in FIGS. 7T-7X, the computer-generated three-dimensional environment that corresponds to the physical environment (e.g., the portion of physical environment that is within the field of view of one or more cameras of device 7100, or visible through a transparent portion of the display of device 7100), is displayed on device 7100. The physical environment includes physical objects that have corresponding representations in the computer-generated three-dimensional environment shown by the display generation component of the computer system. For example, front wall 7304 is represented by front wall representation 7304', side wall 7306 is represented by side wall representation 7306', floor 7308 is represented by floor representation 7308', furniture 7310 is represented by furniture representation 7310', and front surface 7312 of furniture 7310 is represented by front surface representation 7312' in the computer-generated environment shown on the display (e.g., the computer-generated environment is an augmented reality environment that includes representations 7304', 7306', 7308', 7310' and 7312' of physical objects as part of a live view of one or more cameras of device 7100, or physical objects that are visible through a transparent portion of the display of device 7100). In some embodiments, the computer-generated environment shown on the display also includes virtual objects (e.g., virtual object 7404 resting over a portion of the display corresponding to a portion of floor representation 7308' of floor 7308). In some embodiments, as the viewing perspective of device 7100 relative to the physical environment changes (e.g., as the viewing angle of device 7100 or one or more cameras of device 7100 relative to the physical environment changes in response to movement and/or rotation of the device 7100 in the physical environment), the viewing perspective of the computer-generated environment as displayed on device 7100 is changed accordingly (e.g., including changing the viewing perspective of the physical surfaces and objects (e.g., wall, floor, furniture, etc.), in accordance with some embodiments.

In FIG. 7T, the computer system detects an input that corresponds to a request to activate a voice-based virtual assistant. For example, the user provides a voice-based wake-up command "Assistant!" to the computer system. In some embodiments, the user optionally turns to look at a predefined location in the three-dimensional environment that corresponds to a home location of the voice-based virtual assistant, and/or provides an activation input (e.g., a tap input on the user's finger or a controller, a gaze input, etc.).

Figure 7W:
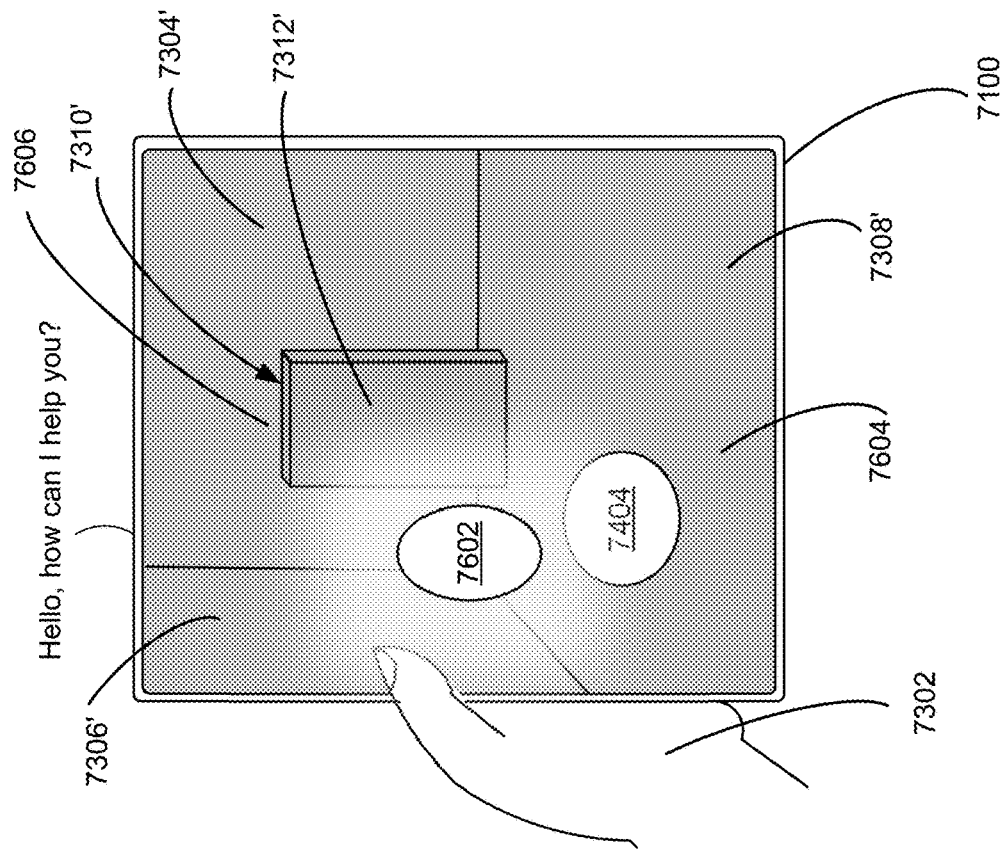

In FIGS. 7U and 7W, in response to detecting the input that corresponds to the request to activate the voice-based virtual assistant in the three-dimensional environment, the computer system displays a visual representation of the virtual assistant in the three-dimensional environment. In some embodiments, the visual representation of the virtual assistant is a virtual object 7602. For example, the virtual object 7602 is an avatar of a virtual assistant (e.g., a glowing ellipsoid, or an animated character, etc.). In some embodiments, the visual indication is not necessarily an object with a virtual surface, but a visual effect, such as illumination around the peripheral region of the display, peripheral region of the visual field of the user, or peripheral region of a target region of a gaze input. In some embodiments, other visual effect (e.g., darkening or obscuring a background of the virtual assistant or the entire display) is displayed in conjunction with displaying the visual indication of the virtual assistant.

As shown in FIGS. 7U and 7W, the visual representation of the virtual assistant has a first set of values of a first display property (e.g., luminance, color) of the visual representation when the virtual assistant is activated. For example, the visual representation is a glowing ellipsoid with a first distribution of luminance values and a first distribution of color values across the different portions of the visual representation. The computer system, in accordance with the first set of values of the first display property, modifies the visual appearance of a first physical surface 7312 of physical object 7310 or its representation 7312' in the three-dimensional environment, as well as the visual appearance of a first virtual surface of virtual object 7404 in the three-dimensional environment. For example, as shown in FIGS. 7U and 7W, the computer system generates simulated illuminations at locations in the three-dimensional environment that map to the surfaces of the physical object 7310 in the physical world, and the values of the first display property of the illumination takes into account the spatial relationship between the virtual object 7602 and the representation 7310' in the three-dimensional world, the surface characteristics of the physical object 7310, and the simulated physical laws of light propagation. In FIGS. 7U and 7W, the front surface representation 7312' of furniture representation 7310' appears illuminated by virtual object 7602, and the left side of the front surface representation 7312' appears more illuminated (e.g., with greater luminance and more saturated colors from the virtual object 7602) than the right side of the front surface representation 7312', because the virtual object 7602 is closer to the left side of the front surface representation 7312' in the three-dimensional environment. Similarly, as shown in FIGS. 7U and 7W, the computer system generates simulated illuminations at locations in the three-dimensional environment that map to the surface of the virtual object 7404 in the three-dimensional environment, and the values of the first display property of the illumination takes into account the spatial relationship between the virtual object 7602 and the virtual object 7404 in the three-dimensional world, the surface characteristics of the virtual object 7404, and the simulated physical laws of light propagation. In FIGS. 7U and 7W, the top surface of virtual object 7404 appears illuminated by the visual representation of the virtual assistant (e.g., virtual object 7602), and the middle region of the surface of virtual object 7404 appears less illuminated (e.g., with less luminance and less saturated colors from the virtual object 7602) than the top surface of virtual object 7404, because the visual representation of the virtual assistant (e.g., virtual object 7602) is closer to the top portion than to the middle portion of the surface of virtual object 7404 in the three-dimensional environment.

In some embodiments, as shown in FIGS. 7U and 7W, the computer system also generates simulated shadows for the physical objects and virtual objects under the illumination of the visual representation of the virtual assistant. For example, the computer generates a shadow 7606 behind the furniture representation 7310' in the three-dimensional environment based on the spatial relationship between the virtual object 7602 and furniture representation 7310' in the three-dimensional environment, the surface characteristics of the furniture 7310, and the simulated physical laws of light propagation. In addition, the computer generates a shadow 7604 under the virtual object 7404 in the three-dimensional environment based on the spatial relationship between the virtual object 7602 and virtual object 7404 in the three-dimensional world, the simulated surface characteristics of the virtual object 7404, and the simulated physical laws of light propagation.

As shown in FIG. 7V following FIG. 7U, in some embodiments, the position of the visual indication of the virtual assistant (e.g., virtual object 7602) is fixed relative to the display (e.g., a touch-sensitive display) or to the user's head (e.g., represented by an HMD), and moves relative to the three-dimensional environment in accordance with the movement of the display relative to the physical world, or in accordance with the movement of the user's head (or the HMD) relative to the physical world. In FIG. 7V, as the user's head (e.g., the three-dimensional environment is shown through an HMD) or the display (e.g., the touch-sensitive display) moves in the physical environment, the simulated illumination on the physical objects and virtual objects in the three-dimensional environment are adjusted because the spatial relationships between the visual representation of the virtual assistant (e.g., virtual object 7602) and representations of the physical objects (e.g., furniture representation 7310') and virtual objects (e.g., virtual object 7404) in the three-dimensional environment have changed in response to the movement. For example, the front surface representation 7312' of furniture representation 7310' is more illuminated (e.g., higher luminance and color saturation from the visual representation of the virtual assistant (e.g., virtual object 7602)) because the visual representation (e.g., virtual object 7602) is now closer to the front surface representation 7312' than before the movement. Correspondingly, the top surface of virtual object 7404 is less illuminated (e.g., lower luminance and color saturation from the visual representation of the virtual assistant (e.g., virtual object 7602)) because the visual representation (e.g., virtual object 7602) is now farther away from the virtual object 7404 than before the movement.

In contrast to the example shown in FIG. 7V, in some embodiments, the position of the visual indication of the virtual assistant (e.g., virtual object 7602) is fixed relative to the three-dimensional environment, rather than to the display (e.g., a touch-sensitive display) or to the user's head (e.g., represented by an HMD). Thus, the spatial relationships between the visual representation of the virtual assistant (e.g., visual representation 7602) and the physical objects (e.g., furniture representation 7310') and virtual objects (e.g., virtual object 7404) represented in the three-dimensional environment do not change as the display moves relative to the physical world, or as the user moves his/her head (or the HMD) relative to the physical world. In FIG. 7V, as the user's head (e.g., the three-dimensional environment is shown through an HMD) or the display (e.g., the touch-sensitive display) moves in the physical environment, the simulated illumination on the physical objects and virtual objects in the three-dimensional environment do not change because the spatial relationships between the visual representation of the virtual assistant and representations of the physical objects and virtual objects in the three-dimensional environment have not changed in response to the movement. However, the viewing perspective of the three-dimensional world shown on the display is changed due to the movement.

In some embodiments, input gestures used in the various examples and embodiments described herein optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a micro tap input is a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a micro flick gesture is a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a micro swipe gesture is a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A micro tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7X are provided below in references to methods 8000, 9000, 10000, 11000, and 12000 described with respect to FIGS. 8-12 below.

FIG. 8 is a flowchart of a method 8000 of interacting with a computer-generated three-dimensional environment (e.g., including reconfiguration and other interactions), in accordance with some embodiments. In some embodiments, the method 8000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more input devices (e.g., one or more cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In the method 8000, the computer system displays (8002) a virtual object (e.g., virtual object 7208 in FIGS. 7A(a-1) and 7B(a-1)) with a first spatial location in a three-dimensional environment (e.g., a physical environment seen through the display generation component, a simulated reality environment, a virtual reality environment, an augmented reality environment, a mixed reality environment, etc.). While displaying the virtual object (e.g., virtual object 7208) with the first spatial location in the three-dimensional environment, the computer system detects (8004) a first hand movement performed by a user (e.g., detecting movement of the user's fingers and/or wrist that meet one or more gesture recognition criteria). In response to detecting the first hand movement performed by the user (8006): in accordance with a determination that the first hand movement meets first gesture criteria (e.g., the first hand movement is a pinch and drag gesture (e.g., movement of the pinching fingers is resulted from the whole hand moving laterally), or a swipe gesture (e.g., a micro-swipe gesture by a finger across the surface of another finger or a controller)), the computer system performs a first operation (e.g., rotating the virtual object, adjusting a control associated with the virtual object, navigating within the virtual object (e.g., flipping pages of virtual book), etc.) in accordance with the first hand movement, without moving the virtual object away from the first spatial location (e.g., a pinch and drag gesture before the reconfiguration mode is entered does not move the object from one location to another location). This is illustrated in FIG. 7A(a-1) to FIG. 7A(a-3), and FIG. 7A(a-1) followed by FIGS. 7A(a-4) and 7A(a-5), for example. In response to detecting the first hand movement performed by the user (8006): in accordance with a determination that the first hand movement meets second gesture criteria (e.g., a pinch gesture followed by a wrist flick gesture (e.g., movement of the pinching fingers is resulted from the hand rotating around the wrist (e.g., flicking upward or sideways))), the computer system displays a first visual indication that the virtual object has transitioned into a reconfiguration mode (e.g., the device activates reconfiguration mode for the virtual object, the virtual object is dislodged from original location and/or becomes semi-transparent and hovering over the original location). This is illustrated in FIGS. 7B(a-1)-7B(a-3), for example. While displaying the virtual object with the first visual indication that the virtual object has transitioned into the reconfiguration mode, the computer system detects (8008) a second hand movement performed by the user. In response to detecting the second hand movement performed by the user: in accordance with a determination that the second hand movement meets the first gesture criteria (e.g., the first hand movement is a pinch and drag gesture (e.g., movement of the pinching fingers is resulted from the whole hand moving laterally)), the computer system moves (8010) the virtual object from the first spatial location to a second spatial location (e.g., without performing the first operation) in accordance with the second hand movement (e.g., once the reconfiguration mode is entered, the wrist flick no longer needs to continue, and a simple pinch and drag gesture moves the object from one location to another location). This is illustrated in FIGS. 7B(a-3) to 7B(a-6), or FIGS. 7B(a-5) and 7B(a-6) following FIG. 7B(a-2), for example.

In some embodiments, in the method 8000, in response to detecting the first hand movement performed by the user: in accordance with a determination that the first hand movement meets third gesture criteria (e.g., the first hand movement is a micro-tap gesture, without lateral and rotational movement of the hand as a whole), the computer system performs a second operation corresponding to the virtual object (e.g., activating a function (e.g., launching an application, a communication session, displaying content etc.) that corresponds to the virtual object)). In some embodiments, in response to detecting the second hand movement performed by the user: in accordance with a determination that the second hand movement meets the third gesture criteria (e.g., the second hand movement is a micro-tap gesture, without lateral and rotational movement of the hand as a whole), the device cease to display the first visual indication that the virtual object has transitioned into the reconfiguration mode to indicate that the virtual object has exited the reconfiguration mode (e.g., the device deactivates reconfiguration mode for the virtual object, returns the virtual object to its original location if it has not been moved or lets the virtual object settles into a new location if it has been moved by a user input, and restores the virtual object's original appearance). In some embodiments, in response to detecting the second hand movement performed by the user: in accordance with a determination that the second hand movement does not meet the first gesture criteria (e.g., the second hand movement is a free hand movement without pinching the fingers together or without satisfying other predefined gesture criteria, the device maintains the virtual object in the reconfiguration mode without moving the virtual object. In other words, while the virtual object is in the reconfiguration mode, the user is allowed to move the user's hand in ways that do not correspond to gestures to move the virtual object and do not cause the virtual object to exit the reconfiguration mode. For example, the user can use this opportunity to explore the three-dimensional environment, and prepare a suitable location to which to subsequent move the virtual object.

In some embodiments, the second hand movement does not meet the second gesture criteria (e.g., the second hand movement is not a pinch gesture followed by a wrist flick gesture (e.g., movement of the pinching fingers is resulted from the hand rotating around the wrist (e.g., flicking upward or sideways))).

In some embodiments, the second gesture criteria includes a requirement that is met by a pinch gesture followed by a wrist flick gesture (e.g., the second gesture criteria are met with respect to the virtual object when the thumb and index fingers of the hand move toward and make contact with each other at a location in the three-dimensional space that corresponds to the location of the virtual object, followed by the whole hand rotating around the wrist while the thumb and index fingers maintain contact with each other).

In some embodiments, the second gesture criteria includes a requirement that is met by a wrist flick gesture that is detected while object selection criteria are met (e.g., the second gesture criteria are met with respect to the virtual object when the whole hand quickly rotates around the wrist (e.g., a flick gesture) while the virtual object is currently selected (e.g., by a previous selection input (e.g., a gaze input directed to the virtual object, a pinch gesture directed to the virtual object, a two-finger tap gesture directed to the virtual object, etc.)). In some embodiments, the previous selection input may be ongoing (e.g., in the case of a pinch gesture, or gaze input) or has ended (e.g., in the case of a two-finger tap gesture to select the virtual object) when the wrist flick gesture is detected.

In some embodiments, the first gesture criteria includes a requirement that is met by a movement input provided by one or more fingers (e.g., a single finger or multiple fingers moving laterally in unison) of the hand (e.g., lateral movement of the finger across the air or across a surface (e.g., the surface of a controller or the surface of the hand or another finger), or a tap movement of the finger in the air or on a surface (e.g., the surface of a controller or the surface of the hand or another finger)).

In some embodiments, while displaying the virtual object with the first visual indication that the virtual object has transitioned into the reconfiguration mode, the computer system detects a predefined input specifying a destination location for the virtual object in the three-dimensional environment (e.g., detecting the predefined input includes detecting movement of a user's gaze from the first spatial location to the second spatial location, or detecting a tap input by a finger of the hand (e.g., tap in the air or on a surface of a controller or the same hand) while the user's gaze is focused on the second spatial location in the three-dimensional space). In response to detecting the predefined input specifying the destination location for the virtual object in the three-dimensional environment, the computer system displays a second visual indication (e.g., a glowing or shadowy overlay (e.g., in the shape of the virtual object)) at the destination location before moving the virtual object from the first spatial location to the destination location (e.g., the second spatial location or a location different from the second spatial location). In some embodiments, the second visual indication is displayed at the destination location in response to detecting the predefined input before the second hand movement that actually moves the virtual object is detected. In some embodiments, the second hand movement that meets the first gesture criteria is a tap input, a finger flick input, a hand swipe input, or a pinch and drag input, etc., that is detected after the destination location for the virtual object has been specified by the predefined input (e.g., a gaze input, a tap input) provided while the virtual object is in the reconfiguration mode. In some embodiments, the predefined input is detected before the second hand movement is detected (e.g., in the case where the predefined input is a gaze input or tap input that selects the destination location for the virtual object (e.g., the user can look away from the destination location after providing the predefined input) and the second hand movement is a small finger flick or finger tap without whole hand movement that initiates the movement of the virtual object toward the destination location). In some embodiments, the predefined input is detected concurrently with the second hand movement (e.g., in the case where the predefined input is a gaze input that is focused on the destination location for the virtual object (e.g., the user maintains the gaze at the destination location while the second movement (e.g., a small finger flick or finger tap without whole hand movement) initiates the movement of the virtual object toward the destination location)). In some embodiments, the predefined input is the second hand movement (e.g., the predefined input is a pinch gesture that grabs the virtual object and drags the virtual object to the destination location.

In some embodiments, detecting the predefined input specifying the destination location for the virtual object in the three-dimensional environment includes detecting a movement (e.g., movement of the gaze input, or movement of the finger before the tap of the finger) in the predefined input, and wherein displaying the second visual indication (e.g., a glowing or shadowy overlay (e.g., in the shape of the virtual object)) at the destination location includes updating a location of the second visual indication based on the movement of the predefined input (e.g., the location of the glowing or shadowy overlay (e.g., in the shape of the virtual object) is continuously and dynamically changed in accordance with the movement of the gaze input and/or the location of the finger before the tap of the input).

In some embodiments, after termination of the second hand movement that meets the first gesture criteria, and while the virtual object remains in the reconfiguration mode (e.g., after the object has been moved in accordance with the second hand movement, and while the virtual object is displayed with the first visual indication that the virtual object has transitioned into the reconfiguration mode), the computer system detects a third hand movement that meets the first gesture criteria (e.g., a micro swipe gesture with thumb swiping across the side of the index finger of the same hand, or a swipe gesture by a finger on a touch-sensitive surface of a controller). In response to detecting the third hand movement, the computer system moves the virtual object from a current location of the virtual object to a third spatial location in accordance with the third hand movement.

In some embodiments, the three-dimensional environment includes one or more planes (e.g., surfaces of physical objects, simulated surfaces of virtual objects, surfaces of virtual objects that represent physical objects, etc.), and moving the virtual object from the first spatial location to the second spatial location in accordance with the second hand movement includes constraining a movement path of the virtual object to a first plane of the one or more planes during the movement of the virtual object in accordance with the second hand movement (e.g., if the first spatial location and the second spatial location are on the same plane, the virtual objects slides along the plane, even when the movement path of the second hand movement does not strictly follow the plane).

The method of any of claims 1-10, In some embodiments, the three-dimensional environment includes at least a first plane and a second plane (e.g., surfaces of physical objects, simulated surfaces of virtual objects, surfaces of virtual objects that represent physical objects, etc.) and moving the virtual object from the first spatial location to the second spatial location in accordance with the second hand movement includes: constraining a movement path of the virtual object to the first plane during a first portion of the movement of the virtual object in accordance with the second hand movement, constraining the movement path of the virtual object to the second plane during a second portion of the movement of the virtual object in accordance with the second hand movement, and increasing an elevation of the virtual object during a third portion of the movement of the virtual object between the first portion of the movement and the second portion of the movement of the virtual object (e.g., the object flies up when switching between planes in the real world).

In some embodiments, in response to detecting the first hand movement performed by the user: in accordance with a determination that the first hand movement meets the second gesture criteria (e.g., a pinch gesture followed by a wrist flick gesture (e.g., movement of the pinching fingers is resulted from the hand rotating around the wrist (e.g., flicking upward or sideways))), the computer system generates an audio output in conjunction with displaying the first visual indication to indicate that the virtual object has transitioned into the reconfiguration mode (e.g., the device generates a discrete audio output (e.g., a beep, or a chirp) that provides an indication that the virtual object has been dislodged from its original location, and/or generates a continuous audio output (e.g., continuous music or sound waves) while the virtual object remains in the reconfiguration mode).

In some embodiments, while the virtual object is in the reconfiguration mode, the computer system detects a fourth hand movement after detecting the second hand movement and moving the virtual object in accordance with the second movement. In response to detecting the fourth hand movement: in accordance with a determination that the fourth hand movement meets the first gesture criteria, the computer system moves the virtual object from the second spatial location to a third spatial location in accordance with the fourth hand movement; and in accordance with a determination that the fourth hand movement meets fourth gesture criteria (e.g., a pinch gesture followed by a wrist flick gesture (e.g., movement of the pinching fingers is resulted from the hand rotating around the wrist (e.g., flicking downward))), the computer system ceases to display the first visual indication to indicate that the virtual object has exited the reconfiguration mode. In some embodiments, the device display an animation illustrating the virtual object settling into the third spatial location in the three-dimensional environment in conjunction with ceasing to display the first visual indication (e.g., restoring the normal appearance of the virtual object).

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, and 12000) are also applicable in an analogous manner to method 8000 described above with respect to FIG. 8. For example, the gestures, gaze inputs, physical objects, user interface objects, and/or animations described above with reference to method 8000 optionally have one or more of the characteristics of the gestures, gaze inputs, physical objects, user interface objects, and/or animations described herein with reference to other methods described herein (e.g., methods 9000, 10000, 11000, and 12000). For brevity, these details are not repeated here.

FIG. 9 is a flowchart of a method 9000 of generating a computer-generated three-dimensional environment (e.g., including simulating visual interplay between physical and virtual objects), in accordance with some embodiments. In some embodiments, the method 9000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more input devices (e.g., cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In the method 9000, the computer system displays (9002), via the display generation component, a three-dimensional scene that includes at least a first virtual object (e.g., virtual object 7332 in FIGS. 7E and 7F) at a first location (e.g., a virtual window on the wall, a virtual screen on the wall that is displaying a movie) and a first physical surface (e.g., front wall 7304, side wall 7306, floor 7308, furniture 7310, or respective representations thereof) at a second location (e.g., a bookcase in the room away from the wall, the wall, or the floor of the room) that is separate from the first location (e.g., the first virtual object and the first physical surface are separated by real or simulated free space), wherein the virtual object is displayed with a first value for a first display property (e.g., luminance and color values in first portions 7332-*b* and 7332-*c*, and 7332-*b'* and 7332-*c'*) that corresponds to a first portion of the virtual object and a second value for the first display property that corresponds to a second portion of the virtual object (e.g., luminance and color values in second portions 7332-*a* and 7332-*d*, and 7332-*a'* and 7332-*d'*) (e.g., the virtual object has different luminance values or colors in different portions of the virtual object, and the first display property does not pertain to the shape or dimensions of the virtual object), the second value of the first display property being distinct from the first value of the first display property. While displaying the three-dimensional scene including the first virtual object and the first physical surface, the computer system generates (9004), via the display generation component, a first visual effect at the second location of the three-dimensional scene (e.g., the location of the physical surface in the scene). Generating the first visual effect includes: modifying a visual appearance of a first portion of the first physical surface in the three-dimensional scene in accordance with the first value for the first display property that corresponds to the first portion of the first virtual object; and modifying a visual appearance of a second portion of the first physical surface in the three-dimensional scene in accordance with the second value for the first display property that corresponds to the second portion of the first virtual object, wherein the visual appearance of the first portion of the first physical surface and the visual appearance for the second portion of the first physical surface are modified differently (e.g., according to the simulated spatial relationships between the virtual object and the physical surface, the real and simulated physical properties of the virtual object and physical surface, and simulated laws of physics) due to differences in the first value and the second value of the first display property in the first and second portions of the first virtual object (e.g., the different colors and luminance values for different portions of the virtual object change the color and brightness of different portions of the physical surface differently due to the spatial relationships between the different portions of the virtual object and the different portions of the physical surface). This is illustrated in FIGS. 7E-7F, for example.

In some embodiments, the computer system detects changes in appearance of the first virtual object, including value changes of the first display property in the first and second portions of the first virtual object. In response to detecting the changes in appearance of the first virtual object, the computer system modifies the visual appearance of the first physical surface at different portions of the first physical surface in accordance with the changes in the appearance of the first virtual object. The modifying includes modifying the visual appearance of the first portion of the first physical surface in accordance with a first relationship between the first display property and the visual appearance of the first portion of the first physical surface; and modifying the visual appearance of the second portion of the first physical surface in accordance with the second relationship between the first display property and the visual appearance of the second portion of the first virtual object, wherein the first relationship and the second relationship correspond to different physical characteristics of the first and second portions of the first physical surface. For example, the first relationship and the second relationship are both based on simulated physical laws for light emanating from the virtual object interacting with the first physical surface, but are different due to the distance, shape, surface texture and optical properties corresponding to different portions of the first physical surface, and/or different spatial relationship between the different portions of the first physical surface and each respective portion of the first virtual object.

In some embodiments, the first virtual object includes a virtual overlay (e.g., a virtual window showing virtual scenery (e.g., as viewed from a window)) on a second physical surface (e.g., a wall) at a location that corresponds to the first location in the three-dimensional scene (e.g., the first virtual object is a virtual window that is displayed at a location that corresponds to a physical window or a portion of a physical wall in the real world), and wherein the computer system changes an appearance of the virtual overlay (e.g., changes the appearance of the scenery shown in the virtual overlay) in accordance with a change in respective values of one or more parameters including at least one of a time of day, a location, and a size of the virtual overlay. For example, as the time of day changes in the real world or in a setting set by a user, the device changes the virtual scenery (e.g., a view of a city, nature, landscape, plant, etc.) shown in the virtual overlay (e.g., virtual window) in accordance with the change of the time of day. In another example, the user or device specifies a scene location for the virtual scenery shown in the virtual overlay, and the virtual scenery is selected from a database of sceneries based on the scene location. In another example, the user requests the computer system to increase or decrease the size of the virtual overlay (e.g., transitioning from a small virtual window, to a large virtual window, to replace the entire wall with a virtual window, etc.), and the computer system changes the amount of virtual scenery presented through the virtual overlay.

In some embodiments, generating the first visual effect includes: modifying the visual appearance of the first portion of the first physical surface (e.g., an opposing wall or the floor in the real world) in accordance with changes in content shown in a first portion of the virtual overlay; and modifying the visual appearance of the second portion of the first physical surface in accordance with changes in content shown in a second portion of the virtual overlay. For example, on the floor surface in the real world, the amount of light, the color of the light, as well as the direction of the light (e.g., depending on the time of day) coming from different portions of the virtual window overlaid on the physical wall causes different simulated illuminations on the floor surface in front of the virtual window. The computer system generates a second virtual overlay for the floor surface that simulate the different amount, color, and direction of illuminations in different portions of the second virtual overlay that correspond to different portions of the floor surface. For example, as the time of day changes, the amount of light and direction of light corresponding to the virtual window change accordingly, and the amount of simulated illumination shown in the second virtual overlay on the floor also changes (e.g., direction of light is different in the morning, noon, and evening, and the color and tone of light are also different).

In some embodiments, the first virtual object includes a virtual screen that displays media content (e.g., a flat virtual screen that displays a movie or video, a three-dimensional space or dome surface that displays a three-dimensional movie or immersive holographic experience from the view point of the user) at the location that corresponds to the first location in the three-dimensional scene (e.g., the virtual screen is freestanding and not attached to any physical surface, or is overlaid on a physical surface such as a wall or TV screen), and the computer system changes content shown on the virtual screen in accordance with playback progress of a media item. For example, as the movie or video playback progresses, the content shown on the virtual screen (e.g., 2D or 3D, or immersive) in accordance with the current playback location of the movie or video.

The method of claim 18, In some embodiments, generating the first visual effect includes: modifying the visual appearance of the first portion of the first physical surface (e.g., an opposing wall or the floor in the real world) in accordance with changes in content shown in a first portion of the virtual screen; and modifying the visual appearance of the second portion of the first physical surface in accordance with changes in content shown in a second portion of the virtual screen. For example, on the surfaces of the physical objects in the surrounding environment (e.g., surfaces of the floor, wall, couch, and the user's body, etc.), the amount of light, and the color of the light, as well as the direction of the light coming from different portions of the virtual screen cause different simulated illuminations on the surfaces of the physical objects in the surrounding environment. The device generates virtual overlays for the surrounding physical surfaces that simulate the different amount, color, and direction of illuminations in different portions of the virtual overlays that correspond to different portions of the physical surfaces. As the movie scene changes, the amount of light, color of light, and direction of light also changes, and that changes the simulated illuminations overlaid on the surrounding physical surfaces as well.

In some embodiments, the first virtual object is a virtual assistant that interacts with a user via speech (e.g., the virtual assistant is activated in various context and provides assistance to users regarding various tasks and interactions with the electronic device), and the computer system changes the appearance of the virtual assistant in accordance with an mode of operation of the virtual assistant. For example, the color, size, hue, brightness, etc. of the virtual assistant changes as the virtual assistant is performing different tasks or in various modes of operation (e.g., in a dormant state, listening for user's instructions, being moved from one location to another location, in the process of performing a task in accordance with a user's command, completed a task, performing different types of tasks, etc.). As a result of the changes in appearance of the virtual assistant, the device generates simulated illuminations on physical surfaces at locations corresponding to locations surrounding the virtual assistant.

In some embodiments, generating the first visual effect includes modifying the visual appearance of the first portion of the first physical surface (e.g., a reflective physical surface) in accordance with simulated reflection of the first virtual object on the first portion of the first physical surface (e.g., simulated reflection is generated by the device in accordance with surface properties of the first portion of the first physical surface, the relative locations of the first virtual object and the first portion of the first physical surface in the three-dimensional scene, the simulated physical properties of the light emanating from the first virtual object, and physical laws of light propagation that govern how light is reflected, transmitted, and how objects are illuminated by this light in the real world). In some embodiments, generating the first visual effect further includes modifying the visual appearance of the second portion of the first physical surface (e.g., a reflective physical surface) in accordance with simulated reflection of the first virtual object on the second portion of the first physical surface (e.g., simulated reflection is generated by the device in accordance with surface properties of the second portion of the first physical surface, the relative locations of the first virtual object and the second portion of the first physical surface in the three-dimensional scene, the simulated physical properties of the light emanating from the first virtual object, and physical laws of light propagation that govern how light is reflected, transmitted, and how objects are illuminated by this light in the real world).

In some embodiments, generating the first visual effect includes modifying the visual appearance of the first portion of the first physical surface (e.g., a non-reflective physical surface) in accordance with simulated shadows cast by the first virtual object on the first portion of the first physical surface (e.g., simulated shadow is generated by the device in accordance with surface properties of the first portion of the first physical surface, the relative locations of the first virtual object and the first portion of the first physical surface in the three-dimensional scene, the simulated physical properties (e.g., shape, size, etc.) of the first virtual object, real light sources, and simulated light sources present in the three-dimensional scene, and physical laws of light propagation and refraction). In some embodiments, generating the first visual effect further includes modifying the visual appearance of the second portion of the first physical surface (e.g., a non-reflective physical surface) in accordance with simulated shadows of the first virtual object on the second portion of the first physical surface (e.g., simulated shadow is generated by the device in accordance with surface properties of the second portion of the first physical surface, the relative locations of the first virtual object and the second portion of the first physical surface in the three-dimensional scene, the simulated physical properties (e.g., shape, size, etc.) of the first virtual object, real light sources, and simulated light sources present in the three-dimensional scene, and physical laws of light propagation that govern how light is reflected, transmitted, and how objects are illuminated by this light in the real world).

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, and 12000) are also applicable in an analogous manner to method 9000 described above with respect to FIG. 9. For example, the gestures, gaze inputs, physical objects, user interface objects, and/or animations described above with reference to method 9000 optionally have one or more of the characteristics of the gestures, gaze inputs, physical objects, user interface objects, and/or animations described herein with reference to other methods described herein (e.g., methods 8000, 10000, 11000 and 12000). For brevity, these details are not repeated here.

FIG. 10 is a flowchart of a method 10000 of generating a computer-generated three-dimensional environment and facilitating user interaction with the three-dimensional environment (e.g., including gradually adjusting a level of immersiveness of the computer-generated experience based on user inputs), in accordance with some embodiments. In some embodiments, the method 10000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more input devices (e.g., cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the method 10000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In the method 10000, the computer system displays (10002), via the display generation component, a three-dimensional scene, the three-dimensional scene includes a first set of physical elements (e.g., physical objects or representations thereof shown in FIG. 7G) (e.g., physical objects as seen through a transparent portion of a display generation component or physical objects represented by their images in a camera view of a physical environment of the physical objects, where respective locations of the physical elements in the three-dimensional scene correspond to respective locations of the physical objects in a physical environment surrounding the display generation component) and a first quantity of virtual elements (e.g., no virtual objects, or only simple virtual objects representing user interface elements and controls). The first set of physical elements includes at least physical elements corresponding a first class of physical objects (e.g., walls, or a wall directly facing the display generation component, windows, etc.) and physical elements corresponding to a second class of physical objects (e.g., sidewalls that are distinguished from the wall directly facing the display generation component, ceiling and floor that are distinguished from walls, walls that are distinguished from windows, physical objects inside the room, vertical physical surfaces that are inside the room, horizontal surfaces that are inside the room, surfaces that are larger than a preset threshold, surfaces of real furniture in the room, etc.). While displaying the three-dimensional scene with the first quantity of virtual elements via the display generation component, the computer system detects (10004) a sequence of two or more user inputs (e.g., a sequence of two or more swipe inputs, a sequence of two or more snaps, an input corresponding to the user putting an HMD on his/her head, followed by an input corresponding to the user taking his/her hands off the HMD, followed by an input corresponding to the user sitting back with the HMD on his/her head) (e.g., the two or more user inputs are distinct from user inputs that drag and/or drop specific virtual objects (e.g., with input focus on the specific virtual objects) into the three-dimensional scene). In response to detecting consecutive user inputs of the sequence of two or more user inputs, the computer system successively increases (10006) a quantity of virtual elements displayed in the three-dimensional scene in accordance with the consecutive inputs of sequence of two or more user inputs (e.g., successively increasing the level of immersiveness of the three-dimensional scene by replacing additional class(es) of physical elements in the three-dimensional scene in response to consecutive user inputs of the same type or consecutive user inputs in a sequence of related inputs). Specifically, the computer system, in response to detecting a first user input (e.g., input by hand 7200 in FIG. 7G) of the sequence of two or more user inputs, and in accordance with a determination that the first user input meets first criteria (e.g., criteria for detecting a gesture to increase the level of emersion of the computer-generated experience), displays the three-dimensional scene with at least a first subset of the first set of one or more physical elements (e.g., some, not all, of the first set of one or more physical elements become obscured or blocked by newly added virtual elements) and a second quantity of virtual elements (e.g., virtual object 7402 in FIGS. 7H and 7I). The second quantity of virtual elements occupies a greater portion of the three-dimensional scene than the first quantity of virtual elements, including a first portion of the three-dimensional scene that was occupied by a first class of physical elements (e.g., walls) prior to detection of the first user input (e.g., displaying a virtual element such as virtual scenery or virtual window that blocks the view of a first set of physical surfaces (e.g., walls, etc.) in the three-dimensional scene). In addition, in response to detecting a second user input (e.g., input by hand 7200 in FIG. 7I) of the sequence of two or more user inputs, and in accordance with a determination that the second user input follows the first user input and meets the first criteria, the computer system displays the three-dimensional scene with at least a second subset of the first set of one or more physical elements (e.g., more, or all, of the first set of one or more physical elements become obscured or blocked by newly added virtual elements) and a third quantity of virtual elements (e.g., virtual objects 7402 and 7406 in FIGS. 7J and 7K). The third quantity of virtual elements occupies a greater portion of the three-dimensional scene than the second quantity of virtual elements, including the first portion of the three-dimensional scene that was occupied by the first class of physical elements prior to detection of the first user input and a second portion of the three-dimensional scene that was occupied by a second class of physical elements prior to detection of the second user input (e.g., continuing to display the virtual elements such as virtual scenery or virtual window that blocks the view of a first set of physical surfaces (e.g., walls, etc.) in the three-dimensional scene, and displaying additional virtual elements such as virtual decorations and virtual surfaces that block the view of a second set of physical surfaces (e.g., tabletops, surfaces of shelves and appliances, etc.)). This is illustrated in FIGS. 7G-7L, for example.

In some embodiments, displaying the second quantity of virtual elements in response to detecting the first user input of the sequence of two or more user inputs includes displaying a first animated transition that gradually replaces (e.g., replaces display of objects that would be visible via pass through video or obscures objects that would be directly visible through a transparent or partially transparent display) an increasing amount of the first class of physical elements in the three-dimensional scene with virtual elements (e.g., new virtual elements and/or expansion of existing virtual elements). Displaying the third quantity of virtual elements in response to detecting the second user input of the sequence of two or more user inputs includes displaying a second animated transition that gradually replaces an increasing amount of the second class of physical elements in the three-dimensional scene with virtual elements (e.g., new virtual elements and/or expansion of existing virtual elements) while the first class of physical elements are displayed in place of existing virtual elements (e.g., the second quantity of virtual elements) in the three-dimensional scene. For example, in response to the first input (e.g., a first swipe input on a controller or a user's hand), the device replaces the view of a first physical wall visible in the three-dimensional scene (e.g., wall directly facing the display generation component) with a virtual scenery of a forest, leaving the other physical walls, the physical ceiling, and the physical floor visible in the three-dimensional scene. When replacing the view of the first physical wall, the device displays an animated transition that fades in the virtual scenery of the forest gradually. In response to the second input (e.g., a second swipe input on the controller or the user's hand), the device replaces the view of the remaining physical walls (e.g., walls that are not directly facing the display generation component) visible in the three-dimensional scene with the virtual scenery of the forest that extends from the portion that were already visible in the three-dimensional scene, leaving only the physical ceiling and the physical floor visible in the three-dimensional scene. When replacing the view of the remaining physical walls, the device displays an animated transition that expands the existing view of the virtual forest from the location of the first physical wall to the rest of the walls gradually. In some embodiments, in response to a third input (e.g., a third swipe input on the controller or user's hand), the device replaces the view of the ceiling (and optionally the floor) that is still visible in the three-dimensional scene with the virtual scenery of the forest that extends from existing view of the virtual forest from the location of the surrounding physical walls toward the center of the ceiling gradually (e.g., showing a portion of the virtual sky viewed from a clearing in the virtual forest) (and optionally, toward the center of the floor gradually (e.g., showing the ground of the virtual clearing in the virtual forest)). In response to a fourth input (e.g., a fourth swipe input on the controller or user's hand), the device replaces the view of other physical objects that are still visible in the three-dimensional scene with virtual overlays gradually fade in on the surfaces of the physical objects and become more and more opaque and saturated.

In some embodiments, when successively increasing the quantity of virtual elements in accordance with the consecutive inputs of sequence of two or more user inputs, the computer system, in response to detecting a third user input of the sequence of two or more user inputs, and in accordance with a determination that the third user input follows the second user input and meets the first criteria, displays the three-dimensional scene with a fourth quantity of virtual elements. The fourth quantity of virtual elements occupies a greater portion of the three-dimensional scene than the third quantity of virtual elements (e.g., the fourth quantity occupies all of the three-dimensional scene), including the first portion of the three-dimensional scene that was occupied by the first class of physical elements (e.g., physical windows, or a wall facing the display generation component) prior to detection of the first user input, the second portion of the three-dimensional scene that was occupied by the second class of physical elements (e.g., walls, or walls not facing the display generation component) prior to detection of the second user input, and a third portion of the three-dimensional scene that was occupied by a third class of physical elements (e.g., physical objects within the room) prior to detection of the third user input.

In some embodiments, in response to detecting the second user input of the sequence of two or more user inputs and in accordance with the determination that the second user input follows the first user input and meets the first criteria, the computer system displays a third animated transition between displaying the second quantity of virtual elements and displaying the third quantity of virtual elements. In some embodiments, the rendering of the second quantity of virtual element is more artificial and less realistic, and the rendering of the third quantity of virtual elements (including the previously displayed second quantity of virtual elements and additional virtual elements) is more realistic and represents a more immersive computer-generated reality experience.

In some embodiments, the second quantity of virtual elements include a view into a first virtual environment (e.g., a virtual window showing the scene of a different geographic location (e.g., a real-time video feed or a simulated scene)) that is displayed with at least a first subset of the first set of one or more physical elements. The view into the first virtual environment has a first set of values for a first display property (e.g., distribution of luminance, color, hue, etc.) of a portion of the first virtual environment represented in the view (e.g., the virtual window shows pink morning light reflected from a top of a snowy mountain). The computer system modifies a visual appearance of at least a portion of the first subset of the first set of one or more physical elements in accordance with the first set of values for the first display property of the portion of the first virtual environment represented in the view into the first virtual environment (e.g., the correspondence between the first set of values for the first display property of the view of the first virtual environment shown in the virtual window and the changes in the visual appearance of the first subset of physical elements is based on simulated physics laws, such as the laws of light propagation that govern how light is reflected, transmitted, and how objects are illuminated by this light in the real world, the real or simulated surface properties of the first subset of physical elements, and the relative locations of the virtual window to the first subset of physical elements in the three-dimensional scene).

In some embodiments, while displaying the second quantity of virtual elements including the view into the first virtual environment (e.g., a virtual window showing the scene of a different geographic location (e.g., a real-time video feed or a simulated scene)) that is displayed with at least the first subset of the first set of one or more physical elements, the computer system detects an input that meets second criteria (e.g., criteria for displaying a navigation menu for changing the view into the virtual environment, without changing the level of immersion) (e.g., criteria for detecting a long press gesture by the user's finger, or hand). In response to detecting the input that meets the second criteria (e.g., a long press input that is maintained for at least a respective time threshold) that are distinct from the first criteria, the computer system displays a plurality of selectable options for changing the view into the first virtual environment (e.g., including menu options for changing the virtual environment represented in the virtual window (e.g., by changing the location, time of day, lighting, weather condition, zoom level, viewing perspective, season, date, etc.)). In some embodiments, the computer system detects an input selecting one of the displayed selectable options, and in response, the computer system replaces the view into the first virtual environment with a view into a second virtual environment (e.g., an ocean, or cave, etc.) distinct from the first virtual environment, or updates the view to show the first virtual environment with at least one changed parameter (e.g., time of day, season, date, location, zoom level, viewing angle, etc.) that alters the appearance of the first virtual environment.

In some embodiments, while displaying the second quantity of virtual elements including the view into the first virtual environment (e.g., a virtual window showing the scene of a different geographic location (e.g., a real-time video feed or a simulated scene)) that is displayed with at least the first subset of the first set of one or more physical elements, the computer system detects an input that meets third criteria (e.g., criteria for changing the view into the virtual environment, without changing the level of immersion) (e.g., criteria for detecting a swipe gesture by the user's finger, or hand). In response to detecting the input that meets the third criteria, the computer system replaces the view into the first virtual environment with a view into a second virtual environment (e.g., an ocean, or cave, etc.) distinct from the first virtual environment. In some embodiments, when the content of the view changes (e.g., with the changing time of day, location, zoom level, viewing angle, season, etc.), the computer system also modifies the visual appearance of at least the portion of the first subset of the first set of one or more physical elements in accordance with the changed values for the first display property of the portion of the virtual environment represented in the content of the view (e.g., the correspondence between the first set of values for the first display property of the view of the virtual environment shown in the virtual window and the changes in the visual appearance of the first subset of physical elements is based on simulated physics laws, such as the laws of light propagation that govern how light is reflected, transmitted, and how objects are illuminated by this light in the real world, the real or simulated surface properties of the first subset of physical elements, and the relative locations of the virtual window to the first subset of physical elements in the three-dimensional scene).

In some embodiments, while displaying the second quantity of virtual elements including the view into the first virtual environment (e.g., a virtual window showing the scene of a different geographic location (e.g., a real-time video feed or a simulated scene)) that is displayed with at least the first subset of the first set of one or more physical elements, the computer system detects an input that meets third criteria (e.g., criteria for changing the view into the virtual environment, without changing the level of immersion) (e.g., criteria for detecting a swipe gesture by the user's finger, or hand). In response to detecting the input that meets the third criteria, the computer system updates the view to show the first virtual environment with at least one changed parameter (e.g., time of day, season, date, location, zoom level, viewing angle, etc.) that alters the appearance of the first virtual environment. In some embodiments, when the content of the view changes (e.g., with the changing time of day, location, zoom level, viewing angle, season, etc.), the computer system also modifies the visual appearance of at least the portion of the first subset of the first set of one or more physical elements in accordance with the changed values for the first display property of the portion of the virtual environment represented in the content of the view (e.g., the correspondence between the first set of values for the first display property of the view of the virtual environment shown in the virtual window and the changes in the visual appearance of the first subset of physical elements is based on simulated physics laws, such as the laws of light propagation that govern how light is reflected, transmitted, and how objects are illuminated by this light in the real world, the real or simulated surface properties of the first subset of physical elements, and the relative locations of the virtual window to the first subset of physical elements in the three-dimensional scene).

In some embodiments, the first criteria include a first directional criterion (e.g., the input is a horizontal swipe input), and the second criteria include a second directional criterion (e.g., the input is a vertical swipe input) that is distinct from the first directional criterion. For example, in some embodiments, horizontal swipe gestures change the view represented inside the virtual window without changing the size of the window or alter the level of immersion (e.g., without changing the quantity of virtual elements in the three-dimensional scene), while vertical swipe gestures increase or decrease the level of immersion (e.g., increases or decreases the quantity of virtual elements in the three-dimensional scene).

In some embodiments, displaying the first quantity of virtual elements includes displaying a first virtual window in the three-dimensional scene, displaying the second quantity of virtual elements includes expanding the first virtual window in the three-dimensional scene, and displaying the third quantity of virtual elements includes replacing a view of one or more physical walls with virtual elements. In some embodiments, additional user inputs of the sequence of two or more user inputs causes additional quantities of virtual elements to be introduced into the three-dimensional scene occupying portions of the scene previously occupied by physical elements. For example, a third input meeting the first criteria replaces multiple remaining walls and ceiling with virtual elements. A fourth input meeting the first criteria replaces the floor with virtual elements.

In some embodiments, the sequence of two or more user inputs includes repeated inputs of a first input type (e.g., the same input type, such as vertical/upward swipe inputs).

In some embodiments, the sequence of two or more user inputs includes consecutive portions of a continuous input (e.g., a vertical/upward swipe input that starts from a first position, and includes continuous movement in a predefined direction that passes a plurality of threshold positions/distances, or a press input with continuously increasing intensity that exceeds a plurality of intensity thresholds, etc.), and each portion of the continuous input corresponds to a respective user input of the sequence of two or more user inputs (e.g., by meeting a respective input threshold of a plurality of input thresholds).

In some embodiments, the first subset of the first set of one or more physical elements includes at least a wall and a floor of a physical environment, and the second subset of the first set of one or more physical elements includes the floor of the physical environment without including the wall of the physical environment. For example, in some embodiments, the virtual elements replaces one or more walls of the physical environment represented in the three-dimensional scene, but does not replace the floor of the physical environment.

In some embodiments, the first subset of the first set of one or more physical elements includes at least a wall and one or more pieces of furniture in a physical environment, and the second subset of the first set of one or more physical elements includes the one or more pieces of furniture in the physical environment without including the wall of the physical environment. For example, in some embodiments, the virtual elements replaces one or more walls of the physical environment represented in the three-dimensional scene, but does not replace at least some of the furniture in the physical environment.

It should be understood that the particular order in which the operations in FIG. 10 have been described is merely an example and is not intended to indicate that the described order is the only order in which the operations could be performed. One of ordinary skill in the art would recognize various ways to reorder the operations described herein.

Additionally, it should be noted that details of other processes described herein with respect to other methods described herein (e.g., methods 8000, 9000, 11000 and 12000) are also applicable in an analogous manner to method 10000 described above with respect to FIG. 10. For example, the gestures, gaze inputs, physical objects, user interface objects, and/or animations described above with reference to method 10000 optionally have one or more of the characteristics of the gestures, gaze inputs, physical objects, user interface objects, and/or animations described herein with reference to other methods described herein (e.g., methods 8000, 9000, 11000 and 12000). For brevity, these details are not repeated here.

FIG. 11 is a flowchart of a method 11000 of facilitating user interaction with a computer-generated environment (e.g., utilizing interactions with physical surfaces to control devices or interact with the computer-generated environment), in accordance with some embodiments. In some embodiments, the method 11000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more input devices (e.g., cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In the method 11000, the computer system displays (11002), via the display generation component, a three-dimensional scene, the three-dimensional scene includes at least a first physical object (e.g., box 7502 or box 7504 in FIG. 7M) or representation thereof (e.g., representation 7502' or representation 7504' in FIG. 7N). The first physical object has at least a first physical (substantially flat and/or smooth) surface (e.g., the first physical object is made visible in the three-dimensional scene through a camera or a transparent display). A respective location of the first physical object or representations thereof in the three-dimensional scene corresponds to a respective location of the first physical object in a physical environment surrounding the display generation component (e.g., the first physical object is visible through a transparent pass-through portion of a heads-up display or HMD, or the representation of the first physical object includes an image of the first physical object in a camera view of the physical environment that is displayed on a display or HMD). While displaying the three-dimensional scene, the computer system detects (11004) that first interaction criteria are met, wherein the first interaction criteria include a first criterion that is met when a first level of user interaction between a user and the first physical object is detected (e.g., when the user's gaze is directed to the first physical object without any other gestures or actions (e.g., hand movements, verbal command, etc.) indicating that the user wishes to perform an operation with respect to the first physical object). In response to detecting that the first interaction criteria are met, the computer system displays (11006), via the display generation component, a first user interface (e.g., first user interface 7510 in FIG. 7O or first user interface 7516 in FIG. 7P) (e.g., a simplified user interface or an informational interface) at a location that corresponds to a location of the first physical surface of the first physical object (e.g., box 7502 or box 7504) in the three-dimensional scene (e.g., the first user interface is displayed on top of or overlaying at least a portion of the first physical surface of the first physical object or representation thereof). While displaying the first user interface at the location that corresponds to the location of the first physical surface of the first physical object or representation thereof in the three-dimensional scene, the computer system detects (11008) that second interaction criteria are met, wherein the second interaction criteria includes a second criterion that is met when a second level of user interaction (e.g., when the user or the user's hand moves closer to the first physical object, while the user's gaze is still on the first physical object), greater than the first level of user interaction between the user and the first physical object, is detected (e.g., the level of user interaction that meets the second criterion also meets the first criterion, but the level of user interaction that meets the first criterion does not meet the second criterion). In response to detecting that the second interaction criteria are met, the computer system replaces (11010) display of the first user interface with display of a second user interface (e.g., second user interface 7510' in FIG. 7Q or second user interface 7512' in FIG. 7R) (e.g., an enhanced user interface or user interface with control elements) at the location that corresponds to the location of the first physical surface of the first physical object or representation thereof in the three-dimensional scene (e.g., the second user interface corresponds to an enhanced user interface corresponding to the first physical object as compared to the first physical object). In some embodiments, when the user's hand is detected near the first physical object (e.g., a hover input is detected), the computer system display even more information (past/future songs, expanded controls) in a third user interface that replaces the second user interface. In some embodiments, the first user interface includes an indication of a keyboard, and the second user interface includes a keyboard with keys for text entry, and the first physical surface is a table top of a physical table. The indication of the keyboard is displayed when the user looks at the table top, and the keyboard is displayed when the user looks at the table top and hovers his hands over the table top in a posture for typing. In some embodiments, the keys of the keyboard pop up from locations in the three-dimensional scene corresponding to the table top when the user hovers his hands over the table top. In some embodiments, when the user's finger pushes toward or touches the table top, keys at the locations corresponding to the touched locations on the table top appear to be pushed down and optionally get bigger. The keys are restored to the original size once the user's finger is lifted from the table top.

In some embodiments, while displaying the second user interface at the location that corresponds to the location of the first physical surface of the first physical object or representation thereof in the three-dimensional scene, the computer system detects that first interaction criteria are met (e.g., the level of user interaction falls back to the first level of user interaction). In response to detecting that the first interaction criteria are met after display of the second user interface, the computer system replaces display of the second user interface with display of the first user interface at the location that corresponds to the location of the first physical surface of the first physical object or representation thereof in the three-dimensional scene. For example, the expanded user interface ceases to be displayed once the level of user interaction falls below the required threshold level for displaying the expanded user interface. In some embodiments, if the level of user interaction falls further, and the first interaction criteria are also not met, then the computer system ceases to display the first user interface as well.

In some embodiments, while displaying the first user interface (e.g., media playback user interface) at the location that corresponds to the location of the first physical surface of the first physical object (e.g., a speaker) or representation thereof in the three-dimensional scene, the computer detects that third interaction criteria are met, wherein the third interaction criteria includes a third criterion that is met when the first level of user interaction (e.g., when the user or the user's hand does not move but the user's gaze moves to the second physical object from the first physical object) between the user and a second physical object (e.g., a smart lamp) distinct from the first physical object is detected. In response to detecting that the third interaction criteria are met: the computer system ceases display of the first user interface (e.g., media playback user interface) at the location that corresponds to the location of the first physical surface of the first physical object (e.g., speaker) or representation thereof in the three-dimensional scene; and the computer system displays a third user interface (e.g., lighting control user interface) at a location that corresponds to a location of a second physical surface of the second physical object (e.g., the smart lamp) or representation thereof in the three-dimensional scene. For example, when the user's gaze shifts from the first physical object to the second physical object, while the user's hand is hovering in the air without movement near both the first physical object and the second physical object, the computer system ceases to display the user interface corresponding to the first physical object overlaying the surface of the first physical object, and instead displays a user interface corresponding to the second physical object overlaying the surface of the second physical object in the three-dimensional scene.

In some embodiments, while displaying the first user interface at the location that corresponds to the location of the first physical surface of the first physical object or representation thereof in the three-dimensional scene, the computer system detects a first input that meets first action criteria, wherein the first action criteria corresponds to activation of a first option included in the first user interface (e.g., first activation criteria are criteria for detecting a tap input). In response to detecting the first input that meets the first action criteria while the first user interface is displayed, the computer system performs a first operation corresponding to the first option included in the first user interface (e.g., activating a play/pause function of a media player that is associated with the first physical object (e.g., a speaker or stereo)). In some embodiments, while displaying the first user interface at the location that corresponds to the location of the first physical surface of the first physical object or representation thereof in the three-dimensional scene, the computer system detects a second input that meets second action criteria, wherein the second action criteria corresponds to activation of a second option included in the first user interface (e.g., second action criteria are criteria for detecting a swipe input, or criteria for detecting a twist input); and in response to detecting the second input that meets the second action criteria while the first user interface is displayed, the computer system performs a second operation corresponding to the second option included in the first user interface (e.g., activating a fast forward or rewind function of the media player that is associated with the first physical object (e.g., a speaker or stereo), or adjusting a volume or output level of the first physical object).

In some embodiments, while displaying the second user interface at the location that corresponds to the location of the first physical surface of the first physical object or representation thereof in the three-dimensional scene, the computer system detects a second input that meets third action criteria, wherein the third action criteria corresponds to activation of a third option included in the second user interface (e.g., third action criteria are criteria for detecting a tap input together with a gaze input directed to a first user interface object included in the second user interface). In response to detecting the first input that meets the third action criteria while the second user interface is displayed, the computer system performs a third operation corresponding to the third option included in the second user interface (e.g., switching to a different album of a media player that is associated with the first physical object (e.g., a speaker or stereo)). In some embodiments, while displaying the second user interface at the location that corresponds to the location of the first physical surface of the first physical object or representation thereof in the three-dimensional scene, the computer system detects a fourth input that meets fourth action criteria, wherein the fourth action criteria corresponds to activation of a fourth option included in the second user interface (e.g., fourth action criteria are criteria for detecting a swipe input with a gaze input directed to a second user interface object included in the second user interface); and in response to detecting the fourth input that meets the fourth action criteria while the second user interface is displayed, the computer system performs a fourth operation corresponding to the fourth option included in the second user interface (e.g., activating one or more other related physical objects of the first physical objects (e.g., activating one or more other related speakers) or passing the output of the first physical object to another physical object).

In some embodiments, the first physical object is a speaker, and wherein the first user interface provides a first set of one or more playback control functions (e.g., play/pause control function, fast forward function, rewind function, stop function, etc.) associated with the speaker. In some embodiments, the first user interface includes user interface objects that correspond to these control functions. In some embodiments, the first user interface does not include user interface objects that correspond to at least some of the control functions provided in the first user interface at a given time, and the user interface objects that are displayed on the first user interface are selected depending on the user input that is detected while the first user interface is displayed. For example, when the user provides a swipe input while the first user interface is displayed, the first user interface displays a fast-forward or rewind symbol depending on the direction of the swipe input. When the user provides a tap input while the first user interface is displayed, the first user interface displays a play/pause indicator depending on the current state of the playback. When the user provides a pinch and twist input with his/her fingers, the first user interface displays a volume control that adjusts the volume level of the speaker in accordance with the direction of the twist input. In some embodiments, the first user interface also provides information such as a list of recently played or upcoming songs/albums that the user can select from.

In some embodiments, the first user interface includes one or more notifications corresponding to the first physical object. For example, when the user has a first level of interaction with the first physical object (e.g., the user looks at the speaker or a smart lamp), the computer system displays one or more notifications (e.g., notifications related to the status or alerts corresponding to the speaker or smart lamp (e.g., "battery level low," "timer set to 20 mins", etc.)) overlaying the first physical surface of the first physical object.

In some embodiments, the second user interface includes a keyboard that includes a plurality of character keys for text entry. For example, when the user has a second level of interaction with the first physical object (e.g., the user looks at the speaker and raises both of his hand, the computer displays a search interface with a keyboard for the user to enter a search keyword for searching a music database associated with the speaker).

In some embodiments, the first user interface displays an indication of an internal state of the first physical object. For example, when the user has a first level of interaction with the first physical object (e.g., the user looks at the speaker or a smart lamp), the computer system displays an internal state of the first physical object (e.g., a name of currently played album/song, "battery level low," "timer set to 20 mins", etc.) overlaying the first physical surface of the first physical object.

In some embodiments, the second user interface provides at least a subset of functions or information provided in the first user interface, and includes at least one function or item of information that is not available in the first user interface. For example, when the user has a first level of interaction with the first physical object (e.g., the user looks at the speaker or a smart lamp), the computer system displays an internal state of the first physical object (e.g., a name of currently played album/song, "battery level low," "timer set to 20 mins", etc.) overlaying the first physical surface of the first physical object; and when the user has a second level of interaction with the first physical object (e.g., the user looks at the speaker or smart lamp and raises his/her hand into the ready gesture for providing input or moves closer to the first physical object), the computer system displays a user interface that displays the internal state of the first physical object as well as one or more controls to change the internal state of the first physical object (e.g., controls for changing the currently played song/album, controls for routing the output to a related speaker, etc.).

In some embodiments, while displaying the first user interface at the location that corresponds to the location of the first physical surface of the first physical object in the three-dimensional scene (e.g., the first user interface is displayed on top of or overlaying at least a portion of the first physical surface of the first physical object or representation thereof), the computer system detects a user input that meets fifth criteria that correspond to a request for dismissing the first user interface (e.g., criteria for detecting a swipe input while a gaze input is focused on the first user interface). In response to detecting the user input that meets the fifth criteria, the computer system ceases to display the first user interface (e.g., without replacing the first user interface with the second user interface). Similarly, in some embodiments, while displaying the second user interface at the location that corresponds to the location of the first physical surface of the first physical object in the three-dimensional scene (e.g., the second user interface is displayed on top of or overlaying at least a portion of the first physical surface of the first physical object or representation thereof), the computer system detects a user input that meets the sixth criteria that correspond to a request for dismissing the second user interface (e.g., criteria for detecting a swipe input while a gaze input is focused on the second user interface); and in response to detecting the user input that meets the sixth criteria, the computer system ceases to display the second user interface (e.g., without replacing the second user interface with the first user interface).

In some embodiments, while displaying the first user interface or the second user interface at the location that corresponds to the location of the first physical surface of the first physical object in the three-dimensional scene (e.g., the first/second user interface is displayed on top of or overlaying at least a portion of the first physical surface of the first physical object or representation thereof), the computer system detects a user input on the first physical surface of the first physical object (e.g., with one or more sensors on the physical surface such a touch sensor or a proximity sensor and/or one or more sensors on the device such as a camera or depth sensor). In response to detecting the user input on the first physical surface of the first physical object: in accordance with a determination that the user input on the first physical surface of the first physical object meets sixth criteria (e.g., a first set of criteria among respective sets of criteria for detecting a swipe input, a tap input, a long press input, or a double tap input, etc.), the computer system performs a first operation corresponding to the first physical object. In accordance with a determination that the user input on the first physical surface of the first physical object meets sixth criteria (e.g., a second set of criteria among the respective sets of criteria for detecting a swipe input, a tap input, a long press input, or a double tap input, etc.), the computer system performs a second operation corresponding to the first physical object, that is distinct from the first operation.

In some embodiments, while displaying the first user interface or the second user interface at the location that corresponds to the location of the first physical surface of the first physical object in the three-dimensional scene (e.g., the first/second user interface is displayed on top of or overlaying at least a portion of the first physical surface of the first physical object or representation thereof), the computer system detects a gesture input (e.g., a hand gesture in the air, on a controller, or on user's hand) while a gaze input is directed to the first physical surface of the first physical object. In response to detecting the gesture input while the gaze input is directed to the first physical surface of the first physical object: in accordance with a determination that the gesture input and the gaze input meet seventh criteria (e.g., the gesture is a tap input while the gaze input is on a button in the user interface), the computer system performs a third operation corresponding to the first physical object (e.g., a function associated with the button). In accordance with a determination that the gesture input and the gaze input meet eighth criteria (e.g., the gestures is a swipe input while the gaze input is on a slider in the user interface), the computer system performs a fourth operation corresponding to the first physical object, that is distinct from the third operation (e.g., adjusting a value associated with the slider).

In some embodiments, while displaying the first user interface or the second user interface at the location that corresponds to the location of the first physical surface of the first physical object in the three-dimensional scene (e.g., the first/second user interface is displayed on top of or overlaying at least a portion of the first physical surface of the first physical object or representation thereof), the computer system detects a gesture input on a second physical surface (e.g., with one or more sensors on the physical surface such a touch sensor or a proximity sensor and/or one or more sensors on the device such as a camera or depth sensor) of a second physical object that is distinct from the first physical object (e.g., the second physical object is a table top or controller near the user's hand) while a gaze input is directed to the first physical surface of the first physical object (e.g., the first physical object is far away from the user's hand). In response to detecting the gesture input on the second physical surface of the second physical object while the gaze input is directed to the first physical surface of the first physical object: in accordance with a determination that the gesture input and the gaze input meet ninth criteria (e.g., the gesture is a tap input while the gaze input is on a button in the user interface), the computer system performs a fifth operation corresponding to the first physical object (e.g., a function associated with the button); and in accordance with a determination that the gesture input and the gaze input meet tenth criteria (e.g., the gestures is a swipe input while the gaze input is on a slider in the user interface), the computer system performs a sixth operation corresponding to the first physical object, that is distinct from the fifth operation (e.g., adjusting a value associated with the slider).

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000 and 12000) are also applicable in an analogous manner to method 11000 described above with respect to FIG. 11. For example, the gestures, gaze inputs, physical objects, user interface objects, and/or animations described above with reference to method 11000 optionally have one or more of the characteristics of the gestures, gaze inputs, physical objects, user interface objects, and/or animations described herein with reference to other methods described herein (e.g., methods 8000, 9000, 10000, and 12000). For brevity, these details are not repeated here.

FIG. 12 is a flowchart of a method 12000 of generating a computer-generated three-dimensional environment (e.g., including simulating visual interplay between a voice-based virtual assistant and physical and virtual objects in the environment), in accordance with some embodiments. In some embodiments, the method 12000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more input devices (e.g., cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the method 12000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 12000 are, optionally, combined and/or the order of some operations is, optionally, changed.

In the method 12000, the computer system displays (12002), via a display generation component, a three-dimensional scene, the three-dimensional scene includes at least a first physical object (e.g., furniture 7310 in FIG. 7T) having a first physical surface (e.g., front surface 7312 of furniture 7310 in FIG. 7T) (e.g., the first physical object is made visible in the three-dimensional scene through a camera or a transparent display, and has inherent optical properties such as color, texture, reflectivity, and transparency, etc.) and at least a first virtual object (e.g., virtual object 7404 in FIG. 7T) having a first virtual surface (e.g., a computer-rendered three-dimensional object with a computer-generated surface that has simulated surface optical properties (e.g., simulated reflectivity, simulated surface texture, etc.), such as a computer-rendered three-dimensional vase or table top). While displaying the three-dimensional scene including the first physical object and the first virtual object, the computer system detects (12004) a request to activate a voice-based virtual assistant, e.g., as shown in FIG. 7T. In response to detecting the request to activate the voice-based virtual assistant (12006): the computer system activates the voice-based virtual assistant configured to receive voice commands (e.g., for interacting with the three-dimensional scene). The computer system also displays a visual representation of the voice-based virtual assistant (e.g., a glowing ellipsoid 7602 in FIGS. 7U and 7W) in the three-dimensional scene, including displaying the visual representation of the voice-based virtual assistant with a first set of values (e.g., a single value, a continuous range of values for different portions of the visual representation, or distinct and discrete values for different portions of the visual representation) for a first display property (e.g., color, or luminance) of the visual representation (e.g., the glowing ellipsoid 7602 has a first range of brightness level and a first color). The computer system modifies a visual appearance of at least a portion of the first physical surface of the first physical object (e.g., the front surface 7312 of furniture 7310 or representation thereof in FIGS. 7U and 7W) and at least a portion of the first virtual surface of the first virtual object (e.g., the top surface of the virtual object 7404 in FIGS. 7U and 7W) in accordance with the first set of values for the first display property of the visual representation of the voice-based virtual assistant (e.g., the correspondence between the first set of values for the first display property of the visual representation of the voice-based virtual assistant and the changes in the visual appearance of the first physical surface and the first virtual surface is based on simulated physics laws, such as the laws of light propagation that govern how light is reflected, transmitted, and how objects are illuminated by this light in the real world, the real or simulated surface properties of the first physical surface and the first virtual surface, and the relative locations of the virtual assistant to the first physical surface and the first virtual surface). For example, as shown in FIG. 7U, when the representation of the voice-based assistant starts to glow with a first level of brightness, the appearance of the front surface of the furniture 7310 is modified to appear lit up by the simulated illumination emitted from the glowing representation of the voice-based assistant. The simulated illumination on the front surface of the rectangular box is stronger/brighter at locations that is closer to the glowing representation of the voice-based assistant, and fainter/dimmer at locations that is farther away from the glowing representations of the voice-based assistant. In some embodiments, the simulated illumination is generated in accordance with a physical property (e.g., surface texture, reflectivity, etc.) of the front surface of the rectangular box in the real world, and the simulated distance between the glowing representation of the voice-based assistant and the rectangular box in the three-dimensional scene. In some embodiments, the device also modifies the appearance of the three-dimensional scene by adding a simulated shadow next to the rectangular box that is cast by the rectangular box (e.g., on the physical wall behind the rectangular box) under the simulated illumination by the glowing representation of the voice-based virtual assistant. In some embodiments, in addition to modifying the appearance of the front surface of the rectangular box (e.g., using a semitransparent overlay at locations corresponding to the physical surface, or directly modifying displayed pixel values of a representation of the physical surface), the device also modifies the appearance of the top surface of the virtual ellipsoidal object to make it appear lit up by the simulated illumination emitted from the glowing representation of the voice-based assistant. The simulated illumination on the top surface of the virtual ellipsoidal object is stronger/brighter at locations that is closer to the glowing representation of the voice-based assistant, and fainter/dimmer at locations that is farther away from the glowing representations of the voice-based assistant. In some embodiments, the simulated illumination is generated in accordance with a simulated physical property (e.g., surface texture, reflectivity, etc.) of the top surface of the virtual ellipsoidal object, and the simulated distance between the glowing representation of the voice-based assistant and the virtual ellipsoidal object in the three-dimensional scene. In some embodiments, the device also modifies the appearance of the three-dimensional scene by adding a simulated shadow next to the virtual ellipsoidal object or modifying an existing simulated shadow that is cast by the virtual ellipsoidal object in accordance with the simulated illumination by the glowing representation of the voice-based assistant.

In some embodiments, modifying the visual appearance of at least a portion of the first virtual surface of the first virtual object (e.g., the top surface of the virtual object 7404 in FIGS. 7U and 7W) in accordance with the first set of values for the first display property of the visual representation of the voice-based virtual assistant includes: increasing a respective luminance of at least a portion of the first virtual surface of the first virtual object in accordance with an increased luminance value of the visual representation of the voice-based virtual assistant (e.g., in accordance with an increased luminance value corresponding to a portion of the visual representation of the voice-based virtual assistant that faces toward the portion of the first virtual surface of the first virtual object (e.g., the portion may not be visible to a user on the display generation component)).

In some embodiments, modifying the visual appearance of at least a portion of the first virtual surface of the first virtual object (e.g., the top surface of the virtual object 7404 in FIGS. 7U and 7W) in accordance with the first set of values for the first display property of the visual representation of the voice-based virtual assistant includes changing a respective color of at least a portion of the first virtual surface of the first virtual object in accordance with a changed color value of the visual representation of the voice-based virtual assistant (e.g., in accordance with a changed color value corresponding to a portion of the visual representation of the voice-based virtual assistant that faces toward the portion of the first virtual surface of the first virtual object (e.g., the portion may not be visible to a user on the display generation component)).

In some embodiments, modifying a visual appearance of at least a portion of the first physical surface of the first physical object (e.g., the front surface 7312 of furniture 7310 or representations thereof in FIGS. 7U and 7W) in accordance with the first set of values for the first display property of the visual representation of the voice-based virtual assistant includes increasing a respective luminance of a portion of the three-dimensional scene that corresponds to at least a portion of the first physical surface of the first physical object in accordance with an increased luminance value of the visual representation of the voice-based virtual assistant (e.g., in accordance with an increased luminance value corresponding to a portion of the visual representation of the voice-based virtual assistant that faces toward the portion of the first physical surface of the first physical object (e.g., the portion may not be visible to a user on the display generation component)).

In some embodiments, modifying a visual appearance of at least a portion of the first physical surface of the first physical object (e.g., the front surface 7312 of furniture 7310 or representations thereof in FIGS. 7U and 7W) in accordance with the first set of values for the first display property of the visual representation of the voice-based virtual assistant includes changing a respective color of a portion of the three-dimensional scene that corresponds to at least a portion of the first physical surface of the first physical object in accordance with a changed color value of the visual representation of the voice-based virtual assistant (e.g., in accordance with a changed color value corresponding to a portion of the visual representation of the voice-based virtual assistant that faces toward the portion of the first physical surface of the first physical object (e.g., the portion may not be visible to a user on the display generation component)).

In some embodiments, in response to detecting the request to activate the voice-based virtual assistant: the computer system modifies a visual appearance (e.g., increasing luminance or changing color and hue) of a peripheral region of a portion of the three-dimensional scene that is currently displayed via the display generation component, in accordance with the first set of values for the first display property of the visual representation of the voice-based virtual assistant. For example, if the virtual assistant is represented by a glowing purple ellipsoid in the three-dimensional scene, peripheral region of the visual field of the user is displayed with a fuzzy glowing edge with a purple hue to indicate that a voice command to the voice-based virtual assistant will be executed with respect to the object/objects within the portion of the three-dimensional scene that is currently within the visual field of the user. For example, as the user looks around a room, the central region of the user's visual field is clear and surrounded by a purple vignette, the objects within the central region of the user's visual field is the target of the voice command or provides the context of the voice command detected by the voice-based virtual assistant (e.g., "turn this on", or "change this photo").

In some embodiments, detecting the request to activate the voice-based virtual assistant includes detecting a gaze input that meets first criteria, wherein the first criteria include a criterion that is met when the gaze input is directed to a location corresponding to the visual representation of the voice-based virtual assistant in the three-dimensional scene (e.g., the virtual assistant is activated when the user gazes upon the visual representation of the virtual assistant). In some embodiments, the first criteria also include a criterion that is met when the gaze input meets preset gaze stability and duration thresholds. In some embodiments, the request to activate the voice-based virtual assistant includes a preset trigger command "Hey, assistant!"

In some embodiments, displaying the visual representation of the voice-based virtual assistant (e.g., a glowing ellipsoid 7602 in FIG. 7U and FIG. 7W) in the three-dimensional scene in response to detecting the request to activate the voice-based virtual assistant (e.g., in response to detecting the gaze input that meets the first criteria) includes moving the visual representation of the voice-based virtual assistant from a first location to a second location in the three-dimensional scene (e.g., when the user gazes upon the dormant virtual assistant, the virtual assistant pops up from its original location (e.g., into the center of the user's field of view or slightly away from the original location to indicate that it is activated)).

In some embodiments, displaying the visual representation of the voice-based virtual assistant (e.g., a glowing ellipsoid 7602 in FIG. 7U and FIG. 7W) in the three-dimensional scene in response to detecting the request to activate the voice-based virtual assistant (e.g., in response to detecting the gaze input that meets the first criteria) includes changing a size of the visual representation of the voice-based virtual assistant in the three-dimensional scene (e.g., when the user gazes upon the dormant virtual assistant, the virtual assistant increases in size and then settle back to its original size, or maintain the enlarged size until it becomes deactivated again).

In some embodiments, displaying the visual representation of the voice-based virtual assistant (e.g., a glowing ellipsoid 7602 in FIG. 7U and FIG. 7W) in the three-dimensional scene in response to detecting the request to activate the voice-based virtual assistant (e.g., in response to detecting the gaze input that meets the first criteria) includes changing the first set of values for the first display property of the visual representation of the voice-based virtual assistant in the three-dimensional scene (e.g., when the user gazes upon the dormant virtual assistant, the virtual assistant glows and/or takes on a different color or hue).

In some embodiments, in response to detecting the request to activate the voice-based virtual assistant (e.g., in response to detecting the gaze input that meets the first criteria), the computer system changes a second set of values for the first display property of a portion of the three-dimensional scene at locations surrounding the visual representation of the voice-based virtual assistant (e.g., obscuring (blur, darken, etc.) the background (e.g., in regions around the virtual assistant or around the whole screen) when the virtual assistant is invoked).

In some embodiments, detecting the request to activate the voice-based virtual assistant includes detecting a gaze input that meets first criteria and a voice input that meets second criteria, wherein the first criteria includes a criterion that is met when the gaze input is directed to a location corresponding to the visual representation of the voice-based virtual assistant in the three-dimensional scene, and wherein the second criteria includes a criterion that is met when the voice input is detected while the gaze input meets the first criteria (e.g., the virtual assistant is activated when the user gazes upon the visual representation of the virtual assistant and speaks a voice command). In some embodiments, the device processes the voice input to determine a user command for the voice assistant after the voice-based virtual assistant is activated, and provides the user command to the virtual assistant as input to trigger performance of a corresponding operation by the virtual assistant. In some embodiments, if the gaze input does not meet the first criteria or the voice input does not meet the second criteria, the virtual assistant does not perform an operation that corresponds to the voice command in the voice input.

In some embodiments, while displaying the visual representation of the voice-based virtual assistant (e.g., a glowing ellipsoid 7602 in FIG. 7K and FIG. 7L) in the three-dimensional scene, the computer system detects a first input that correspond to a request for the voice-based assistant to perform a first operation (e.g., changing the photo in a virtual picture frame in the scene, starting a communication session, starting an application, etc.), wherein the first input extends for a first duration (e.g., the first input is a speech input, a gaze input, a gesture input, or a combination of two or more of the above). In response to detecting the first input, the computer system changes the first display property of the visual representation of the voice-based virtual assistant from the first set of values (e.g., a single value, a continuous range of values for different portions of the visual representation, or distinct and discrete values for different portions of the visual representation) to a second set of values distinct from the first set of values during the first input. In some embodiments, the device also modifies the visual appearance of at least a portion of the first physical surface of the first physical object (e.g., the front surface of the furniture 7310 or representations thereof in FIGS. 7U and 7W) and at least a portion of the first virtual surface of the first virtual object (e.g., the top surface of the virtual object 7602 in FIGS. 7U and 7W) in accordance with the second set of values for the first display property of the visual representation of the voice-based virtual assistant, when the values of the first display property of the visual representation of the voice-based virtual assistant changes during the first input. For example, while the user speaks to the virtual assistant, the visual representation of the virtual assistant glows with pulsating light, varying colors, or dynamic color/light patterns.

In some embodiments, while displaying the visual representation of the voice-based virtual assistant (e.g., a glowing ellipsoid 7602 in FIG. 7U and FIG. 7W) in the three-dimensional scene, the computer system detects a second input that correspond to a request for the voice-based assistant to perform a second operation (e.g., changing the photo in a virtual picture frame in the scene, starting a communication session, starting an application, etc.) (e.g., the second input is a speech input, a gaze input, a gesture input, or a combination of two or more of the above). In response to detecting the second input: the computer system initiates performance of the second operation (e.g., launching an application, playing a media file, generating an audio output such as a request for additional information or answer to a question). The computer system also changes the first display property of the visual representation of the voice-based virtual assistant from the first set of values (e.g., a single value, a continuous range of values for different portions of the visual representation, or distinct and discrete values for different portions of the visual representation) to a third set of values distinct from the first set of values during performance of the second operation. In some embodiments, the device also modifies the visual appearance of at least a portion of the first physical surface of the first physical object (e.g., the front surface 7312 of furniture 7310 or representations thereof in FIGS. 7U and 7W) and at least a portion of the first virtual surface of the first virtual object (e.g., the top surface of the virtual object 7404 in FIGS. 7U and 7W) in accordance with the third set of values for the first display property of the visual representation of the voice-based virtual assistant, when the values of the first display property of the visual representation of the voice-based virtual assistant changes during performance of the second operation by the virtual assistant. For example, while the user speaks to the virtual assistant, the visual representation of the virtual assistant does not change or changes in a first manner; once the virtual assistant starts to perform the operation requested in the voice command received from the user, the virtual assistant changes in a second manner (e.g., glows with different pulsating light, varying colors, or dynamic color/light patterns). In some embodiments, the second operation is optionally a voice response (e.g., answering a question, asking for a clarification question, providing a status, informing what the virtual assistant is capable of, notifying that the virtual assistant has understood the request and will perform the requested operation, requesting the user to confirm the command, etc.) from the virtual assistant in response to the user's second input.

In some embodiments, the visual representation of the voice-based virtual assistant has a predefined location in a three-dimensional environment that includes the first virtual object and the first physical object (e.g., the three-dimensional environment is an augmented reality environment), and the request to activate the voice-based virtual assistant includes an input (e.g., a gaze input, gesture input, or a combination of both) directed to the predefined location. (For example, if the visual representation of the virtual assistant is not in the current visual field of the user, the user may turn and look to the predefined location of the virtual assistant and provide the necessary input (e.g., gaze input that meets preset criteria, or voice input that wakes the virtual assistant while the user's gaze is focused on the preset location) to activate the virtual assistant).

In some embodiments, while displaying, via the display generation component, the visual representation of the voice-based virtual assistant in the three-dimensional scene that includes the first physical object and the first virtual object, the computer system detects movement of the display generation component (e.g., a display, a projector, a heads-up display, or a HMD), wherein the visual representation of the voice-based virtual assistant is displayed at a first location in the three-dimensional scene that corresponds to a first portion of the display generation component (e.g., the location and orientation of the visual representation of the virtual assistant is in the center of the left half of the visual field of the user wearing an HMD, or center of the lower half of the display, etc., or a glowing effect surrounding a periphery of the user's field of view (e.g., an edge of at least a portion of the display that changes in shape or color or brightness as the user talks or as the virtual assistant responds)) at a start of the movement of the display generation component. In response to detecting the movement of the display generation component, the computer system moves the visual representation of the voice-based virtual assistant to a second location in the three-dimensional scene that is different from the first location, wherein the second location in the three-dimensional scene is updated in accordance with the movement of the display generation component to correspond to the first portion of the display generation component (e.g., the location of the virtual assistant relative to the three-dimensional scene is continuously updated during the movement of the display generation component, such that the location/posture of the virtual assistant remains unchanged relative to the display generation component (e.g., relative to the user's head/eyes)). In some embodiments, as the location of the visual representation of the voice-based virtual assistant in the three-dimensional scene changes during the movement of the display generation component, its positions relative to the first virtual object and the first physical object in the three-dimensional scene also change. In response to these change in the relative positions in the three-dimensional scene, the device adjusts the manner (e.g., parameters used to simulate light reflection and shadow formation on the virtual and physical surfaces) by which the first display property of the virtual assistant is used to modify the appearance of the first virtual surface of the first virtual object and the first physical surface of the first physical object (e.g., the correspondence between the first set of values for the first display property of the visual representation of the voice-based virtual assistant and the changes in the visual appearance of the first physical surface and the first virtual surface is based on simulated physics laws, such as the laws of light propagation that govern how light is reflected, transmitted, and how objects are illuminated by this light in the real world, the real or simulated surface properties of the first physical surface and the first virtual surface, and the relative locations of the virtual assistant to the first physical surface and the first virtual surface).

In some embodiments, while displaying, via the display generation component, the visual representation of the voice-based virtual assistant in the three-dimensional scene that includes the first physical object and the first virtual object, the computer system detects movement of the display generation component (e.g., a display, a projector, a heads-up display, or a HMD), wherein the visual representation of the voice-based virtual assistant is displayed at a first location in the three-dimensional scene relative to the first virtual object and to the first physical object (e.g., the location and orientation of the visual representation of the virtual assistant is above the first virtual object and closer to the first virtual object than to the first physical object) at a start of the movement of the display generation component. In response to detecting the movement of the display generation component: the computer system changes a view point of the display generation component relative to the three-dimensional scene in accordance with the movement of the display generation component while maintaining the visual representation of the voice-based virtual assistant at the first location in the three-dimensional scene (e.g., the location of the virtual assistant relative to the three-dimensional scene is fixed to the environment, and the view of the three-dimensional environment is continuously updated during the movement of the display generation component. In some embodiments, since the location of the visual representation of the voice-based virtual assistant in the three-dimensional scene does not change during the movement of the display generation component, the device maintains the manner (e.g., parameters used to simulate light reflection and shadow formation on the virtual and physical surfaces) by which the first display property of the virtual assistant is used to modify the appearance of the first virtual surface of the first virtual object and the first physical surface of the first physical object (e.g., the correspondence between the first set of values for the first display property of the visual representation of the voice-based virtual assistant and the changes in the visual appearance of the first physical surface and the first virtual surface is based on simulated physics laws, such as the laws of light propagation that govern how light is reflected, transmitted, and how objects are illuminated by this light in the real world, the real or simulated surface properties of the first physical surface and the first virtual surface, and the relative locations of the virtual assistant to the first physical surface and the first virtual surface). However, since the view point of the display generation component relative to the three-dimensional scene changes during the movement of the display generation component, the appearance of the first physical object and the first virtual object may appear different during the movement of the display generation component (e.g., based on the change in the viewing perspective, but not on the change to the objects and their surface properties, etc.).

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000 and 11000) are also applicable in an analogous manner to method 12000 described above with respect to FIG. 12. For example, the gestures, gaze inputs, physical objects, user interface objects, and/or animations described above with reference to method 12000 optionally have one or more of the characteristics of the gestures, gaze inputs, physical objects, user interface objects, and/or animations described herein with reference to other methods described herein (e.g., methods 8000, 9000, 10000, and 11000). For brevity, these details are not repeated here.

The operations described above with reference to FIGS. 8, 9, 10, 11, and 12 are, optionally, implemented by components depicted in FIGS. 1-6. In some embodiments, aspects/operations of methods 8000, 9000, 10000, 11000, and 12000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system including a display generation component and one or more input devices:
displaying, via the display generation component, a three-dimensional scene that includes a view of a physical environment and one or more virtual objects, wherein the three-dimensional scene includes at least a first virtual object at a first location and a first physical surface at a second location that is separate from the first location by a first portion of the physical environment, wherein the first virtual object is displayed with a first value for a first display property that corresponds to a first portion of the first virtual object and a second value for the first display property that corresponds to a second portion of the first virtual object, the second value of the first display property being distinct from the first value of the first display property; and
while displaying the three-dimensional scene including the first virtual object and the first physical surface, generating, via the display generation component, a first visual effect of the three-dimensional scene, wherein generating the first visual effect includes:
modifying a visual appearance of the first portion of the physical environment between the first virtual object and the first physical surface in the three-dimensional scene in accordance with at least one of the first value and the second value for the first display property of the first virtual object, including displaying a simulated glow of the first virtual object that extends across a portion of a visual field that is between the first virtual object and the first physical surface, wherein the simulated glow of the first virtual object is displayed concurrently with the first virtual object and a simulated shadow associated with the first physical surface in the three-dimensional scene;
modifying a visual appearance of a first portion of the first physical surface in the three-dimensional scene in accordance with the first value for the first display property that corresponds to the first portion of the first virtual object; and
modifying a visual appearance of a second portion of the first physical surface in the three-dimensional scene in accordance with the second value for the first display property that corresponds to the second portion of the first virtual object, wherein the visual appearance of the first portion of the first physical surface and the visual appearance for the second portion of the first physical surface are modified differently due to differences in the first value and the second value of the first display property in the first and second portions of the first virtual object;
while displaying, via the display generation component, the three-dimensional scene that includes the view of the physical environment and the one or more virtual objects, including the first virtual object at the first location and the first physical surface at the second location, detecting a change in a viewpoint of a user relative to the physical environment; and
in response to detecting the change in the viewpoint of the user relative to the physical environment, updating an appearance of the simulated glow of the first virtual object that extends across the portion of the visual field that is between the first virtual object at the first location and the first physical surface at the second location, and updating an appearance of the simulated shadow associated with the first physical surface, that is concurrently displayed with the first virtual object and the simulated glow of the first virtual object in the three dimensional scene.

2. The method of claim 1, including:
detecting changes in appearance of the first virtual object, including value changes of the first display property in the first and second portions of the first virtual object; and
in response to detecting the changes in appearance of the first virtual object, modifying a visual appearance of the first physical surface at different portions of the first physical surface in accordance with the changes in appearance of the first virtual object, including:
modifying the visual appearance of the first portion of the first physical surface in accordance with a first relationship between the first display property and the visual appearance of the first portion of the first physical surface; and
modifying the visual appearance of the second portion of the first physical surface in accordance with a second relationship between the first display property and the visual appearance of the second portion of the first physical surface, wherein the first relationship and the second relationship correspond to different physical characteristics of the first and second portions of the first physical surface.

3. The method of claim 1, wherein the first virtual object includes a virtual overlay on a second physical surface at a location that corresponds to the first location in the three-dimensional scene, and wherein the computer system changes an appearance of the virtual overlay in accordance with a change in respective values of one or more parameters including at least one of a time of day, a location, and a size of the virtual overlay.

4. The method of claim 3, wherein generating the first visual effect includes:
modifying the visual appearance of the first portion of the first physical surface in accordance with changes in content shown in a first portion of the virtual overlay; and
modifying the visual appearance of the second portion of the first physical surface in accordance with changes in content shown in a second portion of the virtual overlay.

5. The method of claim 1, wherein the first virtual object includes a virtual screen that displays media content at a location that corresponds to the first location in the three-dimensional scene, and wherein the computer system changes the media content shown on the virtual screen in accordance with playback progress of a media item associated with the media content.

6. The method of claim 5, wherein generating the first visual effect includes:
modifying the visual appearance of the first portion of the first physical surface in accordance with changes in content shown in a first portion of the virtual screen; and
modifying the visual appearance of the second portion of the first physical surface in accordance with changes in content shown in a second portion of the virtual screen.

7. The method of claim 1, wherein the first virtual object is a virtual assistant that interacts with a user via speech, and wherein the computer system changes an appearance of the virtual assistant in accordance with a mode of operation of the virtual assistant.

8. The method of claim 1, wherein generating the first visual effect includes:
modifying the visual appearance of the first portion of the first physical surface in accordance with simulated reflection of the first virtual object on the first portion of the first physical surface; and
modifying the visual appearance of the second portion of the first physical surface in accordance with simulated reflection of the first virtual object on the second portion of the first physical surface.

9. The method of claim 1, wherein generating the first visual effect includes:
modifying the visual appearance of the first portion of the first physical surface in accordance with simulated shadows cast by the first virtual object on the first portion of the first physical surface; and
modifying the visual appearance of the second portion of the first physical surface in accordance with simulated shadows of the first virtual object on the second portion of the first physical surface.

10. The method of claim 1, wherein the three-dimensional scene further includes a second virtual object at a third location that is separate from the first location by a second portion of the physical environment, wherein generating the first visual effect includes modifying the visual appearance of the first portion of the physical environment between the first virtual object and the first physical surface and a visual appearance of the second portion of the physical environment between the first virtual object and the second virtual object in the three-dimensional scene based on the simulated glow of the first virtual object, and wherein the simulated glow of the first virtual object is generated in accordance with at least one of the first value and the second value for the first display property of the first virtual object.

11. The method of claim 10, further including:
in response to detecting the change in the viewpoint of the user relative to the physical environment, updating the first visual effect of the three-dimensional scene, wherein updating the first visual effect of the three-dimensional scene includes:
updating a first modification of the visual appearance of the first portion of the physical environment between the first virtual object and the first physical surface and a second modification of the visual appearance of the second portion of the physical environment between the first virtual object and the second virtual object in the three-dimensional scene based on the simulated glow of the first virtual object, and based on the change in the viewpoint of the user relative to the physical environment.

12. A non-transitory computer-readable storage medium storing executable instructions that, when executed by a computer system with one or more processors and a display generation component, cause the computer system to:
display, via the display generation component, a three-dimensional scene that includes a view of a physical environment and one or more virtual objects, wherein the three-dimensional scene includes at least a first virtual object at a first location and a first physical surface at a second location that is separate from the first location by a first portion of the physical environment, wherein the first virtual object is displayed with a first value for a first display property that corresponds to a first portion of the first virtual object and a second value for the first display property that corresponds to a second portion of the first virtual object, the second value of the first display property being distinct from the first value of the first display property; and
while displaying the three-dimensional scene including the first virtual object and the first physical surface, generate, via the display generation component, a first visual effect of the three-dimensional scene, wherein generating the first visual effect includes:
modifying a visual appearance of the first portion of the physical environment between the first virtual object and the first physical surface in the three-dimensional scene in accordance with at least one of the first value and the second value for the first display property of the first virtual object, including displaying a simulated glow of the first virtual object that extends across a portion of a visual field that is between the first virtual object and the first physical surface, wherein the simulated glow of the first virtual object is displayed concurrently with the first virtual object and a simulated shadow associated with the first physical surface in the three-dimensional scene;
modifying a visual appearance of a first portion of the first physical surface in the three-dimensional scene in accordance with the first value for the first display property that corresponds to the first portion of the first virtual object; and
modifying a visual appearance of a second portion of the first physical surface in the three-dimensional scene in accordance with the second value for the first display property that corresponds to the second portion of the first virtual object, wherein the visual appearance of the first portion of the first physical surface and the visual appearance for the second portion of the first physical surface are modified differently due to differences in the first value and the second value of the first display property in the first and second portions of the first virtual object;

while displaying, via the display generation component, the three-dimensional scene that includes the view of the physical environment and the one or more virtual objects, including the first virtual object at the first location and the first physical surface at the second location, detect a change in a viewpoint of a user relative to the physical environment; and in response to detecting the change in the viewpoint of the user relative to the physical environment, update an appearance of the simulated glow of the first virtual object that extends across the portion of the visual field that is between the first virtual object at the first location and the first physical surface at the second location, and update an appearance of the simulated shadow associated with the first physical surface, that is concurrently displayed with the first virtual object and the simulated glow of the first virtual object in the three dimensional scene.

13. The non-transitory computer-readable storage medium of claim 12, further comprising executable instructions that, when executed by the computer system, cause the computer system to:

detect changes in appearance of the first virtual object, including value changes of the first display property in the first and second portions of the first virtual object; and in response to detecting the changes in appearance of the first virtual object, modify a visual appearance of the first physical surface at different portions of the first physical surface in accordance with the changes in appearance of the first virtual object, wherein modifying the visual appearance of the first physical surface includes:

modifying the visual appearance of the first portion of the first physical surface in accordance with a first relationship between the first display property and the visual appearance of the first portion of the first physical surface; and modifying the visual appearance of the second portion of the first physical surface in accordance with a second relationship between the first display property and the visual appearance of the second portion of the first physical surface, wherein the first relationship and the second relationship correspond to different physical characteristics of the first and second portions of the first physical surface.

14. The non-transitory computer-readable storage medium of claim 12, wherein the first virtual object includes a virtual overlay on a second physical surface at a location that corresponds to the first location in the three-dimensional scene, and wherein the computer system changes an appearance of the virtual overlay in accordance with a change in respective values of one or more parameters including at least one of a time of day, a location, and a size of the virtual overlay.

15. The non-transitory computer-readable storage medium of claim 14, wherein generating the first visual effect includes:

modifying the visual appearance of the first portion of the first physical surface in accordance with changes in content shown in a first portion of the virtual overlay; and modifying the visual appearance of the second portion of the first physical surface in accordance with changes in content shown in a second portion of the virtual overlay.

16. The non-transitory computer-readable storage medium of claim 12, wherein the first virtual object includes a virtual screen that displays media content at a location that corresponds to the first location in the three-dimensional scene, and wherein the computer system changes the media content shown on the virtual screen in accordance with playback progress of a media item associated with the media content.

17. The non-transitory computer-readable storage medium of claim 16, wherein generating the first visual effect includes:

modifying the visual appearance of the first portion of the first physical surface in accordance with changes in content shown in a first portion of the virtual screen; and modifying the visual appearance of the second portion of the first physical surface in accordance with changes in content shown in a second portion of the virtual screen.

18. The non-transitory computer-readable storage medium of claim 12, wherein the first virtual object is a virtual assistant that interacts with a user via speech, and wherein the computer system changes the appearance of the virtual assistant in accordance with a mode of operation of the virtual assistant.

19. The non-transitory computer-readable storage medium of claim 12, wherein generating the first visual effect includes:

modifying the visual appearance of the first portion of the first physical surface in accordance with simulated reflection of the first virtual object on the first portion of the first physical surface; and modifying the visual appearance of the second portion of the first physical surface in accordance with simulated reflection of the first virtual object on the second portion of the first physical surface.

20. The non-transitory computer-readable storage medium of claim 12, wherein generating the first visual effect includes:

modifying the visual appearance of the first portion of the first physical surface in accordance with simulated shadows cast by the first virtual object on the first portion of the first physical surface; and modifying the visual appearance of the second portion of the first physical surface in accordance with simulated shadows of the first virtual object on the second portion of the first physical surface.

21. The non-transitory computer-readable storage medium of claim 12, wherein the three-dimensional scene further includes a second virtual object at a third location that is separate from the first location by a second portion of the physical environment, wherein generating the first visual effect includes modifying the visual appearance of the first portion of the physical environment between the first virtual object and the first physical surface and a visual appearance of the second portion of the physical environment between the first virtual object and the second virtual object in the three-dimensional scene based on the simulated glow of the first virtual object, and wherein the simulated glow of the first virtual object is generated in accordance with at least one of the first value and the second value for the first display property of the first virtual object.

22. The non-transitory computer-readable storage medium of claim 21, further comprising executable instructions that, when executed by the computer system, cause the computer system to:
in response to detecting the change in the viewpoint of the user relative to the physical environment, update the first visual effect of the three-dimensional scene, wherein updating the first visual effect of the three-dimensional scene includes:
updating a first modification of the visual appearance of the first portion of the physical environment between the first virtual object and the first physical surface and a second modification of the visual appearance of the second portion of the physical environment between the first virtual object and the second virtual object in the three-dimensional scene based on the simulated glow of the first virtual object, and based on the change in the viewpoint of the user relative to the physical environment.

23. A computer system, comprising:
one or more processors;
a display generation component; and
memory storing one or more programs that are configured for execution by the one or more processors, the one or more programs including instructions for:
displaying, via the display generation component, a three-dimensional scene that includes a view of a physical environment and one or more virtual objects, wherein the three-dimensional scene includes at least a first virtual object at a first location and a first physical surface at a second location that is separate from the first location by a first portion of the physical environment, wherein the first virtual object is displayed with a first value for a first display property that corresponds to a first portion of the first virtual object and a second value for the first display property that corresponds to a second portion of the first virtual object, the second value of the first display property being distinct from the first value of the first display property; and
while displaying the three-dimensional scene including the first virtual object and the first physical surface, generating, via the display generation component, a first visual effect of the three-dimensional scene, wherein generating the first visual effect includes:
modifying a visual appearance of the first portion of the physical environment between the first virtual object and the first physical surface in the three-dimensional scene in accordance with at least one of the first value and the second value for the first display property of the first virtual object, including displaying a simulated glow of the first virtual object that extends across a portion of a visual field that is between the first virtual object and the first physical surface, wherein the simulated glow of the first virtual object is displayed concurrently with the first virtual object and a simulated shadow associated with the first physical surface in the three-dimensional scene;
modifying a visual appearance of a first portion of the first physical surface in the three-dimensional scene in accordance with the first value for the first display property that corresponds to the first portion of the first virtual object; and
modifying a visual appearance of a second portion of the first physical surface in the three-dimensional scene in accordance with the second value for the first display property that corresponds to the second portion of the first virtual object, wherein the visual appearance of the first portion of the first physical surface and the visual appearance for the second portion of the first physical surface are modified differently due to differences in the first value and the second value of the first display property in the first and second portions of the first virtual object;
while displaying, via the display generation component, the three-dimensional scene that includes the view of the physical environment and the one or more virtual objects, including the first virtual object at the first location and the first physical surface at the second location, detecting a change in a viewpoint of a user relative to the physical environment; and
in response to detecting the change in the viewpoint of the user relative to the physical environment, updating an appearance of the simulated glow of the first virtual object that extends across the portion of the visual field that is between the first virtual object at the first location and the first physical surface at the second location, and updating an appearance of the simulated shadow associated with the first physical surface, that is concurrently displayed with the first virtual object and the simulated glow of the first virtual object in the three dimensional scene.

24. The computer system of claim 23, wherein the one or more programs include instructions for:
detecting changes in appearance of the first virtual object, including value changes of the first display property in the first and second portions of the first virtual object; and
in response to detecting the changes in appearance of the first virtual object, modifying a visual appearance of the first physical surface at different portions of the first physical surface in accordance with the changes in appearance of the first virtual object, wherein modifying the visual appearance of the first physical surface includes:
modifying the visual appearance of the first portion of the first physical surface in accordance with a first relationship between the first display property and the visual appearance of the first portion of the first physical surface; and
modifying the visual appearance of the second portion of the first physical surface in accordance with a second relationship between the first display property and the visual appearance of the second portion of the first physical surface, wherein the first relationship and the second relationship correspond to different physical characteristics of the first and second portions of the first physical surface.

25. The computer system of claim 23, wherein the three-dimensional scene further includes a second virtual object at a third location that is separate from the first location by a second portion of the physical environment, wherein generating the first visual effect includes modifying the visual appearance of the first portion of the physical environment between the first virtual object and the first physical surface and a visual appearance of the second portion of the physical environment between the first virtual object and the second virtual object in the three-dimensional scene based on simulated glow of the first virtual object, and wherein the simulated glow of the first virtual object is generated in accordance with at least one of the first value and the second value for the first display property of the first virtual object.

26. The computer system of claim 25, wherein the one or more programs further include executable instructions that, when executed by the computer system, cause the computer system to:

in response to detecting the change in the viewpoint of the user relative to the physical environment, update the first visual effect of the three-dimensional scene, wherein updating the first visual effect of the three-dimensional scene includes:

updating a first modification of the visual appearance of the first portion of the physical environment between the first virtual object and the first physical surface and a second modification of the visual appearance of the second portion of the physical environment between the first virtual object and the second virtual object in the three-dimensional scene based on the simulated glow of the first virtual object, and based on the change in the viewpoint of the user relative to the physical environment.

\* \* \* \* \*